United States Patent
Kang et al.

(10) Patent No.: US 10,856,128 B2
(45) Date of Patent: Dec. 1, 2020

(54) METHOD AND DEVICE FOR INTER-DEVICE COMMUNICATION

(71) Applicant: Samsung Electronics Co., Ltd, Gyeonggi-do (KR)

(72) Inventors: Hyun-Jeong Kang, Seoul (KR); Sang-Min Ro, Seoul (KR); Anil Agiwal, Gyeonggi-do (KR); Young-Bin Chang, Gyeonggi-do (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/328,001

(22) PCT Filed: Apr. 8, 2016

(86) PCT No.: PCT/KR2016/003727
§ 371 (c)(1),
(2) Date: Jan. 20, 2017

(87) PCT Pub. No.: WO2016/163817
PCT Pub. Date: Oct. 13, 2016

(65) Prior Publication Data
US 2018/0035276 A1 Feb. 1, 2018

(30) Foreign Application Priority Data

Apr. 9, 2015 (IN) .......................... 1872/CHE/2015
Jul. 3, 2015 (KR) ...................... 10-2015-0095261
Jan. 7, 2016 (KR) ...................... 10-2016-0001996

(51) Int. Cl.
*H04W 8/00* (2009.01)
*H04W 48/08* (2009.01)
(Continued)

(52) U.S. Cl.
CPC ........... *H04W 8/005* (2013.01); *H04W 48/08* (2013.01); *H04W 72/02* (2013.01);
(Continued)

(58) Field of Classification Search
CPC ... H04W 8/005; H04W 72/02; H04W 72/048; H04W 48/08
See application file for complete search history.

(56) References Cited

U.S. PATENT DOCUMENTS 9,532,361 B2 * 12/2016 Sartori .................. H04W 8/005
2014/0133332 A1 * 5/2014 Lee ........................ H04W 88/04
370/252

(Continued)

FOREIGN PATENT DOCUMENTS

KR 20150022240 3/2015

OTHER PUBLICATIONS

International Search Report dated Aug. 30, 2016 in connection with International Application No. PCT/KR2016/003727, 5 pages.
(Continued)

*Primary Examiner* — Yemane Mesfin
*Assistant Examiner* — Henry Baron

(57) ABSTRACT

The present disclosure relates to a 5G or pre-5G communication system to be provided in order to support a higher data transmission rate following 4G communication systems such as LTE. Disclosed are a method and device for improving device searching in a D2D communication system supporting direct communication between devices. The method comprises the steps of: generating a search signal including search information; selecting a transmission resource to transmit the search signal; transmitting the search signal through the selected transmission resource; and when a request signal requesting additional information on the search from a counterpart device that has received the
(Continued)

search signal is received, transmitting a confirmation signal including the requested additional information to the counterpart device. The present disclosure relates to a communication technique and system which combine a 5G communication system, for supporting a higher data transmission rate following 4G systems, with IoT technology.

20 Claims, 34 Drawing Sheets

(51) Int. Cl.
    *H04W 72/02* (2009.01)
    *H04W 72/04* (2009.01)
    *H04W 76/50* (2018.01)
    *H04W 76/14* (2018.01)
    *H04W 88/04* (2009.01)

(52) U.S. Cl.
    CPC ......... *H04W 72/048* (2013.01); *H04W 76/14* (2018.02); *H04W 76/50* (2018.02); *H04W 88/04* (2013.01)

(56) References Cited

U.S. PATENT DOCUMENTS

| | | |
|---|---|---|
| 2014/0378123 A1 | 12/2014 | Stojanovski et al. |
| 2015/0043545 A1 | 2/2015 | Cheng et al. |
| 2015/0045016 A1 | 2/2015 | Xiong et al. |
| 2015/0045050 A1 | 2/2015 | Sartori |
| 2015/0049674 A1 | 2/2015 | Kuo |
| 2016/0066337 A1* | 3/2016 | Sartori ................ H04W 76/023 370/329 |
| 2016/0150390 A1* | 5/2016 | Chen .................... H04W 76/14 370/311 |
| 2016/0212682 A1 | 7/2016 | Chung et al. |
| 2016/0255668 A1* | 9/2016 | Wei ....................... H04W 8/005 455/434 |
| 2017/0237817 A1* | 8/2017 | Sharma ................. H04L 67/02 370/331 |

OTHER PUBLICATIONS

Written Opinion of the International Searching Authority dated Aug. 30, 2016 in connection with International Application No. PCT/KR2016/003727, 8 pages.

Samsung, "Use of Group Info/Connectivity Info in UE2NW Relay Discovery", SA WG2 Meeting #108, San Jose Del Cabo, Mexico, Apr. 13, 17, 2015, S2-151021, 10 pages.

Itri, "DL Data Transmission from an AS to an Out-of-Network Coverage PS Terminal via UE-Network Relay", SA WG2 Meeting #108, San Jose Del Cabo, Mexico, Apr. 13-17, 2015, S2-151054, 2 pages.

3GPP TR 23.713 V1.0.0, "3rd Generation Partnership Project; Technical Specification Group Services and System Aspects; Study on Extended Architecture Support for Proximity-Based Services (Release 13)", Feb. 2015, 59 pages.

* cited by examiner

METHOD AND DEVICE FOR INTER-DEVICE COMMUNICATION

CROSS-REFERENCE TO RELATED APPLICATIONS AND CLAIM OF PRIORITY

The present application claims priority under 35 U.S.C. § 365 to International Patent Application No. PCT/KR2016/003727 filed Apr. 8, 2016, entitled "METHOD AND APPARATUS FOR INTER-DEVICE COMMUNICATION", and, through International Patent Application No. PCT/KR2016/003727, to Indian Patent Application No. 1872/CHE/2015 filed on Apr. 9, 2015, to Korean Patent Application No. 10-2015-0095261 filed Jul. 3, 2015 and to Korean Patent Application No. 10-2016-0001996 filed Jan. 7, 2016, each of which are incorporated herein by reference into the present disclosure as if fully set forth herein.

TECHNICAL FIELD

The present disclosure relates to a method and apparatus for discovering a counterpart device in Device-to-Device (D2D) communication.

BACKGROUND ART

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in an mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate a propagation path loss in the mmWave band and increase propagation transmission distance.

Further, the 5G communication system has developed technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to the Internet of Things (IoT) network that exchanges and processes information between distributed components, such as objects and the like, in a human-oriented connection network in which humans generate and consume information. Internet of Everything (IoE) technology may be an example of a combination of IoT technology and big data processing technology through a connection with a cloud server.

In order to implement the IoT, research on technical factors such as sensing techniques, wired/wireless communication and network infrastructure, service interface technology, and security technology is required, and thus technologies such as a sensor network, Machine to Machine (M2M) communication, Machine Type Communication (MTC), and the like for a connection between objects are being developed.

In an IoT environment, an intelligent Internet Technology (IT) service for creating a new value for the human's life may be provided by collecting and analyzing data generated in connected objects. The IoT may be applied to fields, such as smart homes, smart buildings, smart cities, smart cars, connected cars, smart grids, health care, smart home appliances, or high-tech medical services, through the convergence of the conventional Information Technology (IT) and various industries.

Accordingly, various attempts to apply the 5G communication to the IoT network are made. For example, 5G communication technologies, such as a sensor network, Internet of Things, MTC, etc. are implemented by techniques such as beamforming, MIMO, and array antenna. The application of a cloud RAN as the big data processing technology may be an example of convergence of the 5G technology and the IoT technology.

A D2D communication system supports device to device direct communication as well as communication through a cellular base station (enhanced Node B: eNB or Base Station: BS), so as to meet a continuously increasing wireless data traffic (data traffic) demand and to support a higher data rate. In the D2D communication system, devices perform discovery of a counterpart terminal for performing direct communication or perform packet transmission and reception to and from the discovered counterpart device. According to a discovery procedure of the conventional D2D communication system, each device writes device information on its own or service information on its own using a simple identifier and transmits the same. A counterpart device, which has received a signal including the identifier of the device, accesses a D2D communication server to acquire device information or service information of the counterpart device. In order to acquire device information or service information from the D2D communication server, the counterpart device should access the D2D communication server. When the counterpart device is outside the coverage of a cellular base station, the access to the D2D communication server is not possible so that the counterpart device may not acquire the device information or service information.

If a device within the coverage of the cellular base station can relay the cellular base station and a counterpart device outside the coverage of the cellular base station, the counterpart device may acquire the device information or service information even if the counterpart device outside the coverage of the cellular base station may not access the D2D communication server. Therefore, a technology capable of performing a relaying role must be provided.

On the other hand, the study of vehicle to vehicle communication is actively done to implement a smart car or connected cars.

DETAILED DESCRIPTION OF THE INVENTION

Technical Problem

An embodiment of a first aspect of the present disclosure provides a method and apparatus for transmitting and receiving information in a communication system.

An embodiment of a first aspect of the present disclosure provides an apparatus and method for discovering a device, an application, a service, a group member, and a relay UE in a Device-to-Device (D2D) communication system.

An embodiment of a first aspect of the present disclosure proposes a method and apparatus that provide efficient discovery to a device outside the coverage of a cellular base station in a system in which a device within the coverage of the cellular base station and a device located outside the coverage of the cellular base station coexist.

An embodiment of a first aspect of the present disclosure provides an apparatus and method for discovering a group member UE without the assistance of the cellular base station in a D2D communication system.

An embodiment of a first aspect of the present disclosure provides an apparatus and method for discovering a relay UE which provides a connection to the cellular base station in a D2D communication system.

An embodiment of a first aspect of the present disclosure proposes an apparatus and method for discovering a relay UE which can provide discovery between devices outside the coverage of a cellular base station in the D2D communication system, or provide network connection to devices outside the coverage of the cellular base station.

An embodiment of a first aspect of the present disclosure proposes a discovery technique that can be applied to optimized and various D2D communication scenarios compared to the conventional D2D system.

On the other hand, according to a second aspect of the present disclosure, when a driver may experience various emergency situations while driving the vehicle, it is necessary to promptly notify of the emergency situation to those around the vehicle. In addition, an effective scheme is required to provide various information services for a vehicle running on the road as well as an emergency situation.

An embodiment of a second aspect of the present disclosure provides a method and apparatus for transmitting information on an event which has occurred on a device to other devices.

An embodiment of a second aspect of the present disclosure provides a method and apparatus for transmitting information on an event that has occurred on a device to other devices through device to device direct communication or a base station.

An embodiment of a second aspect of the present disclosure provides a method and apparatus for instructing a scheme for transmitting information on an emergency event that has occurred on a device to other devices.

An embodiment of a second aspect of the present disclosure provides a method and apparatus for distinguishing information on an emergency event that has occurred on a device from a non-emergency event, and transmitting the same.

An embodiment of a second aspect of the present disclosure provides a method and apparatus for operating resources for transmitting information on an event that has occurred on a device.

Technical Solution

In accordance with an embodiment of a first aspect of the present disclosure, there is provided a discovery method for device to device communication, including: generating a discovery signal including discovery information; selecting a transmission resource to transmit the discovery signal; transmitting the discovery signal through the selected transmission resource; and when a request signal for additional information on the discovery is received from a counterpart device that has received the discovery signal, transmitting a confirmation signal including the requested additional information to the counterpart device.

In the method, wherein the discovery signal includes at least one of a PDCP packet including a relay UE discovery indicator which is related to a relay UE that transmits the discovery signal, an MAC packet including a relay UE discovery indicator, a physical layer packet including the relay UE discovery identifier, and a resource allocation indicator which is masked by the relay UE discovery indicator. In addition, the MAC packet includes a version field, a reserved field, a source field, and a destination field, the version field is used to indicate a relay UE discovery or group member discovery, and one value of the reserved field is used to indicate the relay UE discovery or the group member discovery. In addition, the source field includes at least one of a relay UE identifier, a group identifier, and an application identifier, and the destination field includes a device for receiving the discovery signal or the group identifier.

In the method, the discovery signal includes at least one of a PDCP packet including a discovery indicator indicating that the discovery is performed to provide a service by a device for transmitting the discovery signal, an MAC packet including a discovery identifier, a physical layer packet including the discovery indicator, a resource allocation indicator which is masked by the discovery indicator, and a discovery message including a service layer signaling format.

In the method, the discovery signal includes an identifier indicating service information or group information provided by a device for transmitting the discovery signal.

In the method, the discovery information includes at least one of a relay UE identifier associated with a relay UE that transmits the discovery signal, a group identifier, a Public Land Mobile Network (PLMN) identifier, Access Point Name (APN) information, and an application identifier.

In the method, the discovery information includes at least one of a group identifier associated with a device for generating the discovery signal, a service identifier, and a device identifier.

The method further includes receiving a request signal from the counterpart device prior to transmitting the discovery signal. Here, the request signal includes at least one of a PDCP packet including a relay UE discovery indicator associated with a relay device for transmitting the discovery signal, a MAC packet including the relay UE discovery identifier, a physical layer packet including the relay UE discovery identifier, a resource allocation indicator which is masked by the relay UE discovery indicator, and a relay request message including a service layer signaling format. In addition, the request signal includes at least one of a PDCP packet including a group discovery request indicator, an MAC packet including the group discovery request indicator, a physical layer packet including a group discovery request identifier, a resource allocation indicator which is masked by the group discovery request indicator, and a group discovery request message including a service layer signaling format.

In the method, the request signal includes at least one of a device identifier associated with a device that transmits the request signal, a group identifier, a PLMN identifier, and APN information, and information on a physical channel used for the transmission of the discovery signal.

In the method, the additional information includes at least one of a device identifier associated with a device that transmits the discovery signal, a group identifier, a PLMN identifier, APN information, service identifier, service information, group information, and information on a physical channel used for the transmission of the discovery signal.

In accordance with an embodiment of a first aspect of the present disclosure, there is provided a discovery method for device to device communication, including: receiving a discovery signal including discovery information from a counterpart device; confirming the discovery information acquired from the discovery signal; transmitting, to the counterpart device, a request signal for additional information required for a discovery on the basis of the discovery information; and receiving, from the counterpart device, a confirmation signal including the additional information in response to the request signal.

In accordance with an embodiment of a first aspect of the present disclosure, there is provided an apparatus for performing device to device communication, including: a processor configured to generate a discovery signal including discovery information, and select a transmission resource to transmit the discovery signal; a transmitter configured to transmit the discovery signal through the selected transmission resource; and a receiver configured to receive a request signal for additional information related to discovery from the counterpart device which has received the discovery signal, wherein the processor controls the transmitter so as to transmit a confirmation signal including the requested additional information to the counterpart device.

In accordance with an embodiment of a first aspect of the present disclosure, there is provided an apparatus for performing device to device communication, including: a receiver configured to receive a discovery signal including discovery information from a counterpart device; a processor configured to check the discovery information acquired from the discovery signal; and a transmitter configured to transmit a request signal for additional information required to perform a discovery to the counterpart device based on the discovery signal, wherein the processor receives, from the counterpart device, a confirmation signal including the additional information through the receiver, in response to the request signal. In accordance with an embodiment of the present disclosure, there is provided a method for communication between devices, including: when an event occurs in a device, determining whether transmission of event information indicating the event occurrence to other devices within a predetermined range is possible within a predetermined time; when, as a result of the determination, the transmission of the event information is possible, transmitting the event information using a device to device direct communication method; and when, as a result of the determination, the transmission of the event information is not possible, transmitting the event information to other devices according to a local transmission method which bypasses a base station.

In the method, a process of transmitting according to the local transmission scheme includes: including, by a terminal that has received the event information, a local transmission indicator indicating to transmit the event information to the base station; and transmitting the event information including the local transmission indicator.

In the method, the event information is transmitted in a broadcast or unicast method.

The method further includes a process of including, in the event information, a relay indicator indicating to relay the event information to another terminal.

In the method, when the event is a predetermined emergency event, the event information is a code corresponding to the predetermined emergency event.

In the method, a process of transmitting according to the local transmission scheme includes a process of detecting an entity that can relay the event information to the base station, and a process of transmitting the event information to the detected entity.

In the method, when the event is a predetermined emergency event, the event information is transmitted through a carrier corresponding to the predetermined emergency event.

In the method, a resource for transmitting the event information is determined based on at least one of a requirement of a service associated with the event information, a probability of using the corresponding resource, and the number of entities to use the corresponding resource.

The method further includes transmitting resource allocation information indicating a resource to which the event information is transmitted.

In the method, when the event is an emergency event, the resource allocation information is masked by an identifier or a code indicating a service associated with the emergency event.

In accordance with an embodiment of a second aspect of the present disclosure, there is provided an apparatus for communication between devices, including: a controller configured to, when an event occurs in a device, determine whether transmission of event information indicating the event occurrence to other devices within a predetermined range is possible within a predetermined time; and a transceiver unit configured to, when, as a result of the determination, the transmission of the event information is possible, transmit the event information using a device to device communication method; and when, as a result of the determination, the transmission of the event information is not possible, transmit the event information to other devices according to a local transmission method which bypasses a base station.

BRIEF DESCRIPTION OF THE DRAWINGS

The above and other aspects, features, and advantages, according to specific exemplary embodiments of the present disclosure, will be more apparent from the following detailed description taken in conjunction with the accompanying drawings, in which.

MODE FOR CARRYING OUT THE INVENTION

Figure 1A:
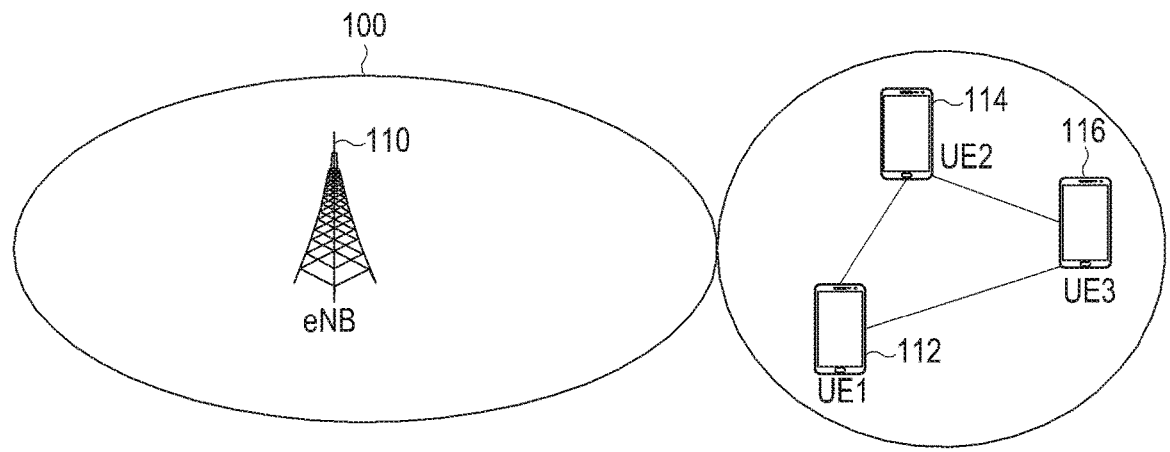
FIGS. 1A and 1B are diagrams schematically illustrating scenarios of device to device communication established outside the coverage of a cellular base station in a D2D communication system according to an embodiment of a first aspect of the present disclosure.

In the following description of the present disclosure, a detailed description of known configurations or functions incorporated herein will be omitted when it is determined that the detailed description may make the subject matter of the present disclosure unclear. Hereinafter, an embodiment of the present disclosure will be described in detail with reference to attached drawings.

Although embodiments of the present disclosure described below will be divided for the convenience of description, two or more embodiments may be combined within the range where the embodiments do not collide to each other.

Meanwhile, terms described later are defined in consideration of the functions of the present disclosure, but the meaning of the terms may be changed according to a user, intention of an operator, or convention. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present specification, the terms "include", "have", and their conjugates are intended merely to denote a certain feature, numeral, step, operation, element, component, or a combination thereof, and should not be construed to initially exclude the existence or a possibility of an addition of one or more other features, numerals, steps, operations, elements, components, or combinations thereof.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

Hereinafter, an embodiment of a first aspect of the present disclosure will be described with reference to FIGS. 1 and 15.

According to various embodiments of a first aspect of the present disclosure, an electronic device may include communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic accessory, an electronic tattoo, or a smart watch).

According to various embodiments of a first aspect of the present disclosure, the electronic device may be a smart home appliance with a communication function. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of a first aspect of the present disclosure, the terminal may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of a first aspect of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of a first aspect of the present disclosure, the electronic device may be a combination of the above-mentioned devices. Further, it will be apparent to those skilled in the art that the electronic device according to various embodiments of a first aspect of the present disclosure is not limited to the above-mentioned devices.

According to various embodiments of a first aspect of the present disclosure, a terminal (User Equipment, UE, hereinafter referred to as 'UE') may be an electronic device, as an example.

In addition, according to various embodiments of a first aspect of the present disclosure, the UE may operate as a signal transmission device and a signal reception device, as an example.

An embodiment of a first aspect of the present disclosure provides an apparatus and method for discovering a relay UE in a D2D communication system.

In addition, an embodiment of a first aspect of the present disclosure provides an apparatus and method for discovering a group member UE in a D2D communication system.

Hereinafter, a scenario of a D2D communication system will be described.

Figure 1B:
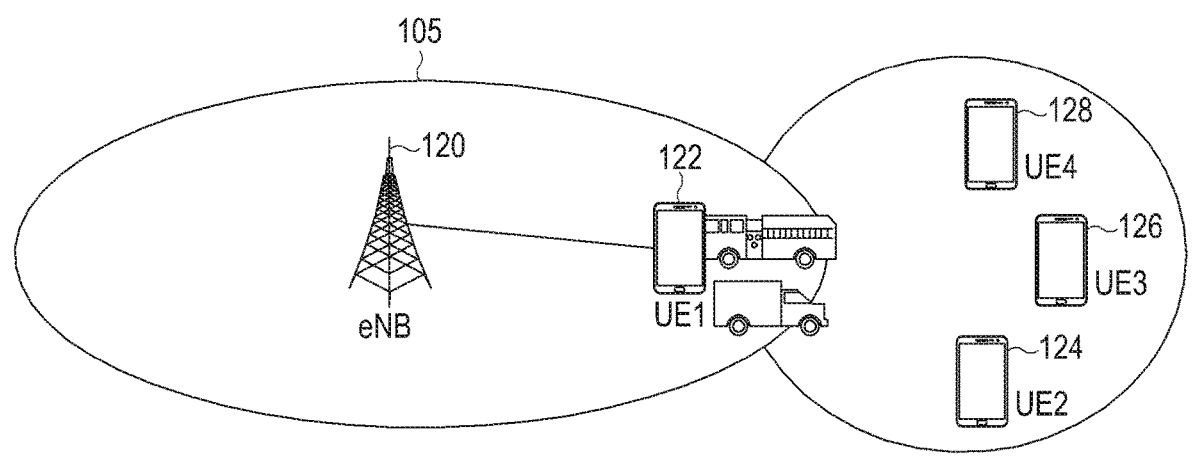

FIGS. 1A and 1B are diagrams schematically illustrating available scenarios in which device to device communication is established outside the coverage of a cellular base station in a D2D communication system.

Referring to FIG. 1A, in the D2D communication system, direct communication between devices (not shown) within the coverage 100 of a cellular base station (eNB) 110, and direct communication between UE1 112, UE2 114, and UE3 116 outside the coverage 100 of the cellular base station 110 may be established. This situation may be referred to as an out of coverage scenario. In order to perform direct communication between the UE1 112, UE2 114, and UE3 116 outside the coverage 100 of the cellular base station 110, the UE1 112, the UE2 114, or the UE3 116 require a scheme for discovering each other.

Referring to FIG. 1B, in the D2D communication system, a UE2 124, a UE3 126, or a UE4 128, which is a device outside the coverage 105 of the cellular base station 120, may perform D2D communication based on the support of the cellular base station 120 by configuring the device UE1

122 within the coverage 105 of the cellular base station 120 as a relay UE. This situation may be referred to as a partial coverage scenario.

Figure 2:
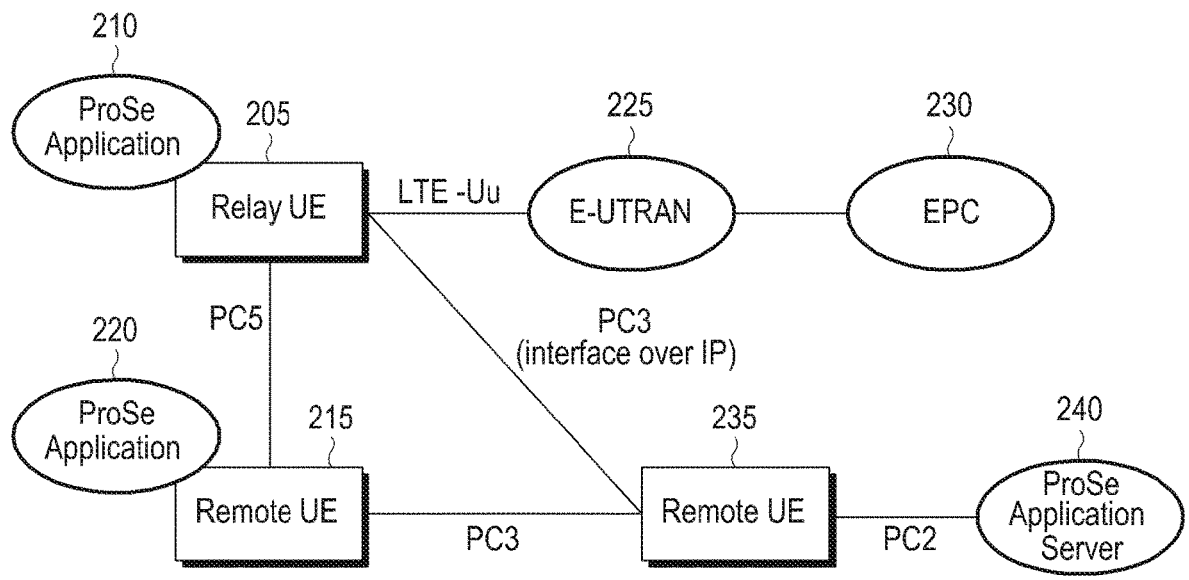
FIG. 2 illustrates a network structure of a D2D communication system according to an embodiment of a first aspect of the present disclosure.

FIG. 2 illustrates a network structure of a D2D communication system according to an embodiment of a first aspect of the present disclosure.

Referring to FIG. 2, an LTE and LTE-Advanced (LTE-A) system includes an Evolved-Universal. Mobile Telecommunications System (UMTS) Terrestrial Radio Access Network (E-UTRAN) 225 and an Evolved Packet Core network (EPC) subsystem 230. The EPC subsystem 230 is a full-IP system for supporting high packet data rate and low latency, and includes a Mobility Management Entity (MME) 235a and a Serving/Packet Gateway (S/PGW) 235b. The E-UTRAN 225 corresponds to an access network of an LTE system, and main elements of the E-UTRAN 225 are base stations (BSs) (referred to as evolved Node Bs (eNBs)) that can perform broadband communication with a terminal (User Equipment: UE) within the coverage.

The UE may perform D2D communication with adjacent one or more terminals, separately from broadband communication with the base station. A D2D method that can establish direct communication between adjacent devices based on the LTE is defined as a Proximity-based Service (ProSe), and a UE capable of establishing ProSe communication may process D2D signals and data including a D2D discovery signal (i.e., discovery information) by using a ProSe application layer.

The ProSe-enabled UEs 205 and 215 include ProSe applications 210 and 220, and the UE205 within the coverage may be provided with ProSe communication by the support of a base station of the E-UTRAN 225. In addition, the UE205 within the coverage may operate as a relay UE for the UE215 out of the coverage. In this case, the UE215 out of the coverage becomes a remote UE.

A ProSe application server 240 may provide an application function according to a ProSe service, and as an example, the application server 240 may be Public Safety Answering Points (PSAP) or commercial-purpose social media. The application server 240 may communicate with UEs 205 and 215 at the application level. For example, at least some of the UEs 205 and 215 may be a member of a group associated with the application server 240.

The ProSe function unit 235 may be a reference point between the application server 240, the EPC 230, and the UEs 205 and 215, and may be responsible for various operations, such as authorization, configuration, and charging of UEs which directly perform discovery and direct communication.

Figure 3:
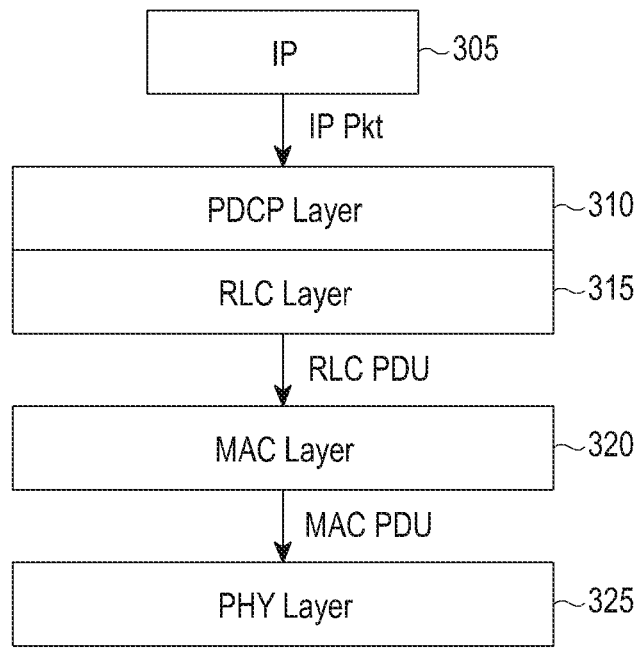
FIG. 3 illustrates a protocol stack for D2D data communication according to an embodiment of a first aspect of the present disclosure.

FIG. 3 illustrates a protocol stack for a D2D communication method according to an embodiment of a first aspect of the present disclosure.

Referring to FIG. 3, the protocol stack of a D2D UE includes a Physical Layer (PHY Layer) 325, a Media Access Control (MAC) layer 320, a Radio Link Control (RLC) layer 315, a Packet Data Convergence Protocol (PDCP) layer 310, and an IP layer 305. An IP packet, generated by the IP layer 305, is converted into a RLC Packet Datagram Unit (RLC PDU) by the PDCP layer 310 and RLC layer 315. The MAC layer 320 generates a MAC PDU from the RLC PDU, and the MAC PDU is carried on the physical layer PDU by the physical layer 325 and transmitted to a counterpart UE. The data received from the counterpart UE is processed through a flow in an opposite direction to a flow in a transmitting side.

Figure 4:
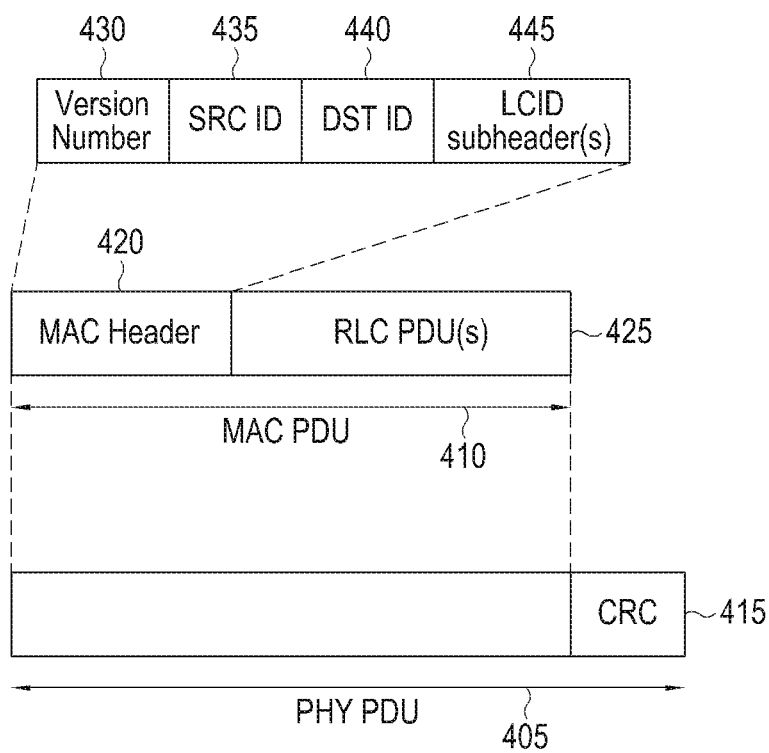
FIG. 4 illustrates a protocol layer-specific packet format according to an embodiment of a first aspect of the present disclosure.

FIG. 4 illustrates a protocol layer-specific packet format according to an embodiment of a first aspect of the present disclosure.

Referring to FIG. 4, the MAC layer 320 generates a MAC PDU 410 by attaching a MAC header 420 to RLC PDU(s) 425. The MAC header 420 includes a version number 430, a Source ID (SRC ID) 435, a destination ID (DST ID) 440, and a Logical Channel ID (LCID) sub-header(s) 445. The physical layer 325 generates a physical layer PDU 405 by attaching a Cyclic Redundancy Check code (CRC) 415 to the MAC PDU 410.

In order to support D2D communication-based discovery in an out-of-coverage scenario or a partial-coverage scenario, discovery information may be transmitted and received according to a protocol layer of FIG. 3.

Figure 5A:
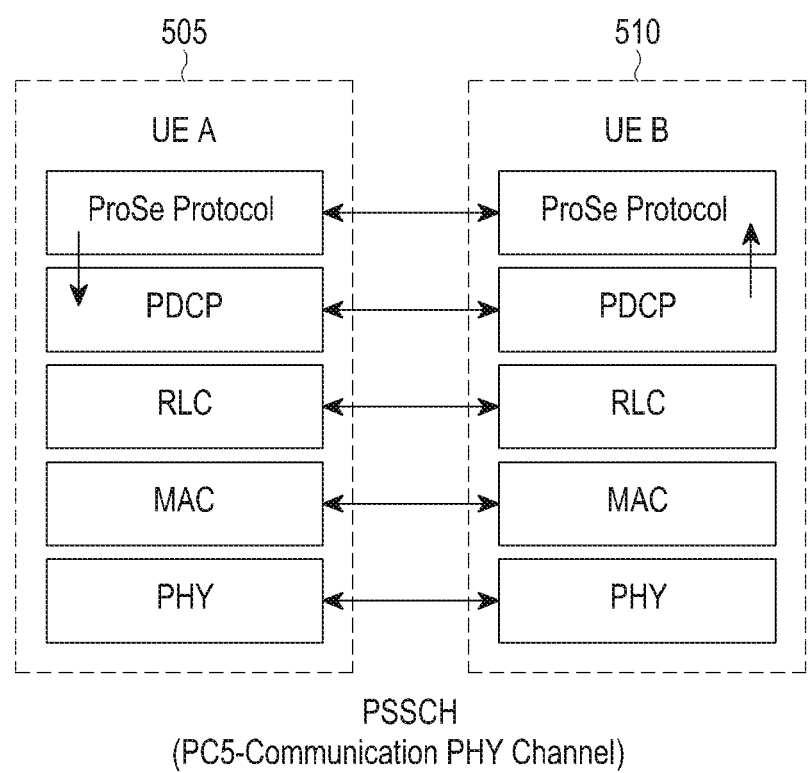
FIGS. 5A to 5C are diagrams schematically illustrating protocol stacks which process a discovery signal in a D2D communication system according to an embodiment of a first aspect of the present disclosure.
Figure 5B:
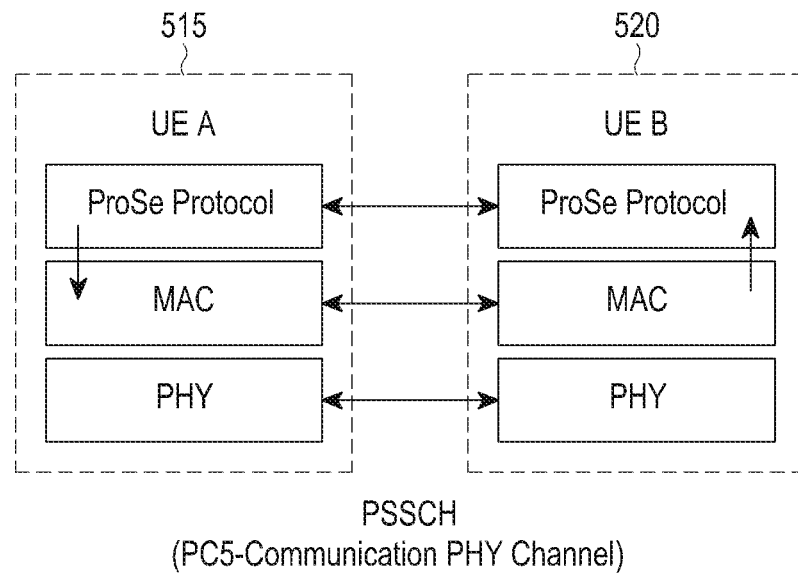
Figure 5C:
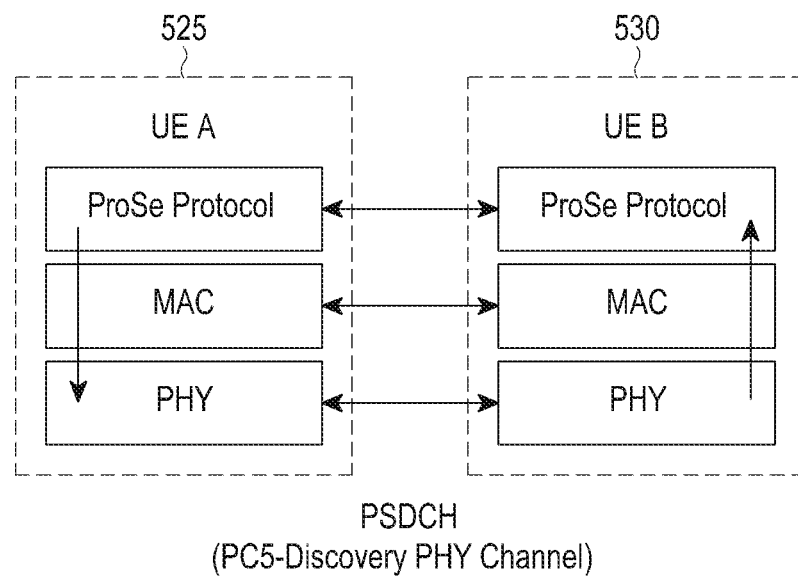

FIGS. 5A to 5C are diagrams schematically illustrating protocol stacks that process a D2D communication-based discovery signal according to embodiments of a first aspect of the present disclosure.

In FIG. 5A, a D2D discovery signal is transmitted through a Physical Side-link Shared Channel (PSSCH) that is a physical channel for D2D communication, and illustrates a protocol stack to be processed in the PDCP layer. In the UE A 505, which is the transmitting side, a ProSe protocol layer packet including discovery information generated by the ProSe protocol layer is transmitted to the PDCP layer. The PDCP layer, which has received a ProSe protocol layer packet including the discovery information transmitted from the ProSe protocol layer, transmits to a sub-RLC/MAC/PHY layer, information indicating that the discovery information corresponds to relay UE discovery or group member UE discovery together with the discovery information by including the same in the PDCP layer packet (i.e. PDCP PDU). The physical layer frame including the discovery information in the PHY layer is transmitted through the PSSCH.

In a UE B 510, which is a receiving side, the PDCP layer reconstructs the PDCP layer packet (i.e. PDCP PDU) from the packet received through the sub-PHY/MAC/RLC layer, identifies information indicating the relay UE discovery or group member UE discovery from the PDCP layer packet, and transfers, to the ProSe protocol layer, discovery information (i.e. ProSe protocol layer packet) extracted from the PDCP layer packet.

In another embodiment, in a protocol stack of FIG. 5A, the ProSe protocol layer on the transmission side UE A 505 may transfer, to a sub-PDCP/RLC/MAC/PHY layer, a packet including information indicating the relay UE discovery or group member UE discovery. The ProSe protocol layer of the receiving side UE B 510 reconstructs the ProSe protocol layer packet from the packet received from the sub-PHY/MAC/RLC/PDCP layer, and then extracts information indicating the relay UE discovery or group member UE discovery from the reconstructed ProSe protocol layer packet.

FIG. 5B illustrates a protocol stack in a case where a D2D discovery signal is transmitted through the PSSCH that is a physical channel for D2D communication and processed in the MAC layer. In a UE A 515 on the transmitting side, a ProSe protocol layer packet including discovery information generated by the ProSe protocol layer is transmitted to the MAC layer without processing the discovery information according to a first aspect in the PDCP layer. The MAC layer receives the discovery information, and when it is confirmed that the discovery information is information for the relay UE discovery or group member discovery, creates a MAC layer packet including information indicating the relay UE discovery or group member discovery and the ProSe protocol layer packet, and transfers the same to a sub PHY layer. The physical layer packet including the discovery information in the PHY layer is transmitted through the PSSCH.

In a UE B 520 on the receiving side, the MAC layer reconstructs the MAC layer packet from the packet received through the sub-PHY layer, then identifies information indicating the relay UE discovery or group member UE discovery from the MAC layer packet, and transfers, to the ProSe protocol layer, the discovery information (i.e. ProSe protocol layer packet) extracted from the MAC layer packet.

FIG. 5C illustrates a protocol stack in a case where a D2D discovery signal is transmitted through a Physical Side-link Discovery Channel (PSDCH) that is a physical channel for D2D discovery, and then processed in the PHY layer. In the UE A 525 on the transmitting side, a ProSe protocol layer packet including discovery information generated by the ProSe protocol layer is transmitted to the PHY layer without processing the discovery information according to a first aspect in the PDCP layer or the MAC layer. The PHY layer receives the discovery information, and when it is confirmed that the discovery information is information for relay UE discovery or group member UE discovery, substitutes the code corresponding to the relay UE discovery or group member UE discovery into the PHY resource corresponding to the ProSe protocol layer packet and transmits the same.

The PHY layer of the UE B 530 on the receiving side receives a code corresponding to the relay UE discovery or group member UE discovery transmitted from the PHY layer of the transmitting side. The code is transmitted to the ProSe protocol layer and then used to check whether the protocol layer packet includes discovery information for the relay UE discovery or the group member UE discovery.

The code corresponding to the relay UE discovery uses the same value around the world, uses the same value for each Public Land Mobile Network (PLMN), or uses the same value for each Access Point Name (APN) the code corresponding to the group member UE discovery uses the same value around the world, uses the same value for each PLMN, or uses the same value for each APN, or uses a value defined for a specific service.

In another embodiment, the relay UE discovery information or group member UE discovery information may be configured by a packet in the service layer or network layer format, and may be exchanged over a separate channel resource defined for the purpose of the relay UE discovery or group member UE discovery.

Figure 6:
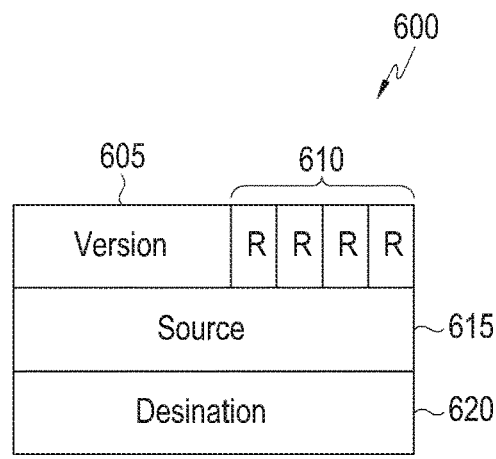
FIG. 6 is a diagram schematically illustrating an example of a MAC layer discovery packet structure in a D2D communication system according to an embodiment of a first aspect of the present disclosure.

FIG. 6 is a diagram schematically illustrating a structure of a discovery packet generated from the MAC layer in a D2D communication system according to an embodiment of a first aspect of the present disclosure.

Referring to FIG. 6, an MAC layer packet 600 includes a version field 605 indicating a version number, a reserved field 610 for a future use, a source field 615 indicating an address of a sender who transmits a D2D discovery signal, and a destination field 620 indicating an address of a recipient who receives a D2D discovery signal. The version field 605 is used as an indicator indicating the relay UE discovery (hereinafter referred to as a relay UE discovery indicator or ProSe Relay Discovery indication). In another embodiment, the version field 605 is used as an indicator indicating the group member discovery (hereinafter a group member discovery indicator). For example, a version field value of a relay UE discovery indicator packet is set to 'A' and a version field value of a group member discovery indicator packet is set to 'B'. In another embodiment, a value of the reserved field 610 may be used as the relay UE discovery indicator. In still another embodiment, a value of the reserved field 610 may be used as the group member discovery indicator. For example, if the reserved field 610 is assumed to be four bits, one bit is used as a relay UE discovery indicator and other bits are used as a group member discovery indicator. At this time, when the first bit value is set to 1, the packet indicates a relay UE discovery indicator packet, and when the second bit value is set to 1, the packet is used as a group member discovery indicator. As another example, when it is assumed that the reserved field 610 is four bits, one bit is used as the relay UE discovery indicator and group member discovery indicator, and one other bit is activated in a case where the first bit value is set to 1. When the value of one other bit is set to zero, the packet indicates the relay UE discovery packet indicator, and when the value of one other bit is set to 1, the packet indicates the group member discovery packet indicator.

The source field 615 is used as an identifier of a device for transmitting a D2D discovery signal. For example, when a device for transmitting a D2D discovery signal is a relay UE unit, a relay UE identifier is included in the source field 615. As another example, the source field 615 may include an application identifier. A destination field 620 is used as the identifier of a device or group for receiving the D2D discovery signal.

As another embodiment, the MAC layer packet corresponding to the D2D discovery signal may include a version field, a source field, and a reserved field. The version field is used as a relay UE discovery indicator. Alternatively, the version field is used as a group member discovery indicator. For example, a value of the version field of the relay UE discovery indicator packet is set to 'A' and a value of the version field of the group member discovery indicator packet is set to 'B'. Alternatively, one value of the reserved field is used as a relay UE discovery indicator. Alternatively, one value of the reserved field is used as a group member discovery indicator. For example, if the reserved field 610 is assumed to be four bits, one bit is used as a relay UE discovery indicator and other bits are used as a group member discovery indicator. At this time, when the first bit value is set to 1, the packet indicates a relay UE discovery indicator packet, and when the second bit value is set to 1, the packet is used as a group member discovery indicator. As another example, when it is assumed that the reserved field 610 is four bits, one bit is used as the relay UE discovery indicator and group member discovery indicator, and one other bit is activated in a case where the first bit value is set to 1. When the value of one other bit is set to zero, the packet indicates the relay UE discovery packet indicator, and when the value of one other bit is set to 1, the packet indicates the group member discovery packet indicator.

When the D2D discovery signal is used for the purpose of discovering a relay UE discovery, the source field includes the identifier of the relay UE or the identifier of a device for discovering the relay UE. When the D2D discovery signal is used for the purpose of discovering a group member UE, the source field includes the corresponding group identifier. As another example, when the D2D discovery signal is used for the purpose of discovering a group member UE, the source field may include an application identifier.

As another embodiment, the MAC layer packet corresponding to the D2D discovery signal includes a version field, and a reserved field for a future use. The version field is used as a relay UE discovery indicator. Alternatively, the version field is used as a group member discovery indicator. For example, a version field value of a relay UE discovery indicator packet is set to 'A' and a version field value of a group member discovery indicator packet is set to 'B'.

Alternatively, one value of the reserved field is used as a relay UE discovery indicator. Alternatively, one value of the reserved field is used as a group member discovery indicator. For example, if the reserved field 610 is assumed to be four bits, one bit is used as a relay UE discovery indicator and other bits are used as a group member discovery indicator. At this time, when the first bit value is set to 1, the packet indicates a relay UE discovery indicator packet, and when the second bit value is set to 1, the packet is used as a group member discovery indicator. As another example, when it is assumed that the reserved field 610 is four bits, one bit is used as the relay UE discovery indicator and group member discovery indicator, and one other bit is activated in a case where the first bit value is set to 1. When the value of one other bit is set to zero, the packet indicates the relay UE discovery packet indicator, and when the value of one other bit is set to 1, the packet indicates the group member discovery packet indicator.

As still another embodiment, a value of a version field of the MAC layer packet corresponding to the D2D discovery signal or the value of the reserved field may be used as a vehicle-to-vehicle (V2V) service message indicator or a vehicle-to-infrastructure (V2I) service message indicator or a vehicle-to-pedestrian (V2P) service message indicator. The MAC layer packet including the V2V service message indicator or V2I service message indicator or V2P service message indicator is used to load information on the V2V service or V2I service or V2P service.

In the above, the D2D discovery signal may be implemented in a MAC layer header or a MAC layer sub-header of the D2D communication system. Meanwhile, other discovery information, required for the relay UE discovery or group member discovery, for example, PLMN information and APN information may be included in a data part of the MAC layer packet and transmitted together with the aforementioned MAC layer header or the MAC layer sub-header.

Then, an embodiment in which relay UE discovery is performed by utilizing MAC layer signaling will be described with reference to FIG. 7 to FIG. 8.

Figure 7:
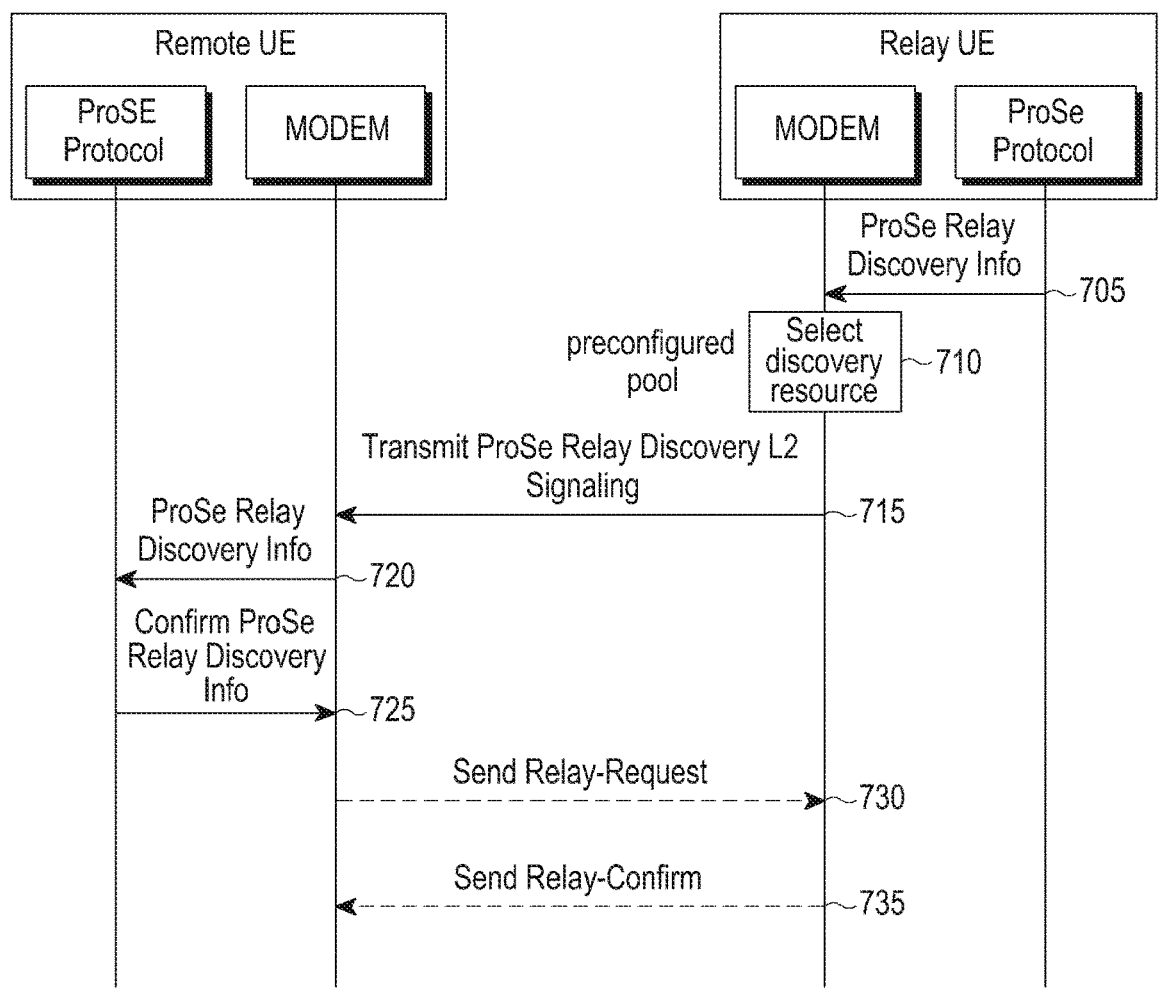
FIG. 7 is a diagram schematically illustrating an example of a signal flow of discovering a relay UE in a D2D communication system according to an embodiment of a first aspect of the present disclosure.

FIG. 7 is a diagram schematically illustrating an example of a signal flow of discovering a relay UE in a D2D communication system according to an embodiment of a first aspect of the present disclosure. Here, FIG. 7 illustrates communication between relay terminals having installed ProSe protocol applications therein (hereinafter referred to as a relay UE) similar to a remote terminal having installed a ProSe protocol application therein (hereinafter referred to as a remote UE).

Referring to FIG. 7, in operation 705, the ProSe protocol layer of the relay UE configures relay discovery information, that is, ProSe Relay Discovery Info, notifying that the UE itself operates as a relay UE to peripheral devices, and transmits the same to an L2 (2 Layer) within a modem of the relay UE. The relay UE discovery information includes at least one of the relay UE identifier, group identifier, PLMN identifier, and APN information. In operation 710, the relay UE processes the relay UE discovery information, received from the ProSe protocol layer, through an L2 layer, so as to generate a ProSe Relay Discovery L2 signaling, and also selects a transmission resource used for transmitting the L2 signaling. The transmission resource may be selected from a preconfigured resource pool in order to discover device to device communication. The manufacturer performs coding of the resource pool in the memory of the device, or the resource pool may be determined by a system operator and provided from a base station to a device through system information or control information. In operation 715, the relay UE transmits the L2 signaling through the selected transmission resource. The L2 signaling is generated such that the PDCP layer includes a relay UE discovery indicator or the MAC layer includes a relay UE discovery indicator. Alternatively, the physical layer of the relay UE may mask a resource allocation indicator (Scheduling Assignment: SA) indicating a transmission resource used for transmitting the L2 signaling with the relay UE discovery indicator, and transmit the same. When the SA indicator is masked with the relay UE discovery indicator, a relay UE request message configured by a service layer signaling format may be transmitted through the transmission resource.

In operation 720, the L2 layer of a remote UE, which has received the ProSe Relay Discovery L2 signaling, transfers the relay UE discovery information acquired through the L2 signaling to the ProSe protocol layer. In operation 725, the ProSe protocol layer checks the relay UE discovery information, and transmits a confirmation signal indicating that it has acquired relay discovery information to the L2 layer in a modem. On the other hand, when the relay UE discovery information, acquired through the L2 signaling, is not sufficient, that is, if the ProSe protocol layer of the remote UE requires additional information, the remote UE transmits, to the relay UE, relay-request signaling requesting additional information associated with relaying, in operation 730. In operation 735, the relay UE transmits Relay-Confirm signaling in response to the Relay-Request. The Relay-Confirm signaling includes additional information required to perform relay communication by the remote UE and relay UE. The L2 layer of the relay UE, if necessary, may be provided with the additional information through the ProSe protocol layer. The information additionally exchanged through the Relay-Request and Relay-Confirm signaling may include the PLMN identifier and/or APN information, as an example.

Here, a case where the ProSe Relay Discovery L2 signaling, transmitted by the relay UE, corresponds to the MAC layer L2 signaling will be described, as an example.

The ProSe Relay Discovery L2 signaling includes at least one of information on the relay UE indicator, information on the relay UE identifier, information on the group identifier supported by the relay UE, the PLMN identifier, APN information and the like. The remote UE may select a relay UE by receiving the ProSe Relay Discovery L2 signaling, and may transmit Relay-Request signaling to the relay UE in order to start an operation for establishing a connection to the network through the relay UE. The Relay-Request signaling may be transmitted even when the remote UE requires additional information to select a relay UE. The relay UE, which has received the Relay-Request signaling, transmits the Relay-signaling in response thereto, and the relay UE-Confirm signaling may include information required to provide connectivity between the remote UE and the network.

Figure 8:
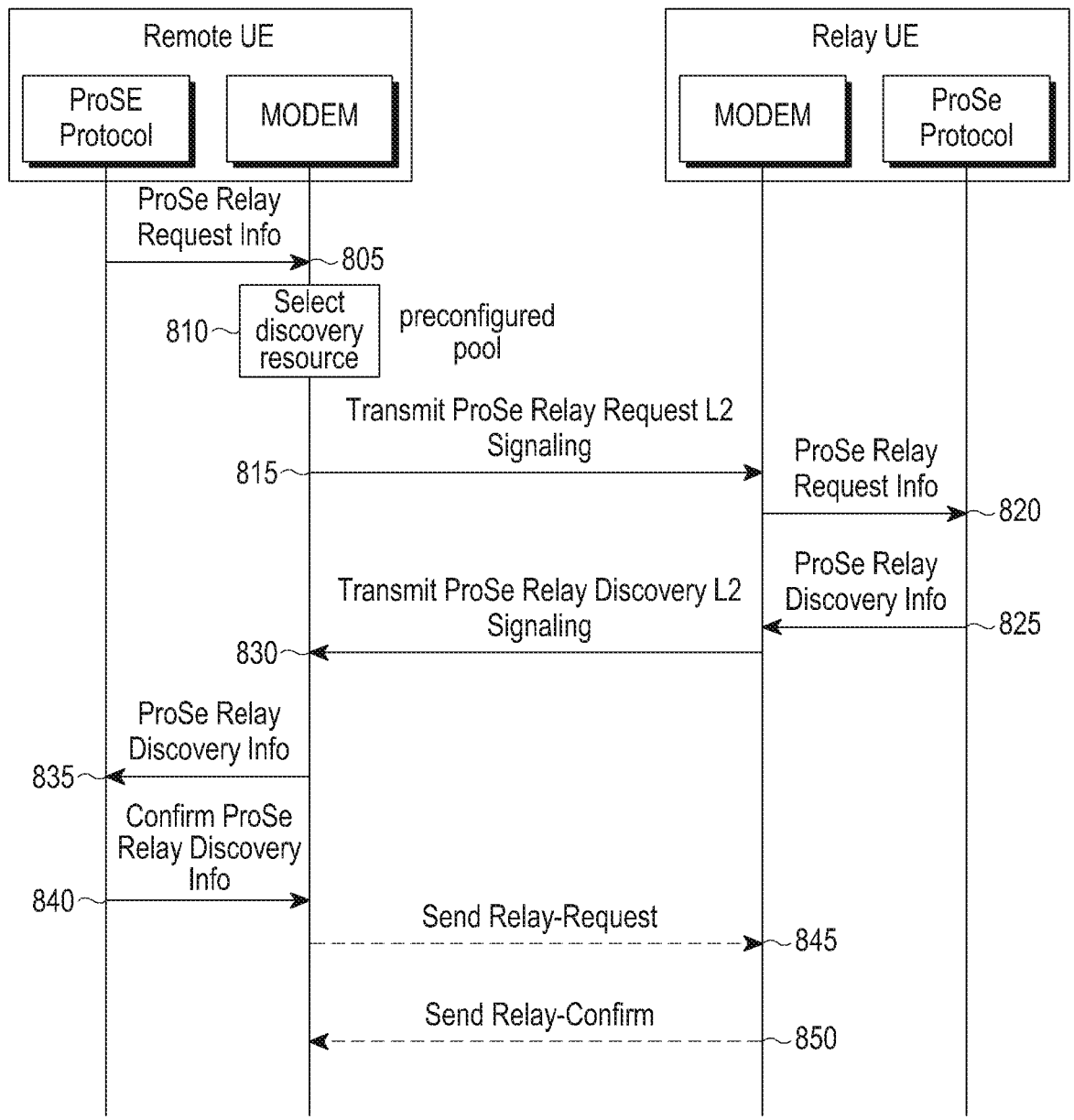
FIG. 8 is a diagram schematically illustrating an example of a signal flow of discovering a relay UE in a D2D communication system according to another embodiment of a first aspect of the present disclosure.

FIG. 8 is a diagram schematically illustrating an example of a signal flow of discovering a relay UE in a D2D communication system according to another embodiment of a first aspect of the present disclosure. Here, FIG. 8 illustrates communication between relay terminals having installed ProSe protocol applications therein (hereinafter referred to as a relay UE) similar to a remote terminal having installed a ProSe protocol application therein (hereinafter referred to as a remote UE).

Referring to FIG. 8, in operation 805, ProSe protocol layer of the remote UE configures Relay Request information for discovering for a neighboring relay UE in order to ensure the connectivity to the network, and transmits the same to the L2 layer within a modem of the remote UE. The relay UE request information includes at least one of the UE identifier, group identifier, relay UE discovery indicator, PLMN identifier, and APN information. In operation 810, the remote UE processes the relay request information, received from the ProSe protocol layer, through the L2 layer, so as to generate a ProSe Relay Request L2 signaling, and also select a transmission resource used for transmitting the L2 signaling. In operation 815, the remote UE transmits the L2 signaling through the selected transmission resource. The L2 signaling is generated such that the PDCP layer includes a relay UE discovery indicator or the MAC layer includes a relay UE discovery indicator. Alternatively, the physical layer of the relay UE may mask a resource allocation indicator (Scheduling Assignment: SA) indicating a transmission resource used for transmitting the L2 signaling with the relay UE discovery indicator, and transmit the same.

In operation 820, the L2 layer of a relay UE, which has received the ProSe Relay Request L2 signaling, transfers the relay UE request information acquired through the L2 signaling to the ProSe protocol layer. In operation 825, the ProSe protocol layer checks the relay UE request information, configures relay UE discovery information notifying that the UE itself operates as a relay UE, and transmits the same to the L2 layer. The relay UE discovery information includes at least one of the relay UE identifier, group identifier, PLMN identifier, and APN information. In operation 830, the relay UE processes the relay UE discovery information, received from the ProSe protocol layer through the L2 layer, so as to generate ProSe Relay Discovery L2 signaling, and selects a transmission resource used for transmitting the L2 signaling, and then transmits the L2 signaling through the selected transmission resource. The L2 signaling is generated such that the PDCP layer includes a relay UE discovery indicator or the MAC layer includes a relay UE discovery indicator. Alternatively, the physical layer of the relay UE may mask a resource allocation indicator (Scheduling Assignment: SA) indicating a transmission resource used for transmitting the L2 signaling with the relay UE discovery indicator, and transmit the same. When the SA indicator is masked by a relay UE discovery indicator, a relay request message configured by a service layer signaling format may be transmitted through the transmission resource.

In operation 835, the L2 layer of a remote UE, which received the ProSe Relay Discovery L2 signaling, transfers the relay UE discovery information acquired through the L2 signaling to the ProSe protocol layer. In operation 840, the ProSe protocol layer checks the relay UE discovery information, and transmits a confirmation signal indicating that it has acquired relay UE discovery information to the L2 layer in a modem. In operation 845, the remote UE selects a relay UE based on the relay UE discovery information, and transmits Relay-Request signaling in order to start an operation of establishing a connection to the network through the relay UE. The Relay-Request signaling may be transmitted even when the remote UE requires additional information to select a relay UE. In operation 850, the relay UE, which has received the Relay-Request signaling, transmits Relay-Confirm signaling in response thereto, and the Relay-Confirm signaling may include additional information required to provide the connectivity between the remote UE and the network. As an example, the Relay-Confirm signaling may include information, which is not included in the ProSe Relay Discovery L2 signaling, such as PLMN identifiers and/or APN information. To this end, L2 layer of the relay UE may receive, from the ProSe protocol layer, information to be included in the Relay-Confirm signaling.

Then, an embodiment in which a group member UE discovery is performed by utilizing MAC layer signaling will be described with reference to FIG. 9 to FIG. 10.

Figure 9:
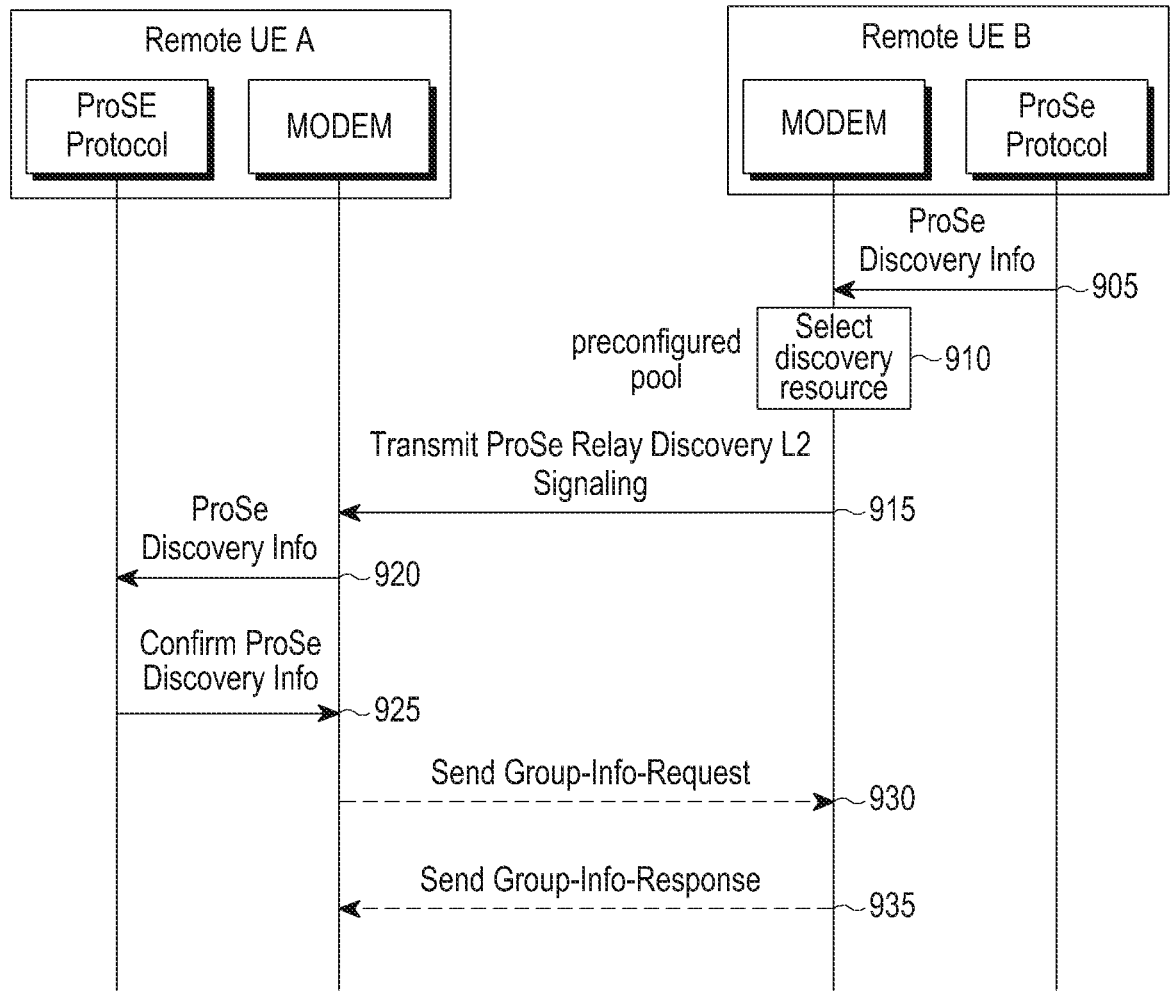
FIG. 9 is a diagram schematically illustrating an example of a signal flow of discovering a group member UE in a D2D communication system according to an embodiment of a first aspect of the present disclosure.

FIG. 9 is a diagram schematically illustrating an example of a signal flow of discovering a group member UE in a D2D communication system according to an embodiment of a first aspect of the present disclosure. Here, communication between remote terminals A and B (hereinafter referred to as remote UE A and remote UE B) are shown, in which ProSe protocol applications are installed. Here, the remote UE B may be a device which is already performing D2D communication, belonging to a group for the D2D communication, or may be a device that provides a specific service.

Referring to FIG. 9, in operation 905, the ProSe protocol layer of the remote UE B configures discovery information to be transmitted to the peripheral device in order to provide a ProSe service, and transmits the discovery information to the L2 layer. The discovery information includes at least one of the group identifier, the service identifier, and the device identifier. In operation 910, the remote UE B processes discovery information, received from the ProSe protocol layer, through the L2 layer, so as to generate ProSe Discovery L2 signaling, and also selects a transmission resource used for transmitting the L2 signaling. In operation 915, the remote UE B transmits the L2 signaling through the selected transmission resource. The L2 signaling is generated such that the PDCP layer includes a discovery indicator indicating that the discovery is performed to provide a service or the MAC layer includes the discovery indicator. Alternatively, the physical layer of the remote UE B may mask a resource allocation indicator (Scheduling Assignment: SA) indicating a transmission resource used for transmitting the L2 signaling with the discovery indicator, and transmit the same. When the SA indicator is masked by the discovery indicator, a discovery message including a service layer signaling format may be transmitted through the transmission resource.

In operation 920, the L2 layer of a remote UE A, which has received the ProSe Discovery L2 signaling, transfers the discovery information acquired through the L2 signaling to the ProSe protocol layer. In operation 925, the ProSe protocol layer checks the service providing of the remote UE B through the discovery information of the remote UE B, and transmits a confirmation signal indicating that it has acquired discovery information to the L2 layer in the modem. In order for the remote UE A to perform communication with the remote UE B, in other words, in order to receive a service provided by the remote UE B, or join in the group of the remote UE B, the remote UE A utilizes discovery information received from the remote UE B.

If the discovery information acquired through the ProSe Discovery L2 signaling is not sufficient, in operation 930, the remote UE A transmits Group-Info-Request signaling for additional information on the service or additional information on the group to the remote UE B. In operation 935, the remote UE B transmits Group-Info-Response signaling as a response to the Group-Info-Request. The Group-Info-Response signaling may include additional information required for performing ProSe communication by the remote unit A and remote UE B, and if necessary, the L2 layer of the remote UE A may receive the request for the additional information from the ProSe protocol layer. Information that is additionally exchanged through the Group-Info-Request and the Group-Info Response signaling may include a service identifier, service information, and/or group information as an example. To this end, L2 layer of the remote UE B may receive, from the ProSe protocol layer, information to be included in the Group-Info-Response signaling.

Figure 10:
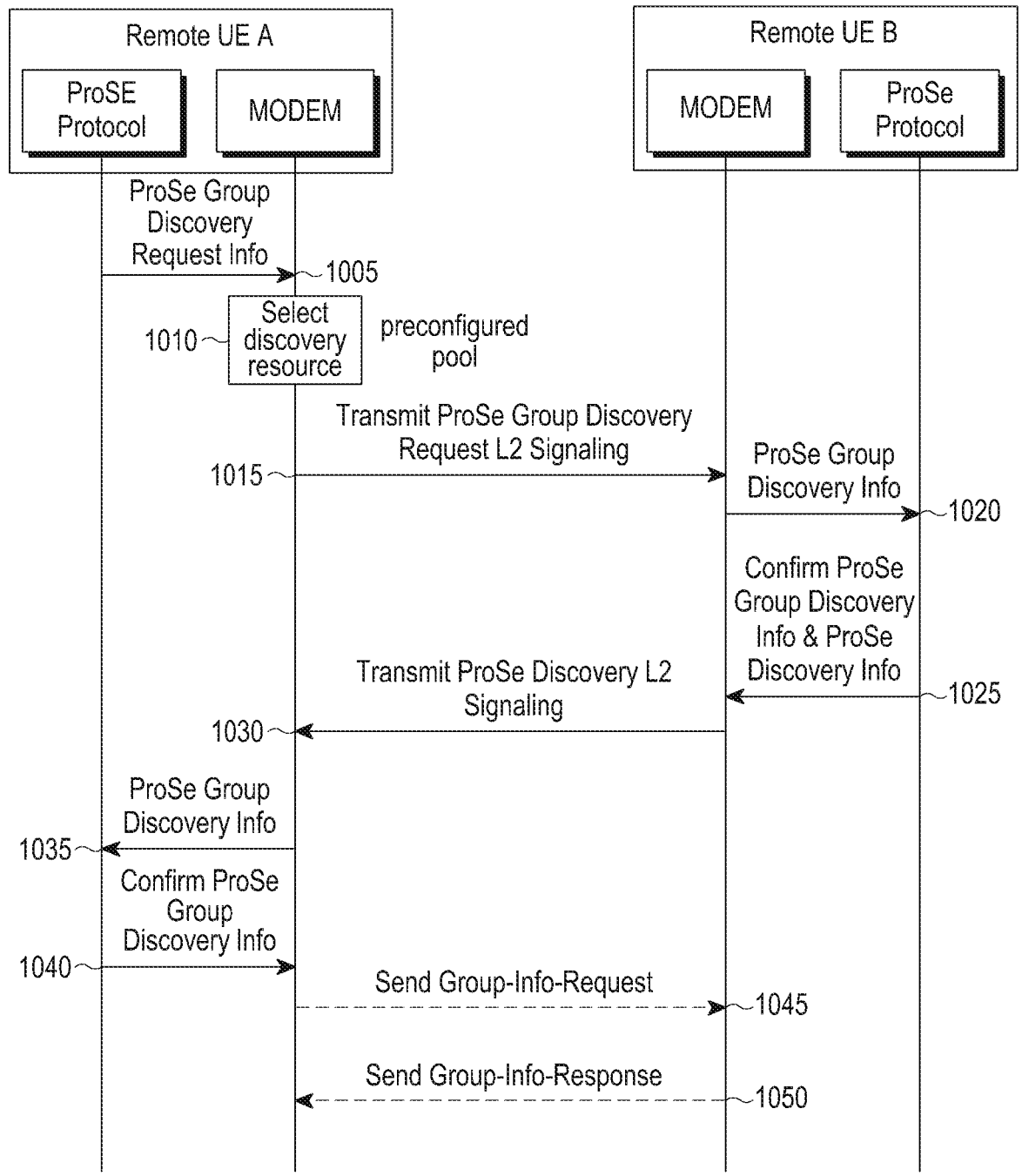
FIG. 10 is a diagram schematically illustrating an example of a signal flow of discovering a group member UE in a D2D communication system according to another embodiment of a first aspect of the present disclosure.

FIG. 10 is a diagram schematically illustrating an example of a signal flow of discovering a group member UE in a D2D communication system according to another embodiment of a first aspect of the present disclosure. Here, communication between remote terminals A and B (hereinafter referred to as remote UE A and remote UE B), equipped with a ProSe protocol application, are shown. Here, the remote UE B may be a device which is already performing D2D communication, belonging to a group for the D2D communication, or may be a device that provides a specific service.

Referring to FIG. 10, in operation 1005, the ProSe protocol layer of the remote UE A configures Group Discovery Request information for discovering for a peripheral device in order to participate in the communication in a specific service or a specific group. The group discovery request information is to request discovery information, and may include at least one of a device identifier, group identifier, and a service identifier. In operation 1010, the remote UE A processes the group discovery request information, received from the ProSe protocol layer, through the L2 layer, so as to generate ProSe Group Discovery Request L2 signaling, and also selects a transmission resource to be used for transmit the L2 signaling. In operation 1015, the remote UE A transmits the L2 signaling through the selected transmission resource. The L2 signaling is generated such that the PDCP layer includes a group discovery request indicator indicating a signal for requesting the group discovery or the MAC layer includes the group discovery indicator. Alternatively, the physical layer of the remote UE A may mask a resource allocation indicator (Scheduling Assignment: SA) indicating a transmission resource used for transmitting the L2 signaling with the group discovery indicator, and transmit the same. When the SA indicator is masked with the group discovery indicator, a group discovery request message consisted of a service layer signaling format may be transmitted through the transmission resource.

In operation 1020, the L2 layer of a remote UE B, which has received the ProSe Group Discovery Request L2 signaling, transfers the group discovery information acquired through the L2 signaling to the ProSe protocol layer. In operation 1025, the ProSe protocol layer checks the group discovery request information, configures group discovery information to be transmitted to the remote UE A to provide the ProSe service of the remote UE B, and transfers the group discovery information to the L2 layer. The group discovery information includes at least one of the group identifier, the service identifier, and the device identifier. In operation 1030, a modem of the remote UE B processes the group discovery information, received from the ProSe protocol layer, through the L2 layer so as to generate ProSe Discovery L2 signaling, and selects a transmission resource used for transmitting the L2 signaling, and then transmits the L2 signaling through the selected transmission resource. The L2 signaling is generated such that the PDCP layer includes a discovery indicator or the MAC layer includes a discovery indicator. Alternatively, the physical layer of the relay UE may mask a resource allocation indicator (Scheduling Assignment: SA) indicating a transmission resource used for transmitting the L2 signaling with the discovery indicator, and transmit the same. When the SA indicator is masked with the discovery indicator, a discovery message consisted of a service layer signaling format may be transmitted through the transmission resource.

In operation 1035, the L2 layer of the remote UE A, which has received the ProSe Discovery L2 signaling, transfers the discovery information acquired through the L2 signaling to the ProSe protocol layer. In operation 1040, the ProSe protocol layer checks the group discovery information of the remote UE B, and transmits a confirmation signal indicating that it has acquired the group discovery information to the L2 layer in a modem. In order for the remote UE A to perform communication with the remote UE B, in other words, in order to receive a service provided by the remote UE B, or join in the group of the remote UE B, the remote UE A utilizes the group discovery information received from the remote UE B.

If the group discovery information acquired through the ProSe Discovery L2 signaling is not sufficient in operation 1045, the remote UE A transmits Group-Info-Request signaling for additional information on the service or additional information on the group to the remote UE B. In operation 1050, the remote UE B transmits Group-Info-Response signaling as a response to the Group-Info-Request. The Group-Info Response signaling includes additional information, which is required for performing ProSe communication by the remote UE A and remote UE B. The L2 layer of the remote UE A, if necessary, may be provided with the additional information through the ProSe protocol layer. Information that is additionally exchanged through the Group-Info-Request and the Group-Info Response signaling may include a service identifier, service information, and/or group information as an example.

As another embodiment, a service message processing for a vehicle device, an infrastructure device, a pedestrian device, which supports a vehicle-to-vehicle service or a vehicle-to-infrastructure service or a vehicle-to-pedestrian service, will be described. The vehicle device may use the L2 signaling format described above to transfer the vehicle-to-vehicle service message or vehicle-to-infrastructure service message or a vehicle-to-pedestrian service message to a counterpart vehicle device, infrastructure device, or pedestrian device.

Alternatively, the vehicle device may mask the SA indicator to be used for transmitting the vehicle-to-vehicle service or a vehicle-to-infrastructure service or a vehicle-to-pedestrian service with vehicle communication service indication information, so as to indicate that the message transmitted from the allocated transmission resource corresponds to the vehicle-to-vehicle service message or vehicle-to-infrastructure service message or a vehicle-to-pedestrian service message to the counterpart vehicle, infrastructure, or pedestrian.

The vehicle communication serve message, which is transmitted by the infrastructure device to the vehicle device or pedestrian device, may be configured according to at least one of embodiments of a first aspect of the present disclosure. Alternatively, the vehicle communication service message, which is transmitted by the pedestrian device to the infrastructure device or vehicle device, may be configured according to at least one of the embodiments of a first aspect of the present disclosure.

Then, an embodiment in which relay UE discovery is performed by utilizing the discovery identifier of the physical layer will be described with reference to FIG. 11 to FIG. 12.

Figure 11:
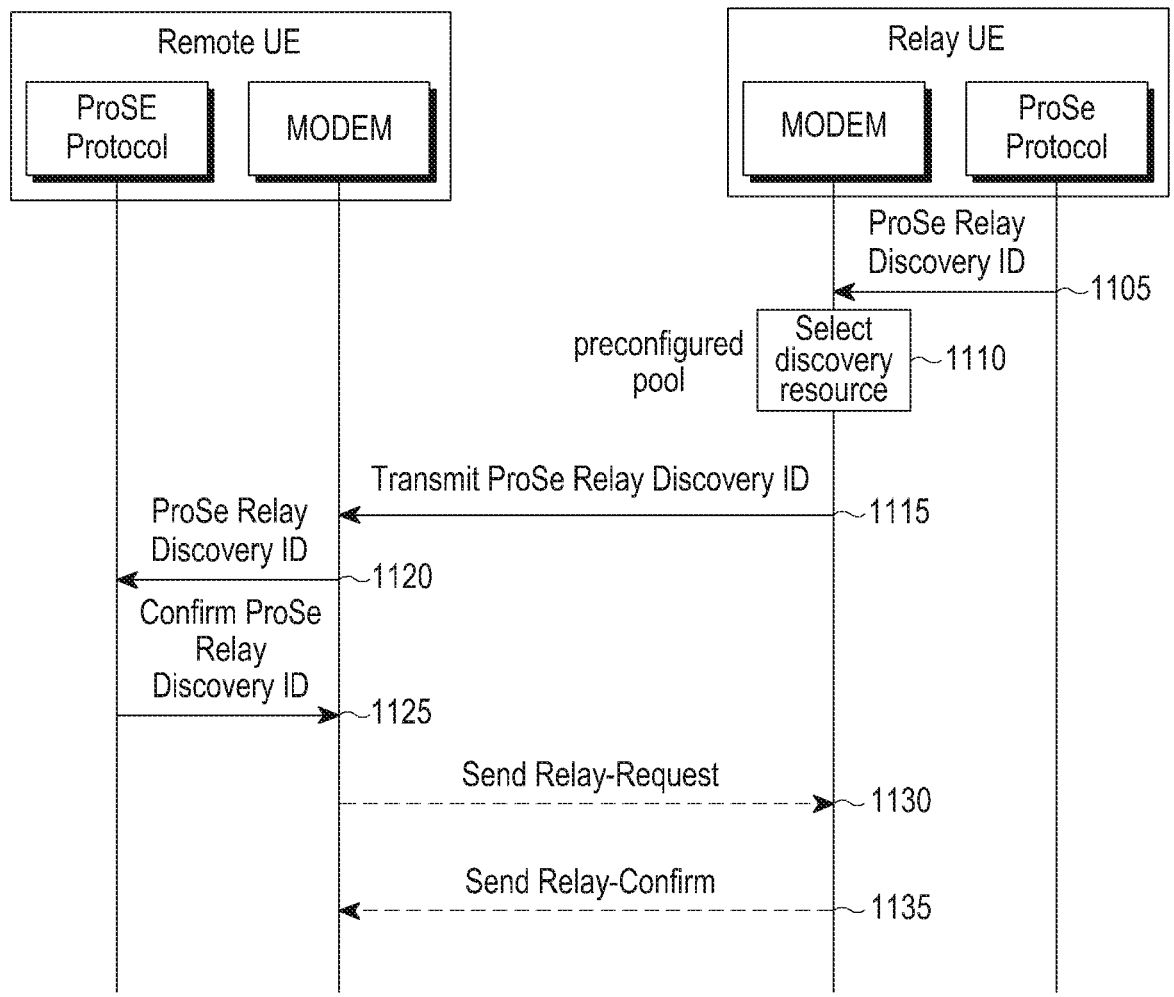
FIG. 11 is a diagram schematically illustrating an example of a signal flow of discovering a relay UE in a D2D communication system according to still another embodiment of a first aspect of the present disclosure.

FIG. 11 is a diagram schematically illustrating an example of a signal flow of discovering a relay UE in a D2D communication system according to still another embodiment of a first aspect of the present disclosure. Here, FIG. 11 illustrates communication between relay terminals having installed ProSe protocol applications therein (hereinafter referred to as a relay UE) similar to a remote terminal having installed a ProSe protocol application therein (hereinafter referred to as a remote UE).

Referring to FIG. 11, in operation 1105, the ProSe protocol layer of the relay UE configures relay UE discovery information, that is, ProSe Relay Discovery ID, notifying of the UE itself operates as a relay UE to peripheral devices, and transmits the same to a modem of the relay UE. The relay UE discovery information is the identifier for identifying the relay UE, and may be an application. ID, as an example. In operation 1110, the modem of the relay UE selects a transmission resource to transmit the relay UE discovery information, and in operation 1115, the relay UE discovery information is transmitted using a PHY channel corresponding to the selected transmission resource. ProSe Relay Discovery ID that identifies the relay UE is used by the same value around the world, or the same value for each PLMN, or the same value for each APN. In operation 1120, the modem of the remote UE that has received the ProSe Relay Discovery ID transmits the ProSe Relay Discovery ID to the ProSe protocol layer. In operation 1125, the ProSe protocol layer checks the ProSe Relay Discovery ID, and transmits a confirmation signal indicating that it has acquired the relay UE discovery information to the modem.

In operation 1130, the modem of the remote UE may transmit Relay-Request signaling in order to acquire information on the relay UE which has transmitted the ProSe Relay Discovery ID and detailed information required for network connection. The Relay-Request signaling includes PHY channel information indicating a PHY channel to which the ProSe Relay Discovery ID is transmitted. In addition, the Relay-Request signaling may include at least one of an identifier of the remote UE, a group identifier, a PLMN identifier, and APN information. The relay UE, Which has received the Relay-Request signaling, determines whether the device itself is a target relay UE corresponding to the Relay-Request signaling based on the PHY channel information. In operation 1115, when the PHY channel information corresponds to a PHY channel to which the ProSe Relay Discovery ID is transmitted by the relay UE, in operation 1135, the relay UE determines that the relay UE itself is a target relay UE of the ProSe Relay Discovery ID, and transmits, to the remoter UE, Relay-Confirm signaling including at least one of the remote UE identifier, group identifier, PLMN identifier, APN information, and PHY channel information. To this end, the modem of the relay UE may receive, from the ProSe protocol layer, information to be included in the Relay-Confirm signaling.

Figure 12:
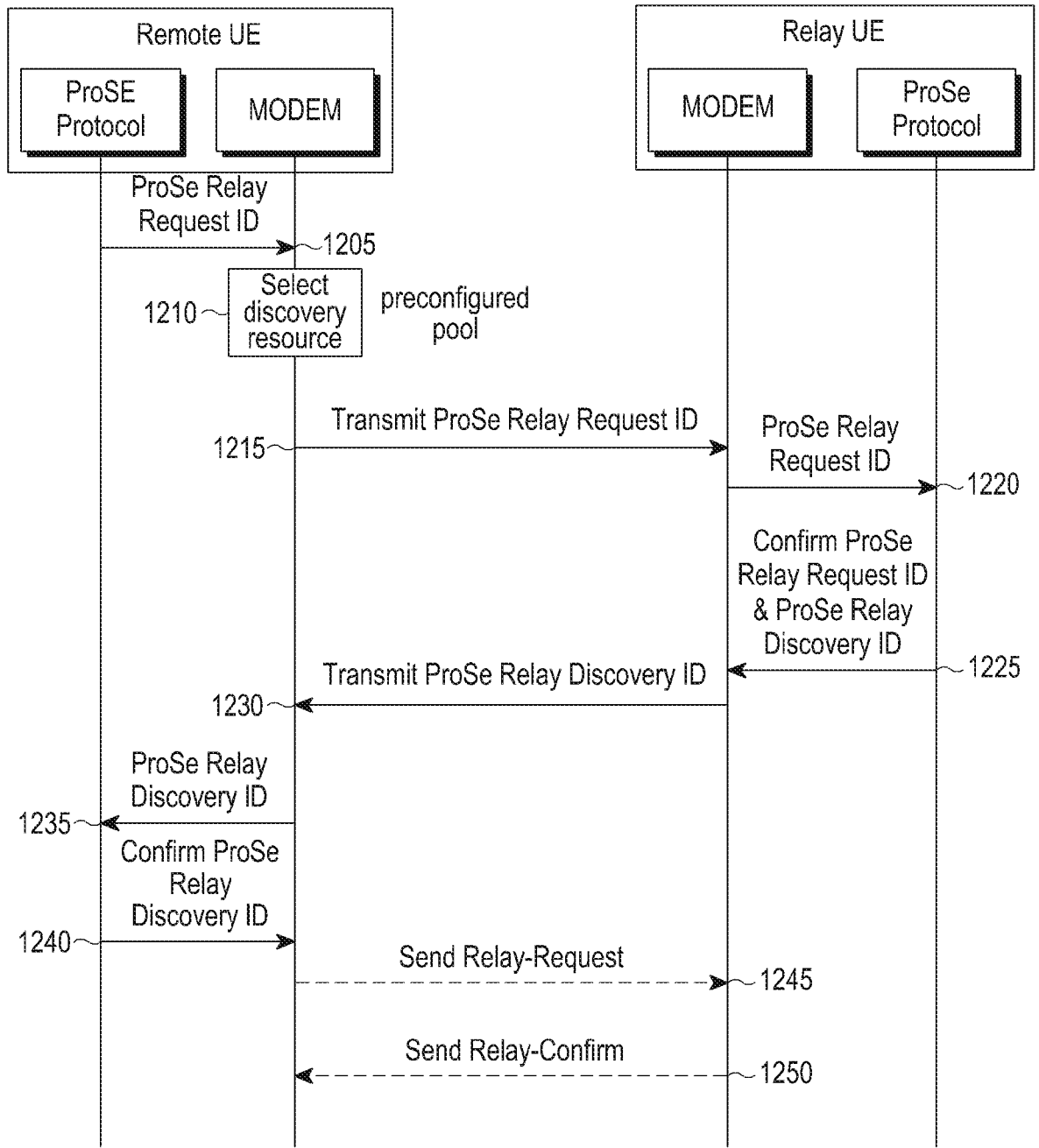
FIG. 12 is a diagram schematically illustrating an example of a signal flow of discovering a relay UE in a D2D communication system according to still another embodiment of a first aspect of the present disclosure.

FIG. 12 is a diagram schematically illustrating an example of a signal flow of discovering a relay UE in a D2D communication system according to still another embodiment of a first aspect of the present disclosure. Here, FIG. 12 illustrates communication between relay terminals having installed ProSe protocol applications therein (hereinafter referred to as a relay UE) similar to a remote terminal having installed a ProSe protocol application therein (hereinafter referred to as a remote UE).

Referring to FIG. 12, in operation 1205, the ProSe protocol layer of the remote UE configures the relay UE request information to discover neighboring relay UEs and transfers the same to the modem of the remote UE. The relay UE request information indicates information requesting the relay UE, and may be a ProSe Relay Request ID, as an example. The ProSe Relay Request ID may have the same values around the world. In operation 1210, the modem of the remote UE selects a transmission resource by which the ProSe Relay Request ID is transmitted, and in operation 1215, the modem transmits the ProSe Relay Request ID through the PHY channel corresponding to the selected transmission resource.

In operation 1220, the modem of the remote UE that has received the ProSe Relay Request ID transmits the ProSe Relay Request ID to the ProSe protocol layer. In operation 1225, the ProSe protocol layer configures the relay UE discovery information notifying of the UE itself operates as a relay UE in response to the ProSe Relay Request ID and transmits the same to the modern. The relay UE discovery information is the identifier for identifying the relay UE, and may be an application ID, as an example. The ProSe protocol layer may transfer the relay UE discovery information along with the confirmation of the ProSe Relay Request ID to the modem.

In operation 1230, the modem of the relay UE selects a transmission resource to be used for transmitting the ProSe Relay Discovery ID corresponding to the relay UE discovery information, and transmits the ProSe Relay Discovery ID using a PHY channel corresponding to the selected transmission resource. The ProSe Relay Discovery ID may be used by the same value around the world, the same value for each PLMN, or the same value for each APN.

In operation 1235, the modem of the remote UE that has received the ProSe Relay Discovery ID transmits the ProSe Relay Discovery ID to the ProSe protocol layer. In operation 1240, the ProSe protocol layer acquires the ProSe Relay Discovery ID, and transfers a confirmation signal indicating that it has acquired the ProSe Relay Discovery ID to the modem.

In operation 1245, the remote UE may transmit Relay-Request signaling in order to acquire information on the relay UE which has transmitted the ProSe Relay Discovery ID and detailed information required for network connection. The Relay-Request signaling includes PHY channel information indicating a PHY channel to which the ProSe Relay Discovery ID is transmitted. In addition, the Relay-Request signaling may include at least one of an identifier of the remote UE, a group identifier, a PLMN identifier, and APN information. The relay UE, which has received the Relay-Request signaling, determines whether the UE itself is a target relay UE corresponding to the Relay-Request signaling based on the PHY channel information. In operation 1230, when the PHY channel information corresponds to a PHY channel to which the ProSe Relay Discovery ID is transmitted by the relay UE, in operation 1250, the relay UE determines that the relay UE itself is a target relay UE of the ProSe Relay Discovery ID, and transmits, to the remote UE, Relay-Confirm signaling including at least one of the remote UE identifier, group Identifier, PLMN identifier, APN information, and PHY channel information. To this end, the modem of the relay UE may receive, from the ProSe protocol layer, information to be included in the Relay-Confirm signaling.

Then, an embodiment in which a group member UE discovery is performed by utilizing a discovery identifier technique will be described with reference to FIG. 13 to FIG. 14.

Figure 13:
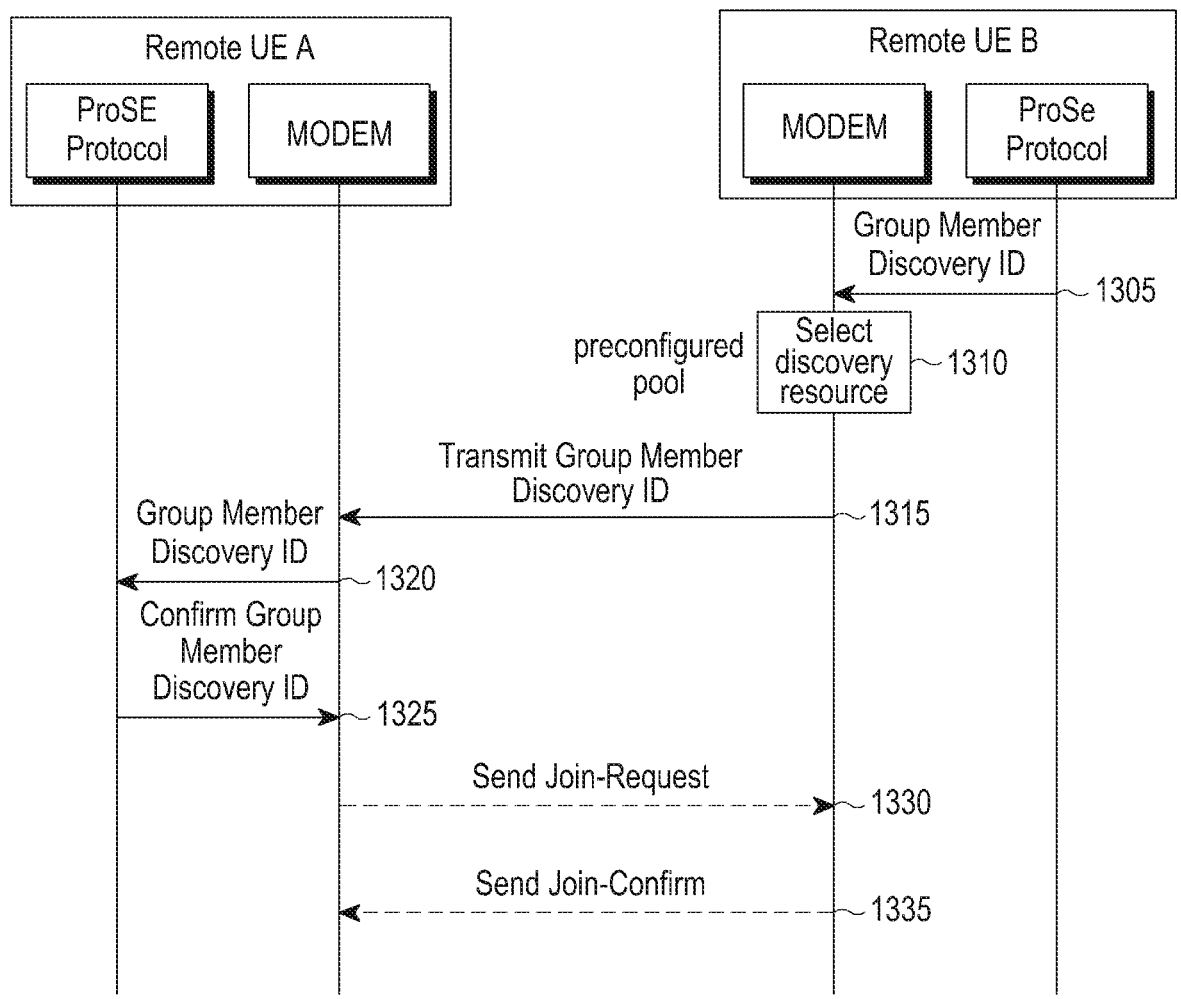
FIG. 13 is a diagram schematically illustrating an example of a signal flow of discovering a group member UE in a D2D communication system according to still another embodiment of a first aspect of the present disclosure.

FIG. 13 is a diagram schematically illustrating an example of a signal flow of discovering a group member UE in a D2D communication system according to still another embodiment of a first aspect of the present disclosure. Here, communication between a remote terminal A and a remote terminal B (hereinafter referred to as a remote UE A and remote UE, B), equipped with a ProSe protocol application, are shown. Here, the remote device B may be a device, which is already performing D2D communication, belonging to a group for the D2D communication, or may be a device that provides a specific service.

Referring to FIG. 13, in operation 1305, the ProSe protocol layer of the remote UE B configures discovery information for transmitting a provided service or group information to peripheral devices, and transfers a Group Member Discovery ID (or Service Discovery ID) including the discovery information to the modem. In operation 1310, the modem of the remote UE B selects a transmission resource by which the Group Member Discovery ID is transmitted, and in operation 1315, the modem transmits the Group Member Discovery ID through the PHY channel corresponding to the selected transmission resource. The Group Member Discovery ID is an identifier which indicates service information or group information provided by the remote UE B, and may be configured to the same value around the world, the same value for each PLMN, or the same value for each APN.

In operation 1320, the modem of the remote UE A receives the Group Member Discovery ID and transfers the same to the ProSe protocol layer. The ProSe protocol layer of the remote UE A determines whether to participate in the service or a group corresponding to the Group Member Discovery ID. When it is determined that the remote UE A participate in the service or group in operation 1325, the ProSe protocol layer transfers a confirmation signal to the modem.

In operation 1330, the modem of the remote UE A transmits a Join-Request signaling for requesting the participation in the service or group to the remote UE B which has transmitted the Group Member Discovery ID. The Join-Request signaling includes PHY channel information indicating a PHY channel to which the Group Member Discovery ID is transmitted. In addition, the Join-Request signaling may include at least one of an identifier of the remote UE A, a group identifier, a PLMN identifier, and APN information. The remote UE B, which has received the Join-Request signaling, determines whether the remote UE B itself is a target UE corresponding to the Join-Request signaling based on the PHY channel information. In operation 1315, when the PHY channel information corresponds to a PHY channel to which the Group Member Discovery ID is transmitted by the remote UE B, in operation 1335, the remote UE B determines that the remote UE B itself is a target UE of the Join-Request signaling, and transmits, to the remoter UE A, Join-Confirm signaling including at least one of the UE identifier, group Identifier, PLMN identifier, APN information, and PHY channel information. To this end, the modem of the remote UE B may receive, from the ProSe protocol layer, information to be included in the Join-Confirm signaling.

Figure 14:
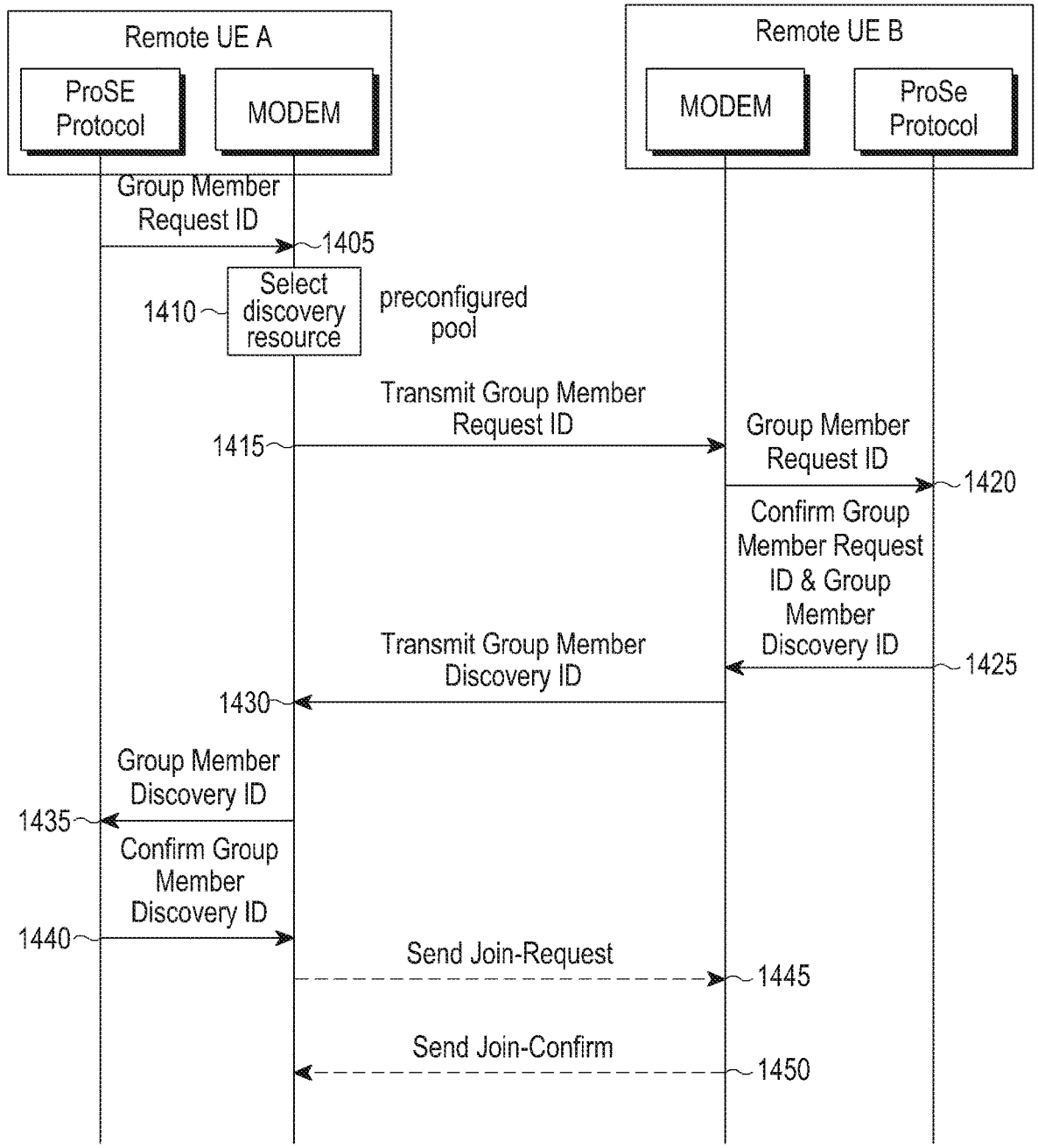
FIG. 14 is a diagram schematically illustrating an example of a signal flow of discovering a group member UE in a D2D communication system according to still another embodiment of a first aspect of the present disclosure.

FIG. 14 is a diagram schematically illustrating an example of a signal flow of discovering a group member UE in a D2D communication system according to still another embodiment of a first aspect of the present disclosure. Here, communication between a remote terminal A and a remote terminal B (hereinafter referred to as a remote UE A and remote UE, B), equipped with a ProSe protocol application, are shown. Here, the remote UE B may be a device which is already performing D2D communication, belonging to a group for the D2D communication, or may be a device that provides a specific service.

Referring to FIG. 14, in operation 1405, the ProSe protocol layer of the remote UE A configures group member request information for discovering for a service or group they want, and transfers the group member request information to the modem. The discovery information is to request discovery information, and may be a Group Member Request ID, as an example. The Group Member Request ID may have the same value around the world, the same value for each PLMN, or the same value for each APN. In operation 1410, the modem of the remote UE A selects a transmission resource by which the Group Member Request ID is transmitted, and in operation 1415, the modem transmits the Group Member Request ID through the PHY channel corresponding to the selected transmission resource.

In operation 1420, the modem of the remote UE B, which has received the Group Member Request ID, transfers the Group Member Request ID to the ProSe protocol layer. In operation 1425, the ProSe protocol layer checks the Group Member Request ID, configures Group Member Discovery information including discovery information on the service or group in which the remote UE B participates in, and transfers the same to the modem. The Group Member Discovery information is an identifier which indicates service information or group provided by the remote UE B, and may be configured to the same value around the world, the same value for each PLMN, or the same value for each APN. In operation 1430, the modem of the remote UE B generates a Group Member Discovery ID corresponding to the group member discovery information, selects a transmission resource to be used for transmitting the Group Member Discovery ID, and transmits the Group Member Discovery ID through the PHY channel corresponding to the selected transmission resource.

In operation 1435, the modem of the remote UE A, which has received the Group Member Discovery ID, transfers the Group Member Discovery ID to the ProSe protocol layer. The ProSe protocol layer determines whether to participate in the service or a group corresponding to the Group Member Discovery ID, and when it is determined to participate in the service or group, in operation 1440, the ProSe protocol layer transfers a confirmation signal for requesting the participation in the service or group to the modem.

In operation 1445, the modem of the remote UE A transmits a Join Request-signaling for requesting the participation in the service or group to the remote UE B which has transmitted the Group Member Discovery ID. The Join-Request signaling includes PHY channel information indicating a PHY channel to which the Group Member Discovery ID is transmitted. In addition, the Join-Request signaling may include at least one of an identifier of the remote UE A, a group identifier, a PLMN identifier, and APN information. The remote UE B, which has received the Join-Request signaling, determines whether the device itself is a target UE corresponding to the Join-Request signaling based on the PHY channel information. In operation 1430, when the PHY channel information corresponds to a PHY channel to which the Group Member Discovery ID is transmitted by the remote UE B, and in operation 1450, the remote UE B determines that the remote UE B itself is a target UE of the Join-Request signaling, and transmits, to the remote UE A, Join-Confirm signaling including at least one of the UE identifier, group identifier, PLMN identifier, APN information, and PHY channel information. To this end, the modem of the remote UE B may receive, from the ProSe protocol layer, information to be included in the Join-Confirm signaling.

Figure 15:
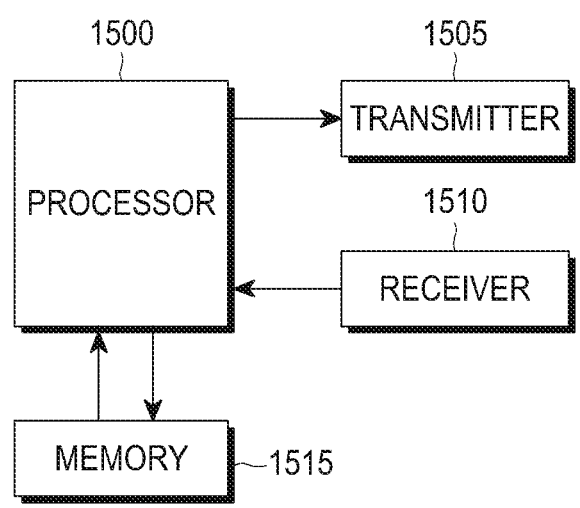
FIG. 15 is schematic illustration of a block diagram of a D2D communication device that performs D2D communication according to an embodiment of a first aspect of the present disclosure.

FIG. 15 is schematic illustration of a block diagram of a D2D communication device that performs D2D communication according to an embodiment of the first disclosure. The illustrated. D2D communication device may operate as previously described relay UE or remote UE.

Referring to FIG. 15, the D2D communication device includes a processor 1500, a transmitter 1505, a receiver 1510, and a memory 1515.

The processor 1500 operates according to at least one of embodiments of the first aspect of the present disclosure previously described. As an example, the processor 1500 generates L2 signaling or physical layer frame for discovery and transmits the same through the transmitter 1505. The receiver 1510 may receive relay request signaling or group information request signaling, or participation request signaling and transmit the same to the processor 1500, and the processor 1500 transmits, through the transmitter 1505, additional information required in response to the request signaling. The memory 1515 may store program code, parameters, data, and the like required for the operation of the processor 1500.

At least one of embodiments of the first aspect of the present disclosure has an advantage in that it allows an efficient discovery of a relay UE that provides network connectivity to devices outside the coverage of a cellular base station in a D2D communication system.

In addition, at least one of embodiments of the first aspect has an effect of providing an optimized discovery function to a device outside the coverage of a cellular base station in a D2D communication system.

Hereinafter, embodiments of the second aspect of present disclosure will be described.

Although the following description is described based on a V2X communication system, which is merely for the convenience of description, the contents and scope of the present specification are not limited to the V2X communication system, and in general, the present specification can be applied to the field in which Internet of Things technology can be applied. In addition, although various embodiments described herein are separately described, various embodiments may be performed in an integrated form if embodiments are not described in apparently contradictory terms.

Prior to the detailed description of embodiments of the second aspect of the present disclosure, two main concepts of the second aspect will be briefly described.

The second aspect of the present disclosure is to, when any event occurs in a device, notify of the occurrence to the other devices. In particular, when the vehicle accident or emergency situation occurs during the operation thereof, the second aspect proposes a method for directly notifying of the situation to the other vehicle or notifying of the same through the base station. Specifically, when an event, which has occurred in a device, particularly, in a UE of the vehicle, can be transmitted to devices within a given coverage in a predetermined time, the event can be transmitted using a device to device direct communication mode, and when it is difficult to transmit to the devices, the event occurrence can be transmitted through the base station.

Prior to the detailed description of the second aspect of present disclosure, key terms used herein will be described.

"Device" is an object that can support the Internet of Things, or V2X communication, for example, may be a communication device in the vehicle, a smart phone and the like. In the present specification, it may be referred to as a "UE" or "device".

"Road Side Unit (RSU)" is an entity that is installed near the road to relay the UE and the base station, for example, and installed along with the traffic collection devices, street lights, traffic lights, so as to communicate with the UE. However, in some cases, the RSU may perform functions of the UE.

An "event" refers to, in particular, various situations and the like generated during the vehicle operation. For example, the event may refer to incidents, such as a forward collision accident, pedestrian jaywalking, or the progress of the emergency vehicles, in which the corresponding situation can be informed to neighboring vehicles. Some of the events may be predetermined in an emergency situation or an emergency event.

"Event information" refers to information informing of the generation of the event and the contents of the event. Since the V2X communication system is described herein, as an example, a V2X message may be an example of the event information in the present specification.

FIG. 16 is a diagram for explaining basic concepts of device to device communication according to an embodiment of a second aspect of the present disclosure.

Figure 16A:
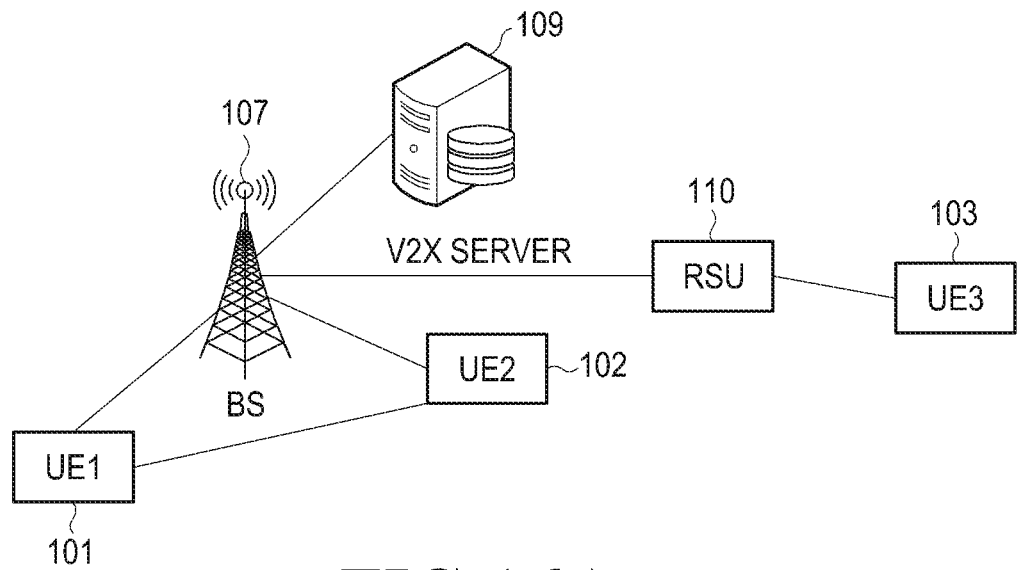
FIG. 16 is a diagram for explaining a basic concept of device to device communication according to an embodiment of a second aspect of the present disclosure.
Figure 16B:
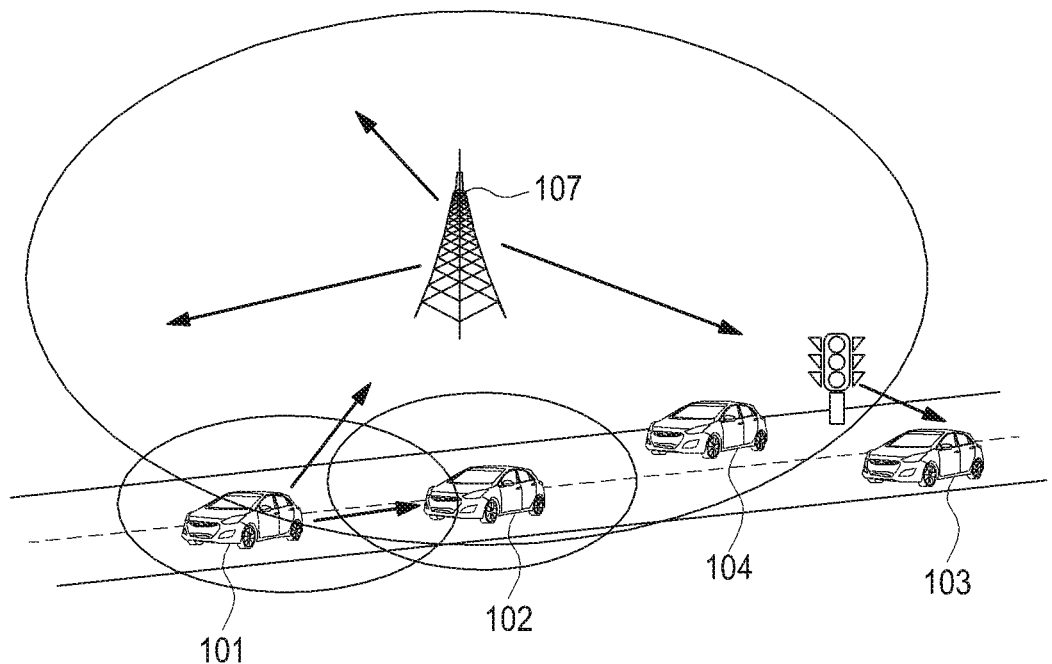

FIG. 16A is a schematic diagram of the basic concepts of device to device communication, and FIG. 16B shows an actual vehicle driving environment.

A UE1 101 and a UE2 102 are vehicles or RSUs or user equipment supporting V2X communication services and the RSU 110 supports the V2X communication services. A V2X server 109 is a server for supporting the V2X communication services. The UE1 101 and UE2 102 may communicate with each other for V2X service, without passing through the RSU 110 using device-to-device (D2D) communication. The UE1 101 and UE2 102 may be connected to the V2X server 109 through the RSU 110 to acquire information on a V2X message.

Referring to FIGS. 16A and 16B, the UE1 101 may notify of an event occurred to the UE1 itself or arbitrary information to the UE2 102 or UE3 103 through D2D direct communication or through the RSU 110.

First, a case of performing D2D direct communication will be described. For example, when the UE1 101 detects an emergency situation A, such as an accident occurred in the front, the UE1 101 determines the transmission limit time of the V2X message and a required transmission coverage (X km) in order to inform the neighboring UEs. The transmission limit time is the maximum allowed time during which the V2X message is transmitted, may vary depending on the type of emergency situation A, and may be several tens of msec. The transmission coverage is the minimum distance in which the V2X message informing the emergency situation A has to be delivered. The transmission limit time and transmission coverage are information which is previously received from the server 109 or which is previously stored in the UE101.

When it is determined that the UE1 101 can transmit the V2X message to UEs in the transmission coverage through D2D direct communication in consideration of the transmission limit time and transmission coverage of the emergency situation A, the UE1 101 can transmit the V2X message to other UEs through D2D direct communication. That is, first, the UE1 101 transmits the V2X message to the UE2 102, and the UE2 102 will transmit to the neighboring UEs. When it is determined that the V2X message is not notified to all the UEs in the transmission coverage within the transmission limit time through direct D2D communication, the UE1 101 includes a "local transmission indicator" in the V2X message and transmit the same to the UE2 102. The local transmission indicator makes the UE, which has received the V2X message, a request for the transmission of the V2X message to the RSU 110. Whether to include the local transmission indicator and whether to apply HARQ may be determined by the transmission power and modulation scheme or code rate of the UE1 101. The UE2 102, which has received the V2X message, transmits the V2X message to the base station 107. The UE2 102 uses pre-configured reception resources in order to receive the emergency V2X message.

The RSU 110, which has received the V2X message including a local transmission indicator, directly processes the V2X message. The RSU 110 searches for V2X content corresponding to the V2X message, and when the V2X message corresponds to the emergency message, the RUS 110 generates a V2X content message including an emergency V2X content and transmits the same to the UEs in the cell coverage. It is illustrated that the V2X content message is transmitted to the UE2 102 in FIG. 16. The UE2 102 may know that the emergency situation A has occurred by receiving the V2X message, thereby performing an operation corresponding to the emergency situation A. One example of an operation corresponding to the emergency situation A will generate an alarm to the driver. The V2X message and V2X content message transmitted and received to and from the RSU 110 and UEs, may be transmitted in an RRC message or user-plane message (PDCP, RLC, MAC message) format using a broadcast or unicast manner. Further, the V2X content message may be transmitted through a physical channel for a V2X or a broadcast channel or downlink scheduling channel. On the other hand, mapping information between the V2X message and the V2X content is globally-specific or PLMN-specific information.

As another example, the UE1 101 may include a relay indicator in the emergency V2X message and transmit the same. The relay indicator is a message requesting for relaying of the corresponding message to the other UE, and the RSU 110 the UE, which has received the relay indicator, forwards the V2X content corresponding to the received. V2X message to the other UEs. The relay indicator may be determined by the transmission power and modulation scheme or code rate of the UE1 101, and whether to apply HARQ. A V2X content corresponding to a V2X message including the relay indicator is relayed by the RSU 110 or the other UE.

On the other hand, when the UE, which has generated the V2X message, is outside the coverage of the RSU 110, V2X message that is transmitted by the UE may include both a relay indicator and a local transmission indicator (local forwarding indicator). A V2X content corresponding to a V2X message including both the two indicators is transmitted to the RSU 110 by the RSU 110 or other UE having a relay function. Then, the RSU 110 transmits the corresponding V2X content to another UE within the coverage of the RSU 110 by using a local forwarding function.

Figure 17:
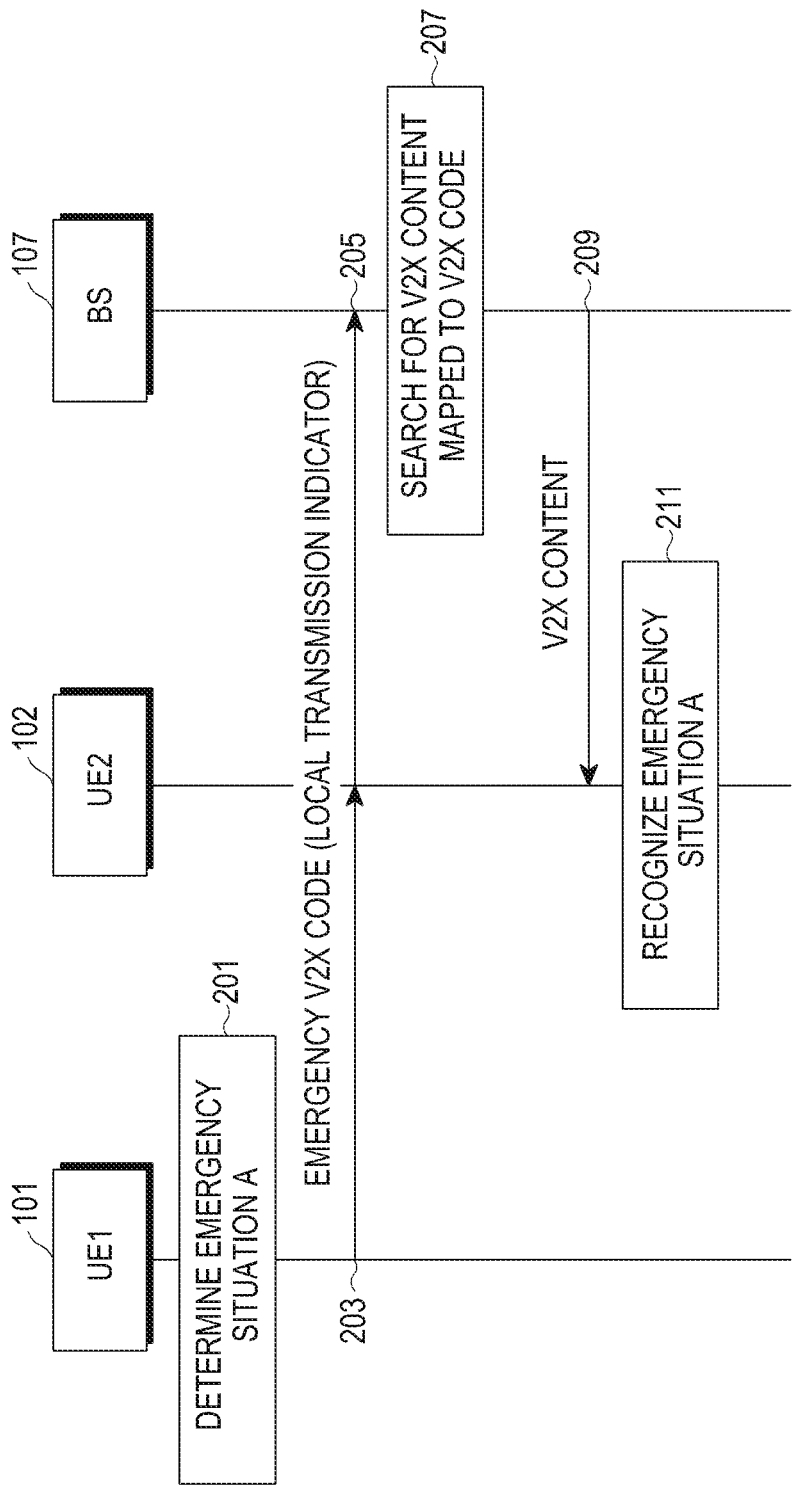
FIG. 17 is a diagram for explaining a basic method for transmitting and receiving messages according to an embodiment of a second aspect of the present disclosure.

FIG. 17 is a diagram for explaining a basic method for transmitting and receiving messages according to an embodiment of a second aspect of the present disclosure.

In step 201, the UE1 101 determines the transmission limit time and transmission coverage for the emergency situation A. In step 203, the UE1 101 selects a V2X code transmission resource from a preconfigured set, and transmits an emergency V2X code to the UE2 102. Here, the UE2 102 uses previously determined reception resources from the previously code set in order to receive the emergency V2X code. In step 205, the UE2 102 transmits the V2X code to the base station 107 by using a WAN resource. In step 207, the base station 107 analyzes the V2X code so as to search for V2X content that is mapped to the V2X code, in the previously stored mapping table, and when the V2X content corresponding to the V2X code corresponds to the emergency V2X content, the base station 107 generates a message including the emergency V2X message. In step 209, the base station 107 transmits the message including the emergency V2X content to the UE2 102, by using the WAN resource. In step 211, the UE2 102 may know the occurrence of the emergency situation A from the received message, and perform an operation corresponding to the emergency situation A, for example, an operation of generating an alarm to the driver.

The V2X message and V2X content message, which is transmitted and received to and from the base station 107 and UEs, may be transmitted in an RRC message or user-plane message (PDCP, RLC, MAC message) format using a broadcast or unicast manner. Further, the content V2X message may be transmitted through a physical channel for the V2X or a broadcast channel or downlink scheduling channel. On the other hand, mapping information between the V2X message and the V2X content is globally-specific or PLMN-specific information. That is, the mapping information may be uniquely used in all countries, or be uniquely used in the same PLMN.

Figure 18A:
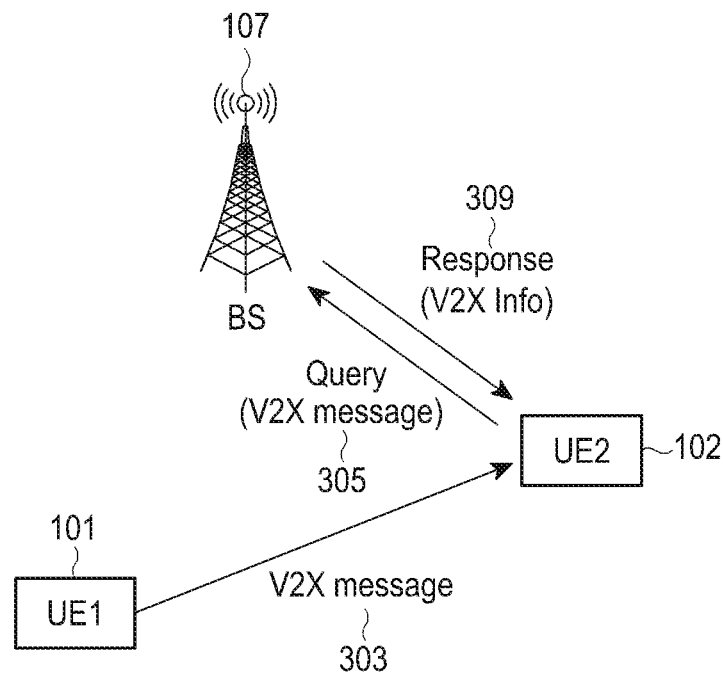
FIG. 18A to FIG. 18C are diagrams illustrating an embodiment for selecting a code for the transmission and reception of a V2X message, so as to transmit and receive the V2X message according to an embodiment of a second aspect of the present disclosure.
Figure 18B:
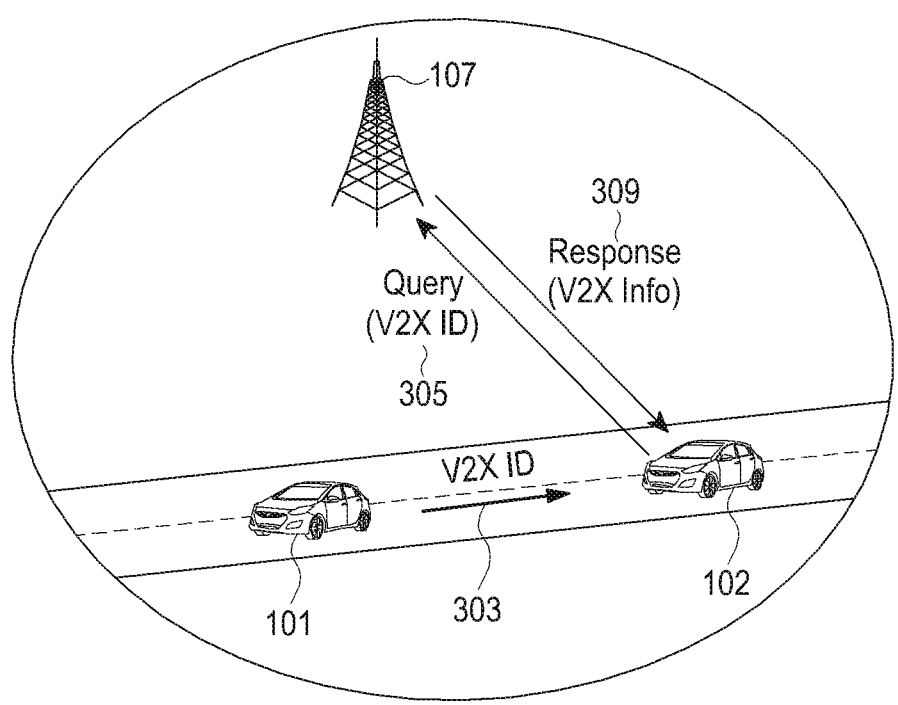
Figure 18C:
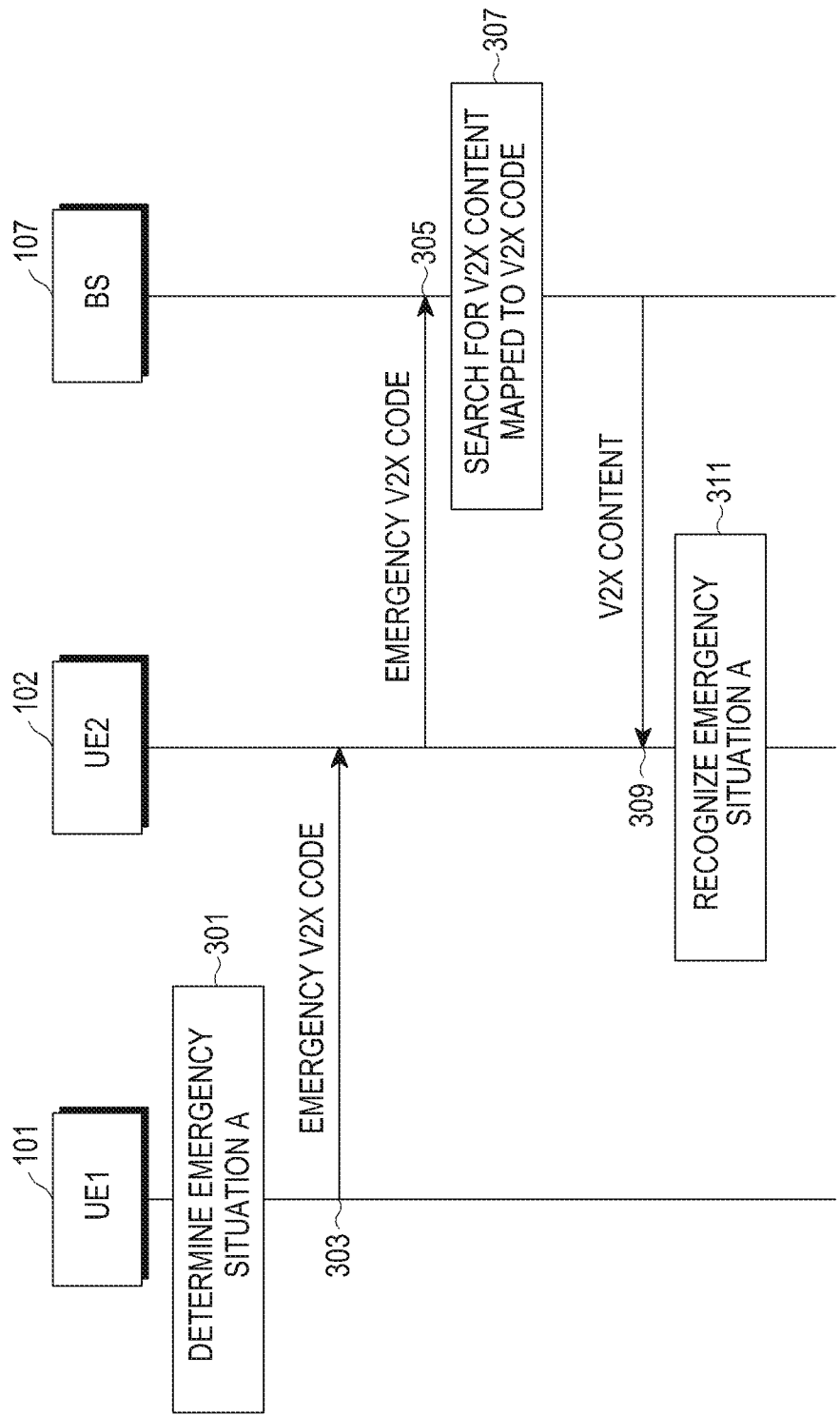

FIG. 18A to FIG. 18C are diagrams illustrating an embodiment for selecting a code for the transmission and reception of a V2X message, so as to transmit and receive the V2X message according to an embodiment of a second aspect of the present disclosure.

FIG. 18A is a schematic diagram of D2D communication, FIG. 18B is a diagram illustrating the actual vehicle operation environment, and FIG. 18C illustrates the flow of messages between entities.

In step 301, the UE1 101 determines the transmission limit time and transmission coverage for the emergency situation A. When, as a result of the determination, it is determined that D2D communication is to be performed, in operation 303, the UE1 101 selects a code for transmitting the V2X message from the preconfigured code resource set, and transmits the emergency V2X message to the UE2 102 by using the selected code. The emergency V2X message may be transmitted in a broadcast or unicast manner. Here, the UE2 102 uses previously determined reception code from the previously code set in order to receive the emergency V2X code. In step 305, the UE2 102 transmits the V2X message to base station 107 by using the WAN resource, in order to query information on the V2X message. Information on the V2X message is a V2X application code. In step 307, the base station 107 analyzes the V2X message so as to search for V2X content that is mapped to the V2X code in the previously stored mapping table, and when the V2X message corresponds to the emergency V2X message, the base station 107 generates a message including the emergency V2X code. In step 309, the base station 107 transmits the message including the emergency V2X code to the UE2 102 by using the WAN resource, and respond to the query in step 307. The message used in the query in step 307 and in the response in step 309 may be an RRC message, a MAC message (MAC CE for V2X), or a user plane packet. The user plane packet has a new PDCP header in order to identify the V2X with conventional IP packets.

On the other hand, in step 311, the UE2 102 may know the occurrence of the emergency situation A from the received message, and perform an operation corresponding to the emergency situation A, for example, an operation of generating an alarm to the driver.

For reference, mapping information between the V2X message and the V2X content is globally-specific or PLMN-specific information. That is, the mapping information may be uniquely used in all countries, or be uniquely used in the same PLMN.

FIG. 19 is a diagram illustrating an embodiment of transmitting and receiving messages between terminals belonging to two different base station cells according to an embodiment of a second aspect of the present disclosure.

Figure 19A:
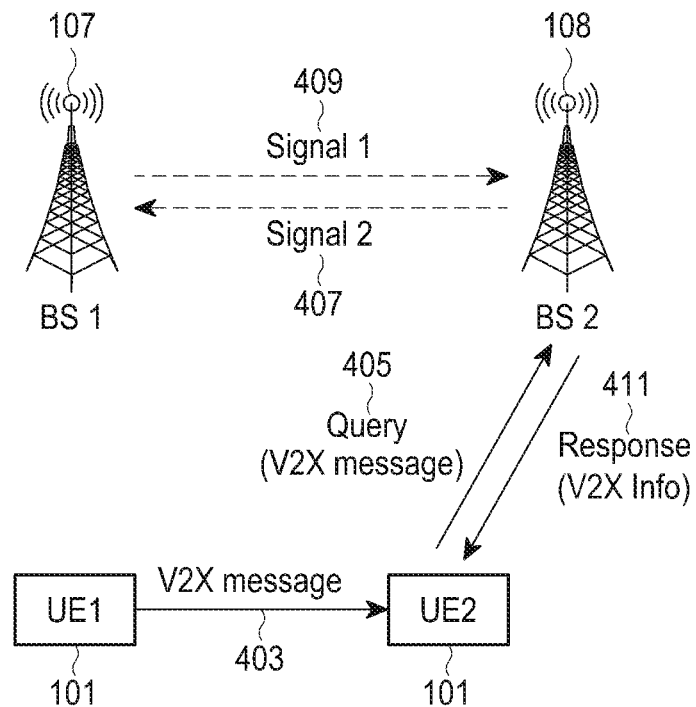
FIG. 19 is a diagram illustrating an embodiment of transmitting and receiving messages between terminals belonging to two different base station cells according to an embodiment of a second aspect of the present disclosure.
Figure 19B:
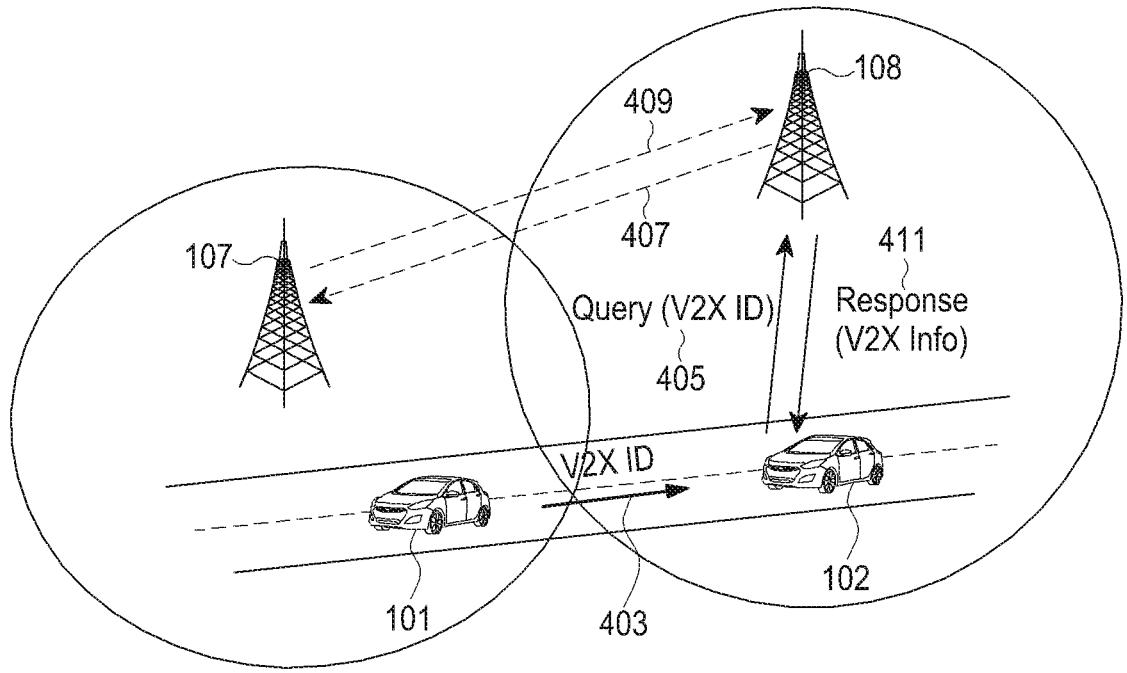

FIG. 19A is a schematic diagram of D2D communication, and FIG. 19B shows an actual vehicle driving environment.

Referring to FIGS. 19A and 19B, it is assumed that the first base station 107 and second base station 108 include the function of a V2X server, respectively. Accordingly, each base station has the mapping table between the V2X application code and V2X Information.

First, in step 403, the UE1 101 located within the coverage of the first base station 107 transmits the V2X message to the UE2 102 located in the second base station 108. The V2X message may be transmitted in a broadcast or unicast manner. In step 405, the UE2 102 queries the second base station 108 for information on the V2X message. Information on the V2X message may be the V2X application code. Since the UE1 101 is the UE located within the coverage of the first base station 107, the second base station 108 may not know information on the V2X message transmitted by the UE1. Thus, in step 407, the second base station 108 signals to the first base station 107 and queries the V2X message received from the UE2 102. The first base station 107 may know information on the V2X message, transmitted by the UE1 101, from the previously stored mapping table between the V2X application code and V2X information, by using the function of the V2X server, and in step 409, the first base station 107 transmits, to the second base station 108, a response for the information on the V2X messages. In step 411, the second base station 108 transmits the information on the V2X message to the UE2 102 using the response received in step 409. The UE2 102, which has received a response from the second base station 108 may know the information on the V2X message, for example, the emergency V2X message, and perform an operation corresponding to the emergency V2X message.

For reference, a message to be used in the query/response between the UE2 102 and the second base station 108 in step 405 and step 411 may be the RRC message or MAC message (MAC CE for V2X) or user plane packet. The user plane packet has a new PDCP header in order to identify the V2X with conventional IP packets.

Hereinafter, embodiments of the local transmission described in FIG. 16 will be described.

As described above, the local transmission is a method for transmitting the V2X message by the base station to the UEs within the coverage, when a UE is to transmit a V2X message to the other UEs, and when it is determined that the corresponding message cannot be transmitted to the UEs in the transmission coverage during the transmission limit time. In the local transmission scheme, the UE includes a local transmission indicator in the V2X message. The local transmission indicator may use a direct communication resource allocated for V2X messages through a V2X direct communication resource, or may be included in the resources allocated for the V2X message through the WAN communication resource. For reference, the WAN communication means cellular communication between a base station and a UE.

The other UE (vehicle or RSU), which has received the local transmission indicator transmitted by the arbitrary UE is not relay the V2X message to the other UE, and transmits the same to the base station. When the base station receives the V2X message or resource allocation for the V2X message, the base station may know that the V2X message requires the local transmission. In order to know whether the V2X message requires the local transmission, the base station monitors both the cellular communication of the V2X message and the V2X direct communication by the UE. To this end, the local transmission indicator may be included in the V2X message of the V2X direct communication of UEs. In addition, the base station receives the packet of the UE in a cellular communication interval, in which the UE uses a cellular communication system.

According to the description above, various methods such as a method for transmitting a local transmission indicator to the base station in addition to a method of including a local transmission indicator to V2X message are possible.

As an example, when the UE requests a V2X direct communication resource from the base station, the UE may transmit the local transmission indicator to the base station through the signaling for the V2X direct communication resource request. As another example, when the UE requests a cellular communication resource for the V2X message transmission from the base station, the UE may transmit the local transmission indicator to the base station through the cellular communication signaling. In another example, the base station may monitor V2X direct communication resources. If the base station receives the V2X message including the local transmission indicator, the base station transmits the V2X message to the other UE.

On the other hand, the UE is one of an RRC idle state and the RRC connection state, and the V2X direct communication resource used by the UE may be a V2X direct communication resource allocated by the base station through an explicit resource request processing by the UE, or a V2X direct communication resource randomly selected by the UE, or may be a predetermined V2X direct communication resource.

Figure 20:
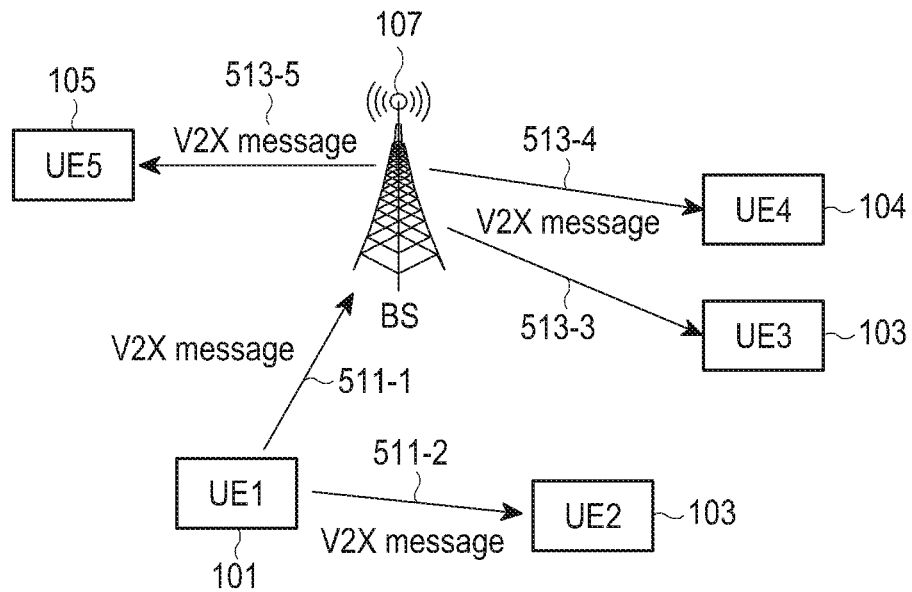
FIG. 20 is a diagram for explaining an embodiment of local transmission according to an embodiment of a second aspect of the present disclosure.

FIG. 20 is a diagram for explaining an embodiment of local transmission according to an embodiment of a second aspect of the present disclosure.

In step 511-1 or in step 511-2, the UE1 101 transmits the V2X message requiring a local transmission scheme to the base station 107 or the UE2 102, using the V2X direct communication resource allocated according to the method described above. The UE2 102 receives the V2X message from the V2X direct communication resource, and the base station 107 monitors the V2X message in the V2X direct communication resource according to the instructions of the UE1 101. The base station 107 may receive the V2X message transmitted from the V2X direct communication resource during a cellular communication interval. During the cellular communication interval, the base station 107 monitors not only packets between UEs that uses the V2X direct communication but also packets form the UEs. When the base station 107 receives the V2X message including the local transmission indicator, in step 513, the base station forwards the V2X message to the UEs 103, 104, 105 within the coverage (step 513-3 to step 513-5).

As described above, the UE1 101 may transmit the local transmission indicator to the base station 107, using the V2X direct communication resource request. Here, the V2X direct communication resource is to transmit the V2X message requesting the local transmission. In another method, the UE1 101 may transmit the local transmission indicator to the base station 107 through the cellular communication resource request. Here, the cellular communication resource is to transmit the V2X message requesting for the local transmission. In another method, the UE1 101 may transmit, to the base station 107, the V2X message requesting the local transmission through the cellular communication method. The format of the V2X message, transmitted from the UE1 101 to the base station 107, may be a message of control plane signaling, such as RRC messages.

On the other hand, upon receiving a V2X message requesting local transmission, the base station 107 transmits the V2X message through a V2X channel configured between the base station 107 and the V2X-enabled UEs. As another example, a MBMS or eMBMS channel for V2X may be used. As still another example, a downlink shared channel (DL SCH) for the V2X may be used. On the other hand, V2X RNTI or V2X local RNTI may be used to identify resources including V2X messages. For reference, the format of the V2X message, transmitted by the base station 107, may be one of the RRC, MAC, PDCP or application layer based messages. The format of the V2X messages will be described later.

Figure 21:
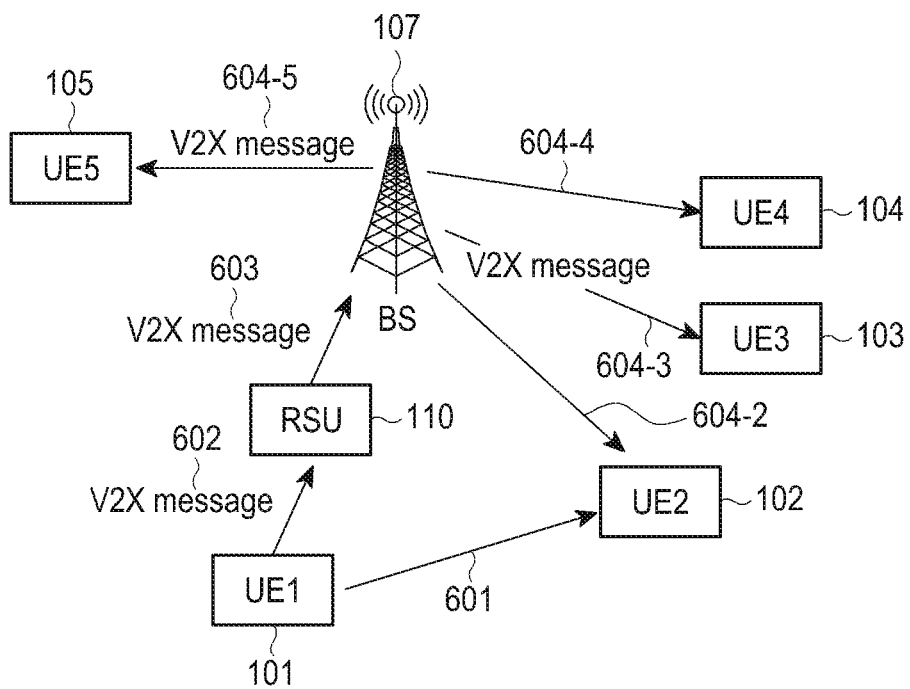
FIG. 21 is a diagram for explaining another embodiment of local transmission according to an embodiment of a second aspect of the present disclosure.

FIG. 21 is a diagram for explaining another embodiment of local transmission according to an embodiment of a second aspect of the present disclosure.

When compared with FIG. 20, the embodiment in FIG. 21 is different in that the RSU 110 is used. When the RSU 110 or UE has a capability of relaying another RSU 110 outside the coverage of the base station 107 or another UE, the relay-enabled RSU 110 or the relay-enabled UE may transmit the V2X message from the other RSU 110 or the other UE to the base station 107. In FIG. 21, it is assumed that the UE1 101 is outside the coverage of the base station 107, and the RSU 110, UE2 102, UE3 103, the UE4 104, and the UE5 105 are within the coverage of the base station 107. On the other hand, the relay-enabled RSU 110 may notify of relay capability of its own through the V2X message, such as V2X application code indicating a relay device.

Referring to FIG. 21, when it is determined by the UE1 101 that the local transmission of the V2X message is required, the UE1 101 searches for a different UE or RSU 110 that can provide the connection with the base station 107. In in FIG. 21, it is assumed that the UE1 101 receives the V2X message from the RSU 110 for instructing the relay capability. The UE1 101, which has discovered an entity having the relay capability, transmits the V2X message to the RSU 110, in step 602. The V2X message includes a local transmission indicator. The local transmission indicator may be transmitted to the RSU 110 through resources previously allocated for the V2X messages. In step 603, the RSU 110 transmits the V2X message including the local transmission indicator to the base station 107. In step 604, the base station 107 transmits the received V2X message to the UE2 102, UE3 103, UE4 104, and UE5 105 located within its coverage. For reference, the RSU 110 and the base station 107 may communicate in a cellular communication scheme. In another method, an interface between the RSU 110 and the base station 107 may be an interface of a non-3GPP scheme.

As described in FIG. 20, when the base station receives the V2X message requesting the local transmission, the base station transmits the V2X message through a V2X channel established between the base station and the V2X-enabled UEs. As another example, the MBMS channel or eMBMS for V2X may be used. Another example, the downlink shared channel (DL SCH) for V2X may be used. On the other hand, V2X RNTI or V2X local RNTI may be used to identify resources including V2X messages. For reference, the format of the V2X message, transmitted by the base station, may be one of the RRC, MAC, of the PDCP or application layer based messages.

An example of the V2X code for the emergency service is illustrated in <Table 1> as follows.

TABLE 1

| V2X Event | Code |
| --- | --- |
| Forward collision warning | 1 |
| Control loss warning | 2 |
| Emergency vehicle warning | 3 |
| Emergency stop warning | 4 |
| Wrong way driving warning | 5 |
| Pre-crash sensing warning | 6 |
| Vulnerable road user warning | 7 |
| . . . | N |

Information on V2X code for the emergency service, such as the example of the <Table 1>, may be embedded in SIM of the UE, or may be received from a server or base station that manages the V2X code when the UE registers the V2X service. The V2X UE stores the mapping table between the V2X code and the V2X event, such as the <Table 1>. On the other hand, a V2X code for non-emergency services is a code value other than the V2X code for the emergency service.

Hereinafter, a code or carrier used according to the type of the V2X service will be described.

On the other hand, a code or a carrier for transmitting the V2X message may be different for a V2X service that requires a low latency time and the conventional V2X service, depending on the type of the V2X service. The V2X service that requires the low latency time may be, for example, an emergency message service, the conventional V2X service may be, for example, a service that provides conventional information, such as notifying of a parking lot in an adjacent area to a driver.

Figure 22A:
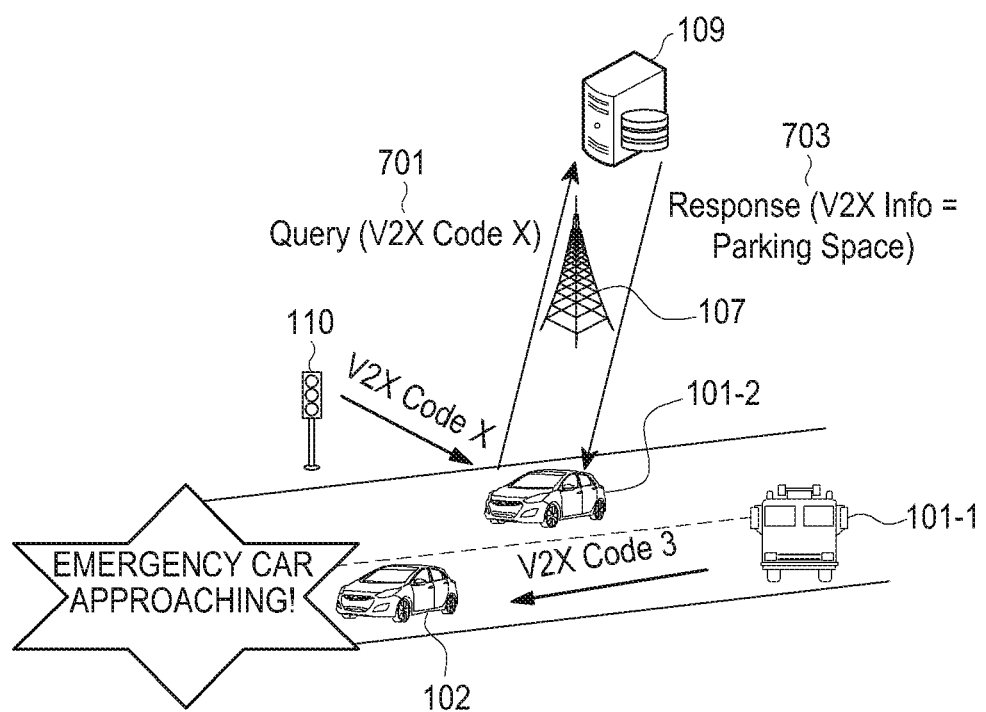
FIG. 22A to FIG. 22C are diagrams for explaining that a code used for the transmission of a V2X message is divided according to a latency time required for transmitting the V2X message according to an embodiment of a second aspect of the present disclosure.
Figure 22B:
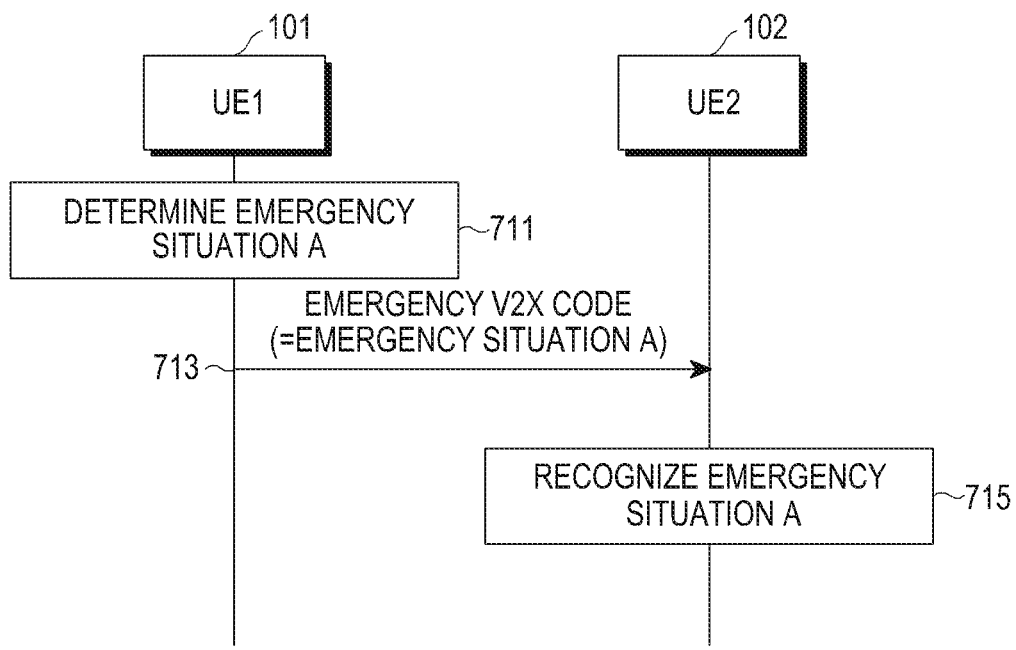
Figure 22C:
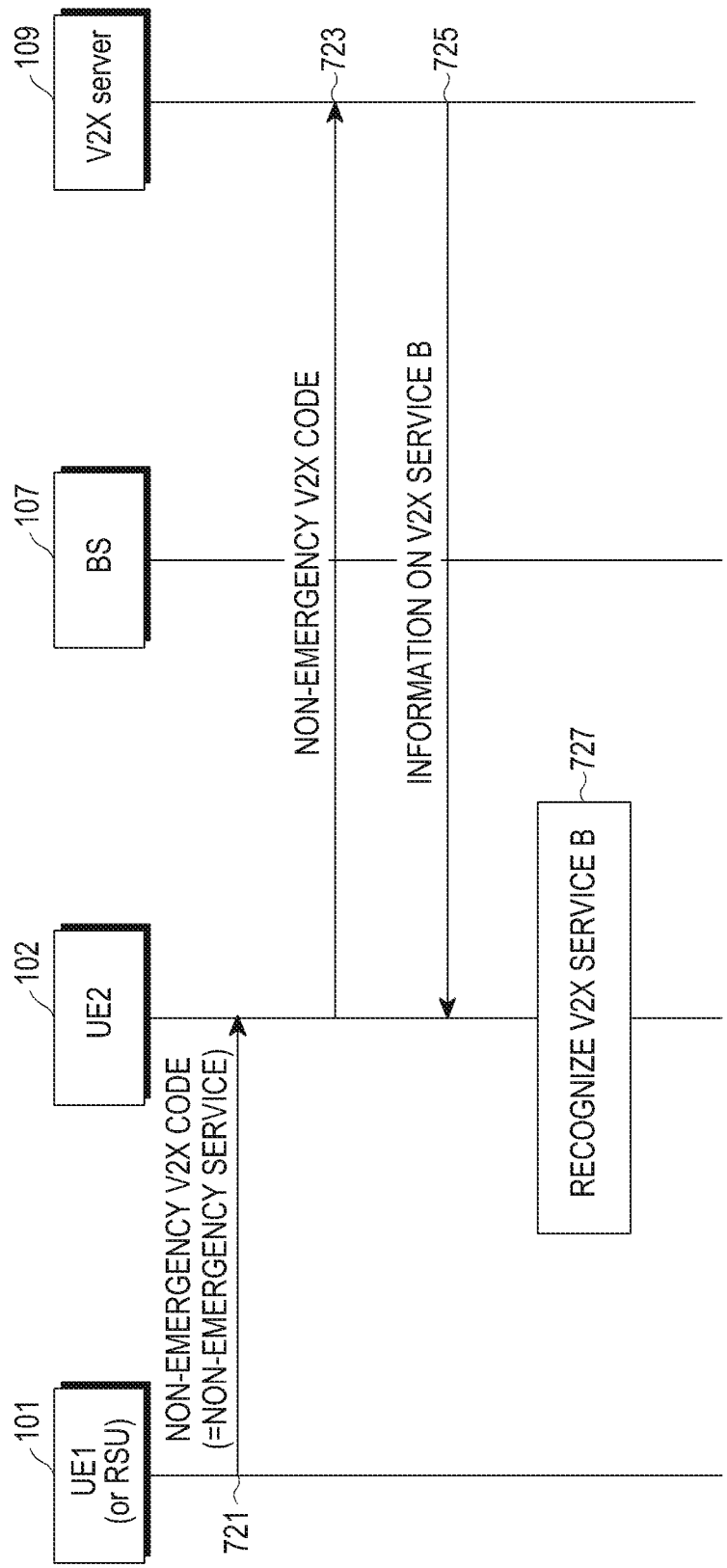

FIG. 22A to FIG. 22C are diagrams illustrating that a code used for the transmission of the V2X message is divided according to a latency time required for the transmission of the V2X message according to an embodiment of the second aspect of present disclosure transmission.

FIG. 22A shows operations of a UE101-1 that is a vehicle using a V2X emergency service and a UE101-2 that is a vehicle using a non-emergency V2X service.

First, a description will be given to the UE101-1 using the emergency service. On the basis of the emergency service code of <Table 1>, the emergency service UE101-1 transmits No. 3 V2X code corresponding to the "emergency vehicle warning" to the other vehicles (UEs). The UE2 102, which has received the No. 3 V2X code corresponding to the "emergency vehicle warning", may know the occurrence of emergency service event corresponding to the No. 3 V2X code from the emergency service event table that is previously stored. Then, the UE2 102 may generate an operation corresponding to the emergency service event, for example, a warning sound to the driver.

Then, when it is assumed that the RSU 110 provides the non-emergency service, for example, a parking spot notification service, the RSU 110 transmits a V2X code corresponding to "remaining parking spot" to the UE101-2. The UE101-1, which has received a V2X code corresponding to the "remaining parking spot", may not know the code for non-emergency service. Therefore, in step 701, the UE101-1 queries the base station 107 or the V2X server 109 via the base station 107 for the V2X code received by itself, and receives information on the remaining parking spot from the base station 107 or the V2X server 109.

FIG. 22B shows the flow of messages in the emergency V2X service.

In step 711, the UE1 101 determines the emergency situation A. The occurrence of the emergency situation A may be determined using various sensors attached to the vehicle or camera, or determined based on the information received from the RSU 110/the base station 107/the server 109. In step 713, the UE1 101 selects the V2X code corresponding to the emergency situation A, and transmits the same to the neighboring UEs, that is, the UE2 102. Resources for transmission of the V2X code can be selected from the preconfigured set of resources. The UE2 102 may know the emergency situation corresponding to the V2X code, received using the mapping table in the <Table 1> owned by itself. A resource by which the UE2 102 receives the V2X code is selected from the preconfigured set of resources. In FIG. 22B, the base station 107 and the server 109 have been illustrated, and it can be seen that they are not involved in the emergency service (reception resources and transmission resources for V2X code may be different or the same).

FIG. 22C illustrates the flow of messages in a non-emergency V2X service.

In step 721, the UE1 101 transmits a V2X code corresponding to the non-emergency service to the UE2 102. Resources for the transmission of the V2X code may be selected from the preconfigured set of resources. In step 723, the UE2 102 selects a resource for receiving the V2X code from the preconfigured set of resources, and searches for the V2X code, received through the resource, in <Table 1>. Since the received code is for the non-emergency service, the code may not be retrieved from the <Table 1>. Therefore, UE2 102 transmits the V2X code via the base station 107. In step 725, the server 109 transmits service information corresponding to the V2X code to the UE2 102 via the base station 107. In step 727, the UE2 102 may know a service corresponding to the received. V2X code, for example, information on the parking notification service, and provide parking information to the driver.

FIG. 23 is a diagram for explaining that a carrier used for the transmission of a V2X message is divided according to a latency time required for transmitting the V2X message according to an embodiment of a second aspect of the present disclosure.

In FIG. 22A to FIG. 22C, the V2X code for emergency services and V2X code for non-emergency services was divided. In FIG. 23, a carrier through which the V2X code for emergency services is transmitted and a carrier through which the non-emergency V2X code is transmitted may be separately operated.

Figure 23A:
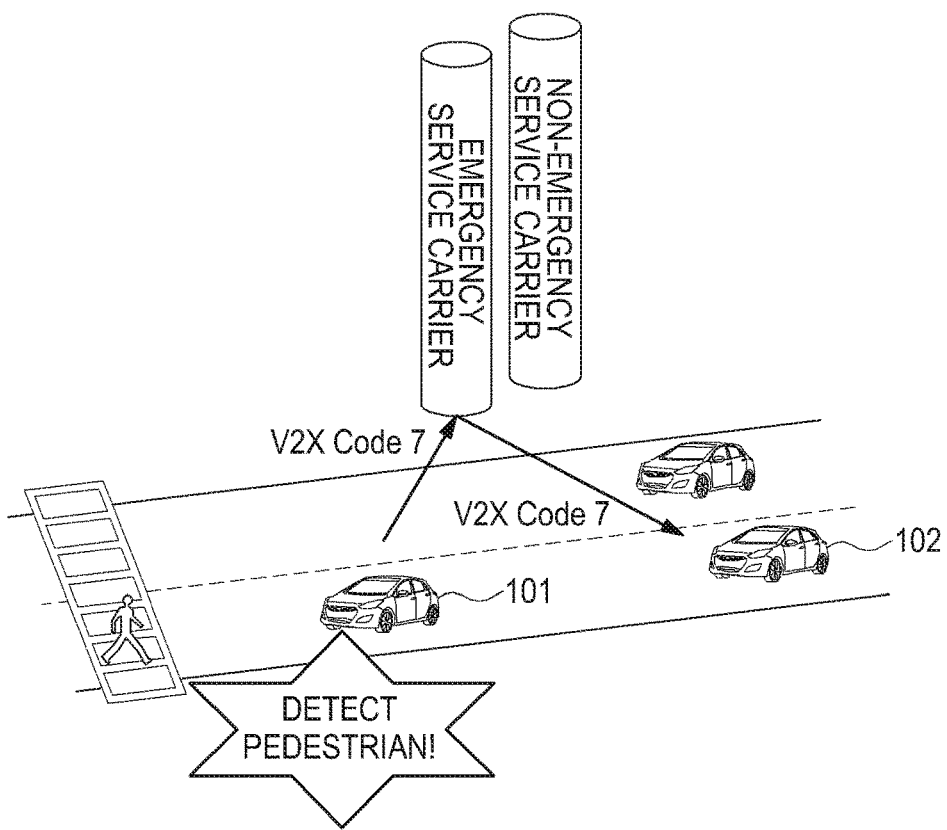
FIG. 23 is a diagram for explaining that a carrier used for the transmission of a V2X message is divided according to a latency time required for transmitting the V2X message according to an embodiment of a second aspect of the present disclosure.

FIG. 23A illustrates that the carrier of the emergency service is used for the transmission of the V2X code for the emergency services. The UE1 101 detects jaywalking of the pedestrian to the pedestrian and transmits an emergency V2X code corresponding to the pedestrian caution notification through the carrier for the transmission of emergency V2X. The UE2 102 may monitor the carrier for the transmission of emergency V2X and receive the emergency V2X code. On the other hand, the UE2 102 may search for the received V2X code from the mapping table between the V2X code and V2X event, and know a V2X event corresponding to the V2X code. Then, the UE2 102 may generate an operation corresponding to the V2X event, for example, a pedestrian caution notification warning.

Figure 23B:
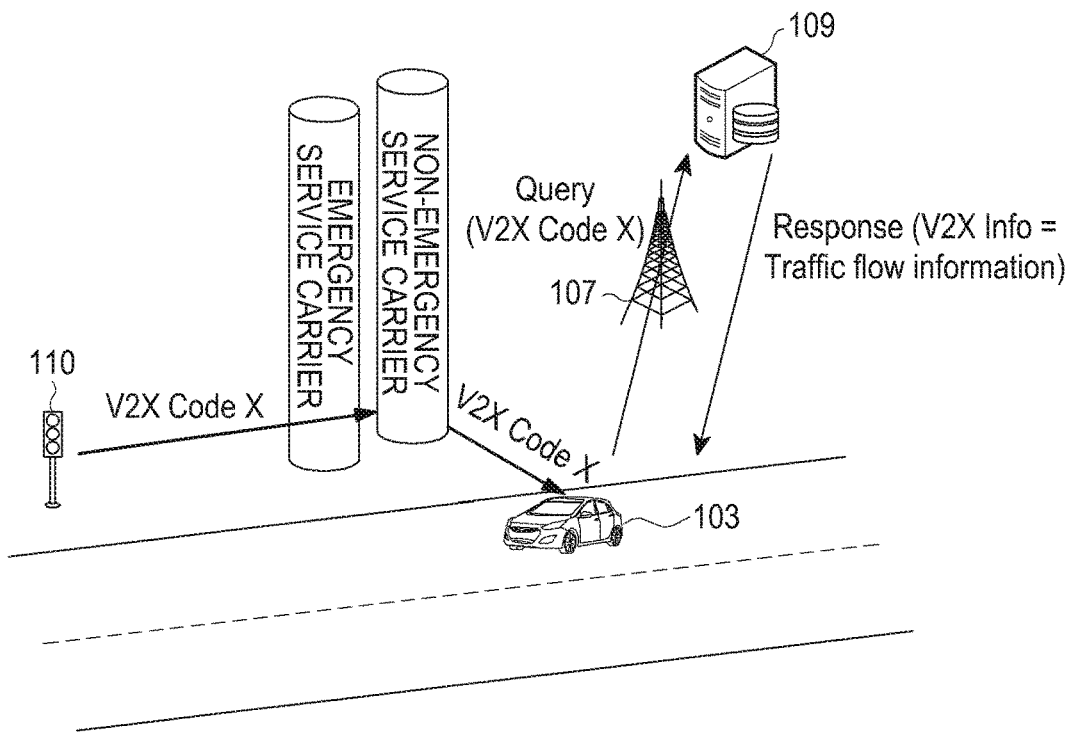

FIG. 23B illustrates that the carrier for the non-emergency services is used for the transmission of the V2X code for the non-emergency services.

Referring to FIG. 23B, the UE3 103 receives a V2X code X through the carrier for the non-emergency V2X code transmission while monitoring the carrier of the emergency V2X code transmission and the carrier for the non-emergency V2X code transmission. The UE3 103 searches for the received. V2X code from the mapping table between the V2X code and V2X event. Since the V2X code is a non-emergency code, the received V2X code is not included in the mapping table. Therefore, the UE3 103 transmits the V2X code X to the base station 107 or the V2X server 109 via the base station 107. The V2X server 109 transmits the V2X content corresponding to the V2X code to the UE3 103. The V2X content may be, for example, traffic flow information. The UE3 103, which has acquired the V2X content, notifies of the V2X content to the driver.

Although FIGS. 23A and 23B have described embodiments for transmitting the V2X code, an embodiment in which the V2X message is transmitted and received through the emergency V2X transmission carrier or non-emergency V2X transmission carrier may be included. In addition, although FIG. 23B illustrates that the UE2 103, which has received the non-emergency V2X code, acquires the V2X content through the V2X server 109, a local forwarding scheme is possible in which the base station 107 includes the functions of the V2X server 109 so as to acquire the V2X content from the base station 107.

On the other hand, FIGS. 23A and 23B, the UE1 101, UE2 102, and UE3 103 monitor the emergency V2X transmission carrier and the non-emergency V2X transmission carrier. When it is assumed that a period during which the UEs monitor the emergency V2X transmission carrier may be set to "a", a period during which the UEs monitor the non-emergency V2X transmission carrier may be set to "b", the value of the a is not greater than b That is, the period during which the emergency V2X transmission carrier is monitored is equal to or shorter than the period during which the non-emergency V2X transmission carrier is monitored. This is because the monitoring of the emergency event must be more frequently performed than the monitoring of the non-emergency event.

Figure 24:
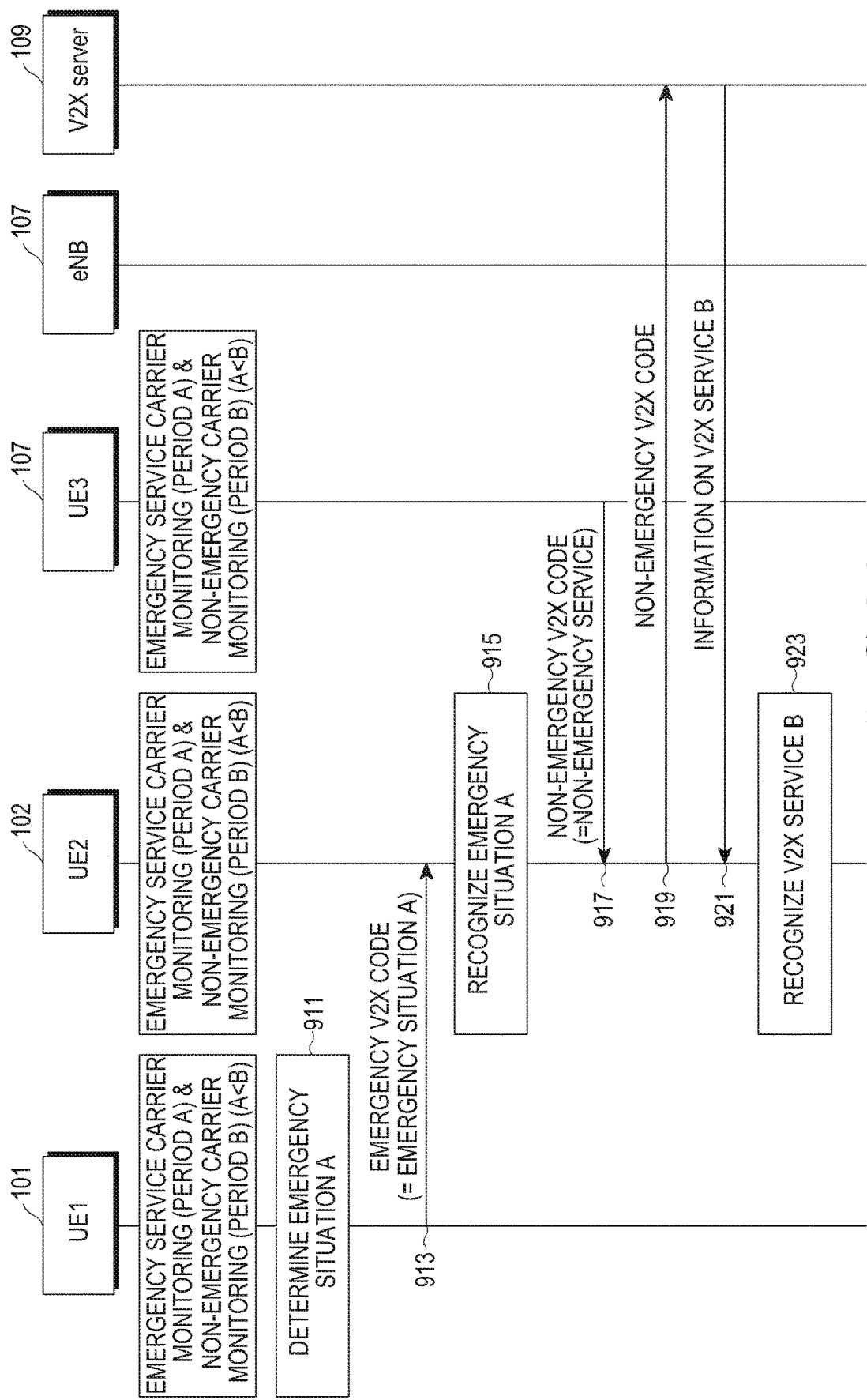
FIG. 24 is a diagram for explaining the message transmission and reception for an emergency service and a non-emergency service according to an embodiment of a second aspect of the present disclosure.

FIG. 24 is a diagram for explaining the message transmission and reception for the emergency services and non-emergency services according to an embodiment of a second aspect of the present disclosure.

As described above, in FIG. 24, the UE1 101, UE2 102, and UE3 103 monitor the emergency V2X transmission carrier at a period of a, and monitor the non-emergency V2X transmission carrier at a period b, respectively. In addition, a<b or a=b.

Step 913 to step 915 will describe the message transmission and reception process for the emergency service according to FIG. 23A.

In step 911, the UE1 101 determines the detected emergency situation A. In step 913, the UE1 101 selects the V2X code transmission resource from the predetermined set of resources, and broadcasts the V2X code corresponding to the emergency situation A through the selected resource. The UE2 102 receives the V2X code through the resource selected from the predetermined set of resources. The UE2 102 may search for the received V2X code in the mapping table for the V2X codes and V2X event, and may know the emergency situation A corresponding to the V2X code.

Step 917 to step 923 will describe the process for message transmission and reception for the non-emergency service according to FIG. 23B.

In step 917, the UE3 103 determines the V2X service B. In addition, it is assumed that the service B is non-emergency services, such as traffic information or parking information. The UE3 103 selects a V2X code transmission resource from the preconfigured set of resources, and broadcasts the V2X code in order to transmit information on the V2X service B. Another vehicle UE (e.g., UE2 102) receives, from the V2X code reception resource, the V2X code for the service B transmitted by the UE3 103. In step 919, the UE2 102, which has received the V2X code, searches for the received V2X code in the mapping table for the V2X code and V2X events. Since the received V2X code corresponds to the code for non-emergency services, the V2X code may not be included in the mapping table. Accordingly, the UE2 102 transmits the V2X code to the V2X server 109 via the base station 107. However, when the base station 107 has the function of the V2X server 109, the UE2 102 transmits the V2X code to the base station 107. In step 921, the V2X server 109 or the base station 107, which has received the V2X code, transmits V2X content information corresponding to the V2X code to the UE2 102. In step 923, the UE2 102 may know that a V2X service B corresponding to the V2X content. The UE2 performs an operation corresponding to the V2X service B. For example, the UE2 generates a notification signal for the V2X service B to the driver.

On the other hand, although it is assumed that resources for the transmission/reception of the V2X code are preconfigured, the resources for the transmission and reception of the V2X code may also be operated in a different method. Hereinafter, the operation method for the resource for the transmission and reception of V2X code will be described.

It is assumed that the V2X code is separated for the emergency service and the non-emergency service.

The transmission resource for the emergency V2X service code and the transmission resource for the non-emergency V2X service code may be separated according to service requirements (QoS) (for example, time delay and reliability) and then operated, and the number of retransmission times, the resource allocation cycle, and amount of resources required to meet the service requirements are determined.

In addition, the probability of the resource use (or the weight of the resource use), which is used to transmit the emergency V2X message, may be differently operated for each type of emergency services. That is, when a UE, which will transmit an emergency service code 1, and a UE, which will transmit an emergency service code 2, compete for the resource at the same time point, the resource use of the UE for the emergency service code 1 may have a higher probability. For example, when the probability of the transmission resource use by the emergency service code 1 is set to 1, and the probability of the transmission resource use by the emergency service code 2 is set to 093, it is deter ruined that the probabilities of using the same transmission resource by the UE1, which will transmit emergency service code 1, and UE2, which will transmit emergency service code 2, are 1 and 0.93, respectively.

On the other hand, the set of the transmission and reception resources of V2X code may be reconfigured on the basis of the number of UEs using the transmission and reception resources of the V2X code in a specific area or the generated service information, and the situation or emergency situation information of the area for triggering the reconfiguration of the set of the resources may be reported to the base station by the RSU or UE.

Examples of operating the V2X code resources are as follows.

(1) Preconfigured resources are used for the V2X code for emergency services, and normal device to device direct communication resources are used for the V2X code for non-emergency services.

(2) Preconfigured resource A is used for the V2X code for emergency services, and preconfigured resource B is used for the V2X code for non-emergency services.

(3) Resource C is used for the V2X code for emergency services, and resource D is used for the V2X code for non-emergency services.

(4) The V2X code for emergency services and the V2X code for non-emergency services use a preconfigured resource X.

(5) The V2X code for emergency services and the V2X code for non-emergency services use a resource Y (temporarily allocated resource Y).

On the other hand, resources for the transmission of the V2X code are allocated to a UE through a unicast message between the base station and the UE or through a broadcast message transmitted by the base station, or are preconfigured to the UE, so that separate signaling for the resource allocation may not be required.

On the other hand, examples of the operation of the transmission resources of the V2X code described so far may be applied to operation of the transmission and reception resources for V2X messages.

Furthermore, the code for the emergency service and code for the non-emergency service may include information of <Table 2> as follows.

TABLE 2

| Non-emergency service code | Emergency service code |
| --- | --- |
| Message type | Message type |
| Normal-V2X application code | Priority-V2X application code |
| MIC: Message integrity check | Digital signature, Message integrity check |
| UTC-based counter LSB | UTC-based counter LSB |

Hereinafter, examples of MAC layer signaling for supporting V2X services will be described.

FIG. 25 is a diagram illustrating an example of MAC layer signaling for supporting a V2X service according to an embodiment of a second aspect of the present disclosure.

The message format of the V2X service may include a MAC PDU, a header, and sub-header.

Figure 25A:
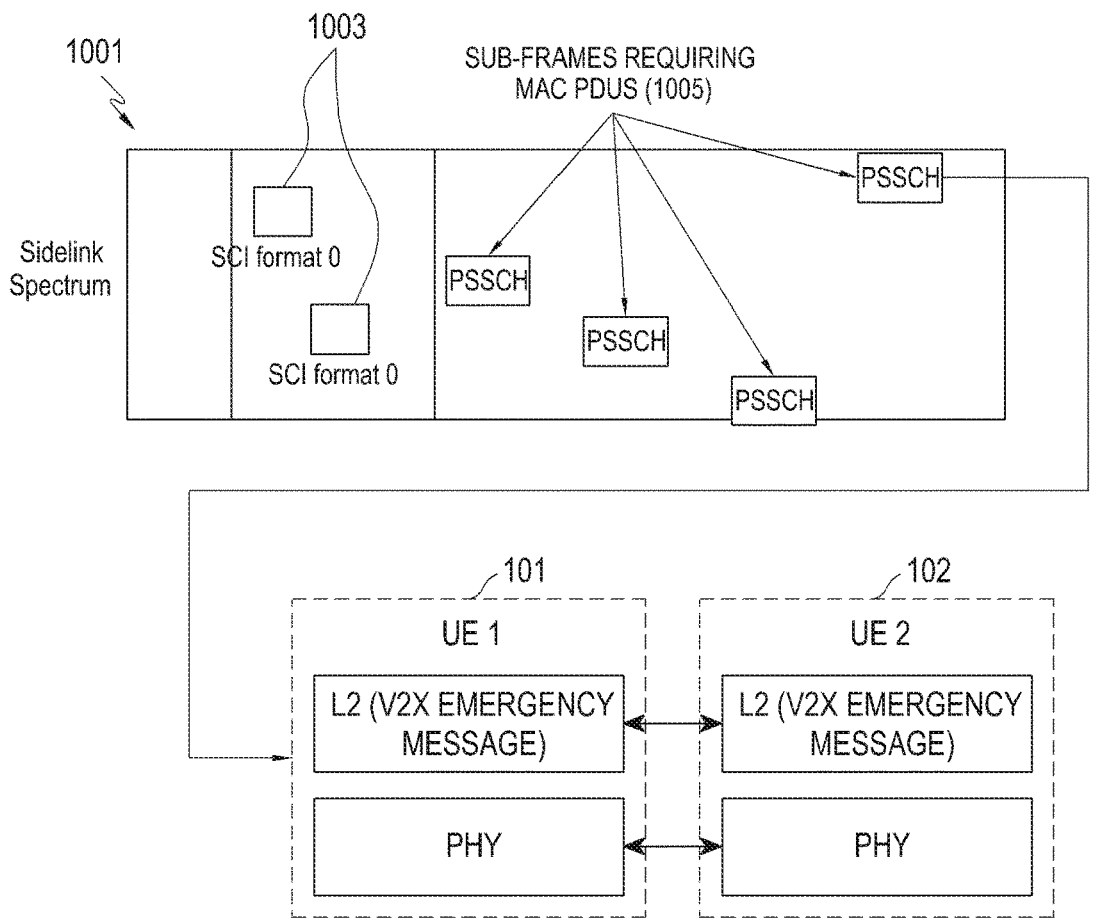
FIG. 25 is a diagram illustrating an example of an MAC layer signaling for supporting a V2X service according to an embodiment of a second aspect of the present disclosure.

FIG. 25A is an example of transmitting a V2X service message using a sidelink resource 1001 in D2D system of 3GPP LTE. An SCI format 0 1003 is transmission resource information of the V2X service message. In other words, the SCI format 1003 indicates information such as resources (frequency, time, etc.), MCS, period for transmitting the V2X service message. The V2X service message is exchanged between the UE1 101 and UE2 102, using the resources indicated by the SCI format 1003.

Figure 25B:
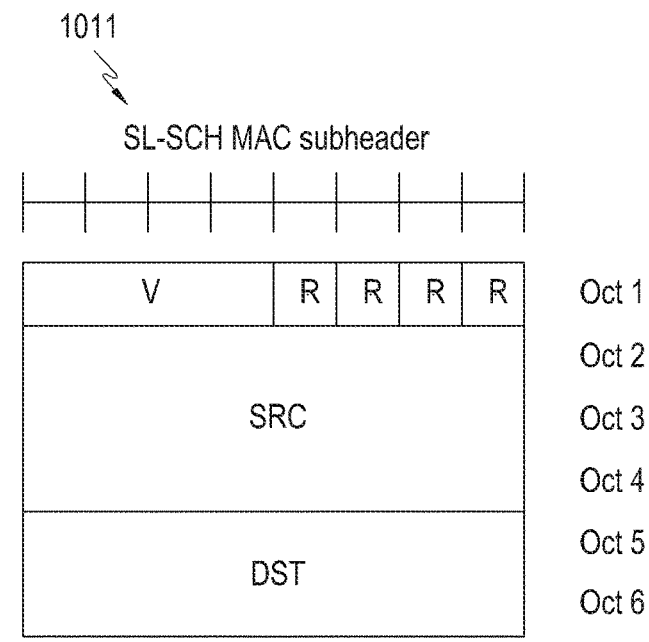

FIG. 25B shows a V2X signal structure configured by a MAC layer signal proposed in the second aspect of present disclosure.

On the other hand, an example of the V2X discovery signal includes fields of <Table 3> as follows.

TABLE 3

| Field | Description |
| --- | --- |
| Version Field | V2X discovery indicator or emergency V2X service indicator/non-emergency V2X service indicator |
| Transmitter address field | Identifier of V2X device that transmits V2X discovery signal |
| Recipient address field | Identifier of V2X device or group which will receive V2X discovery signal |

TABLE 3-continued

| Field | Description |
| --- | --- |
| Reserved field | Field for future use<br>One value of reserved field can be used V2X discovery indicator or emergency V2X service indicator/non-emergency V2X service indicator |

Other examples of V2X discovery signal include fields of <Table 4> as follows.

TABLE 4

| Field | Description |
| --- | --- |
| Version Field | Used as V2X discovery indicator or emergency V2X service indicator/non-emergency V2X service indicator |
| Transmitter address field | When V2X discovery signal is used for emergency V2X discovery, transmitter address field includes Identifier of device that transmits V2X discovery signal or identifier of other V2X device that transmits V2X discovery signal<br>When V2X discovery signal is used for group discovery, transmitter address field includes the group identifier<br>In another example, a transmitter address field may include an application identifier |
| Reserved field | Field for future use<br>One value of reserved field can be used V2X discovery indicator or emergency V2X service indicator/non-emergency V2X service indicator |

Other examples of V2X discovery signal include fields of <Table 5> as follows.

TABLE 5

| Field | Description |
| --- | --- |
| Version Field | Used as V2X discovery indicator or emergency V2X service indicator/non-emergency V2X service indicator |
| Reserved field | Field for future use<br>One value of reserved field can be used V2X discovery indicator or emergency V2X service indicator/non-emergency V2X service indicator |

For reference, the MAC layer discovery packet may be implemented in a MAC layer header or MAC layer sub-header in the V2X communication system. For reference, other information required for the V2X discovery operation may be, for example, PLMN information and APN information, and may be transmitted by being included in the payload portion of the MAC layer discovery packet.

On the other hand, Scheduling Assignment (SA), that is, SCI format, which instructs resources through which the MAC layer signal is transmitted, may be masked with an identifier indicating that the V2X service. In another embodiment, the SA may be masked with the emergency V2X service indicator or non-emergency V2X service indicator. In still another embodiment, the SA may be masked with the identifier notifying of a specific emergency V2X service, and here, it is assumed that the specific emergency V2X service and a masking value corresponding thereto are previously defined.

In addition, one-bit indicator of the SCI format 0 (or other types of SCI formats are possible) may be used as the non-emergency V2X service indicator/emergency V2X service indicator.

On the other hand, for the MAC layer signaling configured as described above, the transmission resource for the MAC layer signaling may be operated as an example below.

On the basis of the requirements of an emergency V2X service, classes of transmission resources may be pre-defined, and the MAC layer signal of the emergency service may be transmitted through resources of the defined class. On the other hand, the number of retransmission times, the resource allocation cycle, and the resource allocation amount are predetermined by the transmission resource class.

Transmission resource of the V2X service use is separately operated.

Resources for V2X Emergency service and resources for V2X non-emergency service are separately classified.

Hereinafter, the flow of messages in an embodiment where the SA is masked according to the above description and then transmitted will be described.

Figure 26:
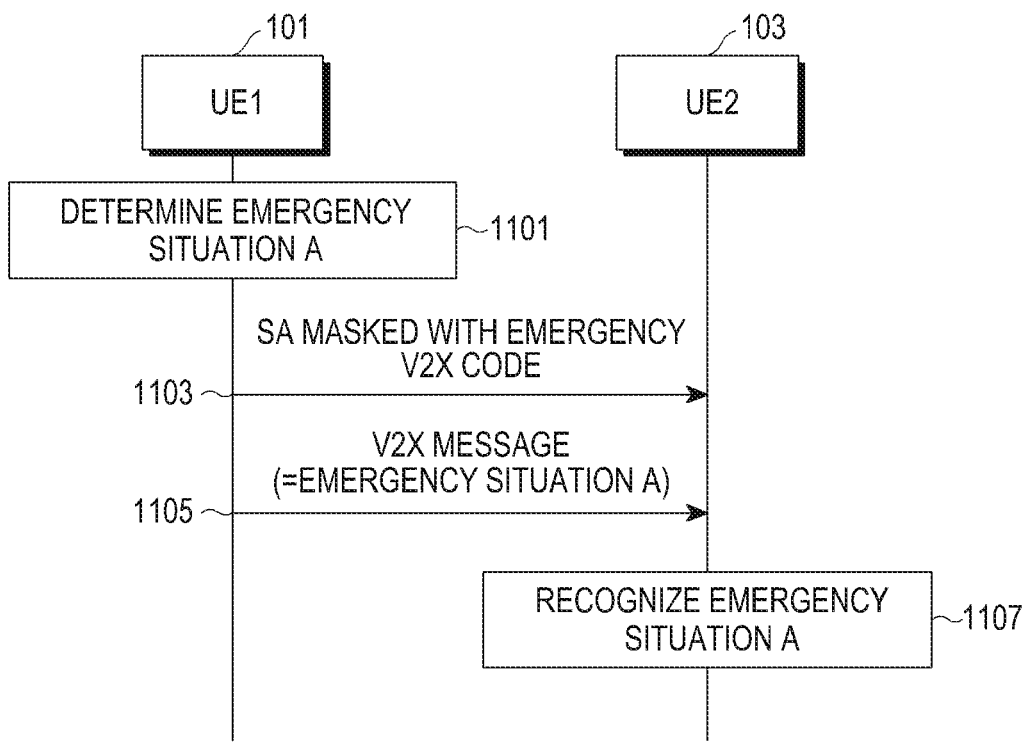
FIG. 26 is a diagram illustrating the flow of messages when an SA is masked with an emergency V2X code and then a V2X message is transmitted according to an embodiment of a second aspect of the present disclosure.

FIG. 26 is a diagram illustrating the flow of messages when an SA is masked with an emergency V2X code and then a V2X message is transmitted according to an embodiment of a second aspect of the present disclosure.

In step 1101, the UE1 101 determines the emergency situation A.

In step 1103, the UE1 101 configures an emergency V2X message for the emergency situation A, selects resources for transmitting the emergency V2X message from the preconfigured resource set, and configures SA including transmission information for the emergency V2X message to transmit the same through the selected resources. On the other hand, the SA is masked with a code indicating that the emergency V2X messages. For reference, the UE2 103 selects resources for receiving the SA from the preconfigured resource set and receives the SA transmitted by the UE1 101.

In step 1105, the UE1 101 transmits the V2X message according to the resource infatuation indicated by the SA via the resource. For reference, the UE2 103 may know the transmission resources of the V2X message transmitted by the UE1 101 based on information indicated by the SA received in step 1103, and receive the V2X message from the corresponding transmission resources. On other hand, the V2X message includes the content for the emergency situation A. Accordingly, in step 1107, the UE2 103 may know the emergency situation A and perform an operation corresponding to the emergency situation A.

In FIG. 26, it should be noted that the base station and V2X server does not required for operation between UEs. That is, since the SA is made only between the UEs, and the V2X message corresponds to emergency situations, the base station and the V2X server does not required.

Figure 27:
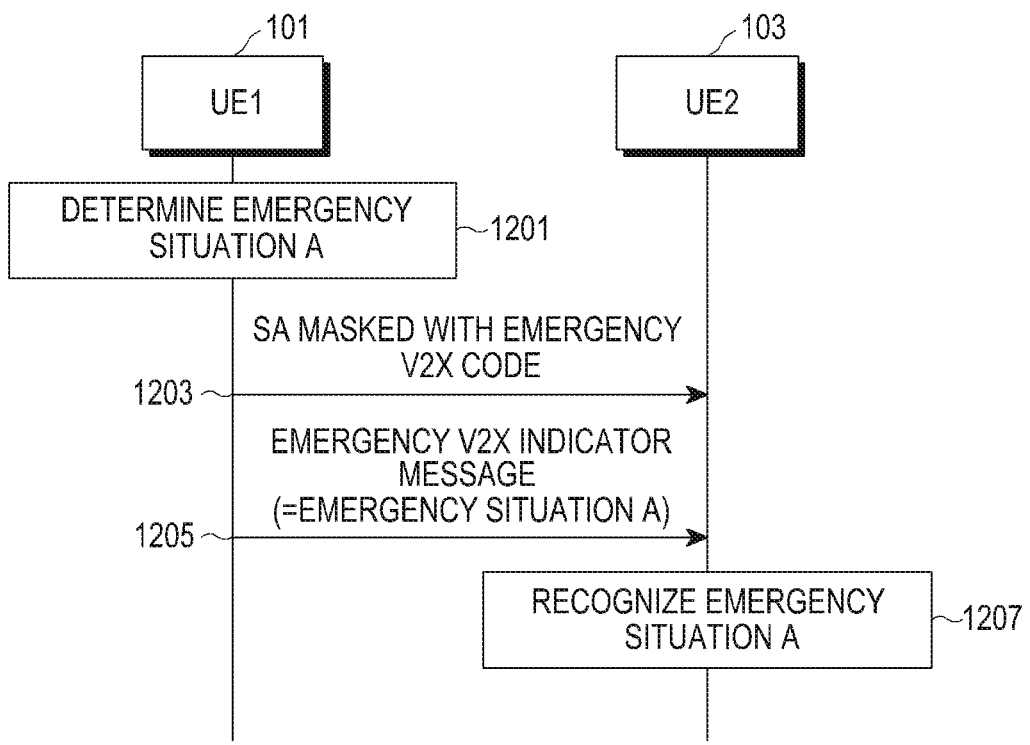
FIG. 27 is a diagram illustrating the flow of messages when an SA is masked with an emergency V2X code and then a V2X code is transmitted according to an embodiment of a second aspect of the present disclosure.

FIG. 27 is a diagram illustrating the flow of messages when SA is masked with an emergency V2X code and then the V2X code is transmitted according to a second aspect of the present disclosure.

In FIG. 26, in step 1103, the UE1 101 has transmitted the SA after masking the same with the emergency V2X code, and then in step 1105, the UE1 101 has transmitted the V2X messages. On the other hand, the operation of FIG. 27 is different in that the UE1 101 has transmitted the SA after masking the same with the emergency V2X code in step 1203, and then the UE1 101 transmits messages including contents for the emergency V2X indicator and emergency situation A in step 1205. Other descriptions that are the same as FIG. 26 and duplicate explanations are omitted.

As another embodiment of FIG. 27, although the SA is masked with the emergency V2X code in step 1203, the masking is performed using a general D2D indicator rather than the emergency V2X code. In another embodiment, in step 1203, the UE1 101 may configure an emergency V2X message for the emergency situation A, configure SA including transmission information for the emergency V2X message, and mask the SA with the indicator indicating the emergency V2X message.

That is, when embodiments of FIG. 26 and FIG. 27 and modified embodiments thereof are summarized, the SA is masked with the emergency V2X code (step 1103), or is masked with the general D2D code (modified embodiment), or is masked with an indicator indicating the emergency V2X message (modified embodiment). In addition, the V2X message may be transmitted after transmitting the masked SA (step 1105), and the messages including the content for the emergency V2X indicator and the emergency situation A may be transmitted (step 1205).

Hereinafter, information related to a discovery signal for performing communication between V2X devices, which are located outside the coverage of a cellular base station in a V2X communication system, will be described.

FIG. 28 is a diagram illustrating an example of communication between V2X devices outside the coverage of a cellular base station in a V2X communication system according to an embodiment of a second aspect of the present disclosure.

Figure 28A:
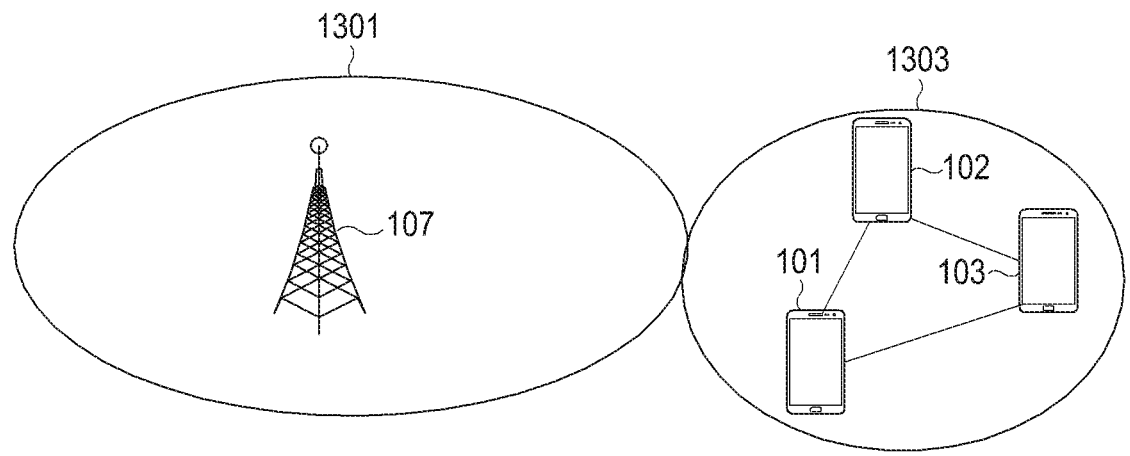
FIG. 28 is a diagram illustrating an example of communication between V2X devices outside the coverage of a cellular base station in a V2X communication system according to an embodiment of a second aspect of the present disclosure.

Referring to FIG. 28A, the V2X communication system allows direct communication between V2X devices within the coverage of cellular base station and direct communication between V2X devices outside the coverage 1301 of the cellular base station. That is, in FIG. 28A, direct communication between the UE1 101, UE2 102, and UE3 103 is possible. In order to perform direct communication between V2X devices outside the coverage 1301 of the cellular base station, a method for discovering the UEs each other is required.

Figure 28B:
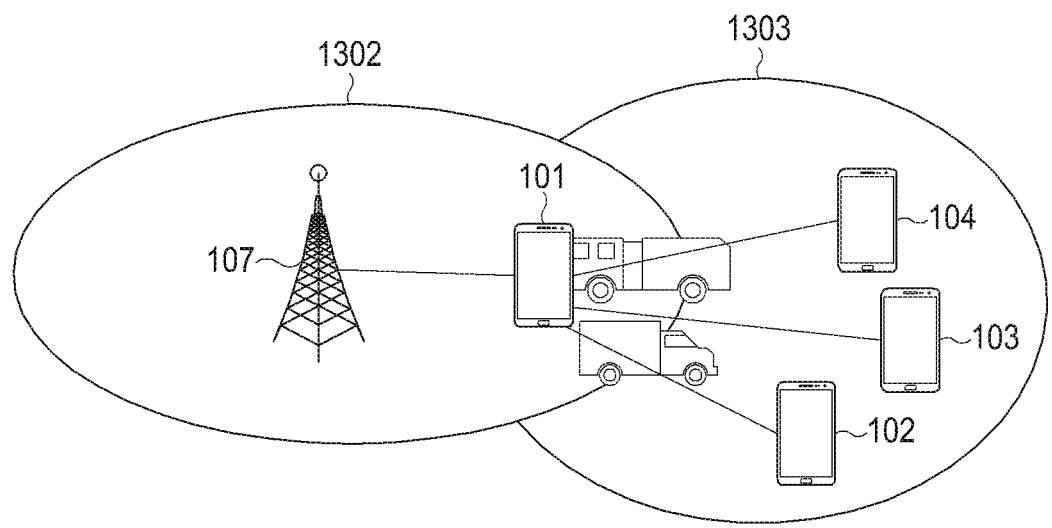

Referring to FIG. 28B, in the V2X communication system, it may perform communication between the UE2 102, the UE2 103 or the UE4 104, which are V2X devices outside the coverage 1302 of the cellular base station, and the base station 107, by using the UE1 that is a V2X device within the coverage 1302 of the cellular base station as a relay device.

FIG. 29 is a diagram for explaining a protocol layer for processing a discovery signal in a V2X communication system according to an embodiment of a second aspect of the present disclosure.

Figure 29A:
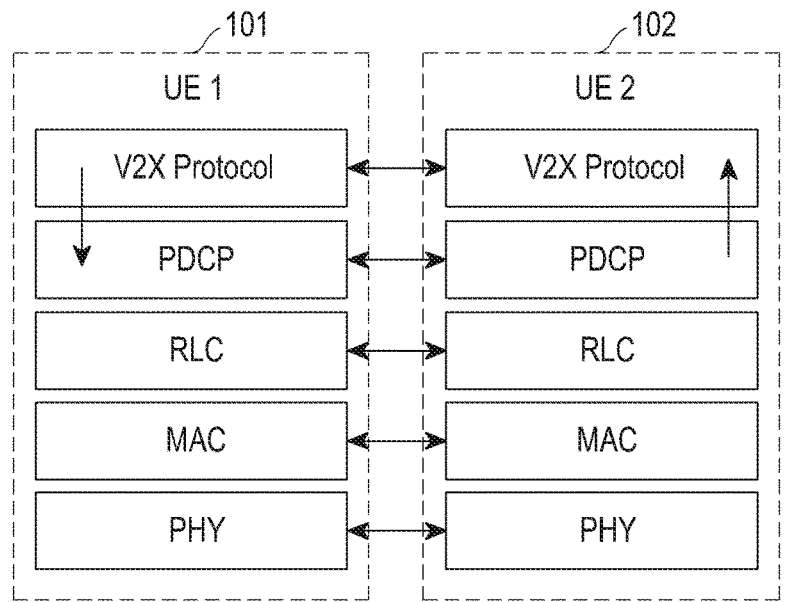
FIG. 29 is a diagram for explaining a protocol layer for processing a discovery signal in a V2X communication system according to an embodiment of a second aspect of the present disclosure.
Figure 29B:
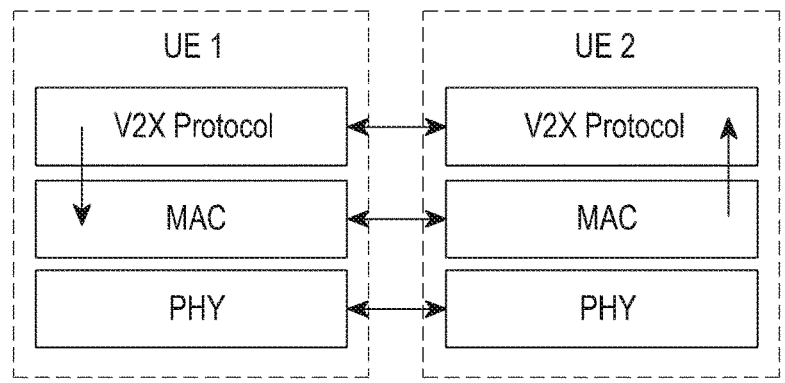
Figure 29C:
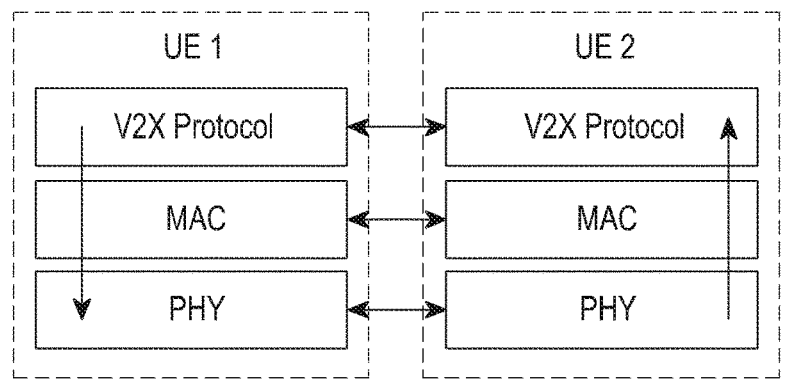

FIGS. 29A, 29B, and 29C illustrate examples of a protocol stack for processing a V2X discovery signal proposed in a second aspect of present disclosure.

FIG. 29A is a protocol stack when the V2X discovery signal is transmitted through a V2X physical channel and processed in a PDCP layer. The PDCP layer, which has received discovery information transmitted from the V2X protocol layer, generates a PDCP layer packet including information indicating that the discovery information is V2X discovery, and then transmits the same to a lower layer. In addition, the PDCP layer reconstructs the packet received from the lower layer to a PDCP layer packet then checks information indicating the V2X discovery, and transmits the discovery information to the protocol layer. In addition, FIG. 29A is a protocol stack when the V2X discovery signal is processed in the V2X protocol layer. The V2X protocol layer generates a packet including information indicating the V2X discovery and transmits the same to the lower layer, or reconstructs the packet transmitted from the lower layer to the V2X protocol layer packet and then checks information indicating the V2X discovery.

FIG. 29B is a protocol stack when the V2X discovery signal is transmitted through a V2X communication physical channel and processed in the MAC layer. The MAC layer receives a packet received from a higher layer, and when it is confirmed that the received packet is a packet for the V2X discovery, generates a MAC layer packet including the V2X discovery instruction information to transmit the same to the lower layer. The MAC layer reconstructs the MAC layer packet from the packet received from the lower layer and then confirms information indicating the V2X discovery.

FIG. 29C is a protocol stack when the V2X discovery signal is transmitted through the V2X discovery physical channel and processed in the physical (PHY) layer. When the packet transmitted from the V2X protocol includes V2X discovery information, the PHY layer inserts a code corresponding to the V2X discovery into the PHY layer resource and then transmits the same. The code that corresponds to the V2X discovery transmitted from the PHY layer is transmitted to the V2X protocol layer and is used to check the V2X discovery information. The V2X discovery code may use the same value around the world, or use the same value for each PLMN, or use the same value for each APN, and define a value only for a specific service and use the same.

Figure 30:
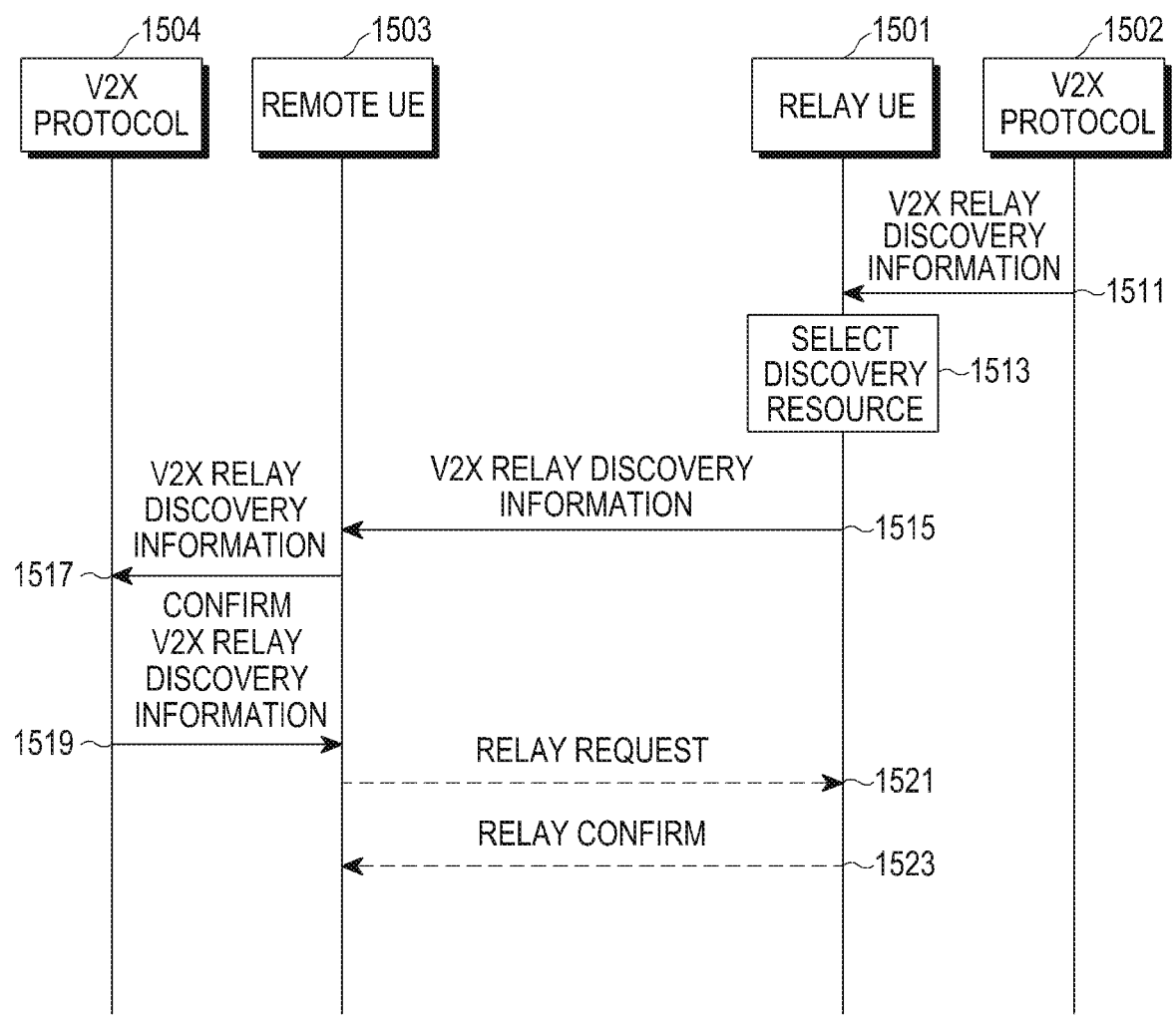
FIG. 30 is a diagram for explaining an example for discovering a relay device in a V2X communication system according to an embodiment of a second aspect of the present disclosure.

FIG. 30 is a diagram for explaining an example for discovering a relay device in a V2X communication system according to an embodiment of a second aspect of the present disclosure.

In step 1511, a V2X protocol 1502 of the relay UE transmits, to a relay UE 1501 (particularly, L2 layer), V2X relay discovery information notifying of the V2X protocol itself being functioned as a relay device to the peripheral device. For reference, the V2X protocol 1502 of the relay UE may be implemented in a separate entity such as a server, and it may be implemented at the relay UE 1501. The V2X relay discovery information includes at least one of the relay device identifier (Application ID), group identifier, PLMN identifier, and APN information.

The relay UE 1501 (particularly, L2 layer) processes the relay device information received from the V2X protocol 1502 of the relay UE to generate V2X relay discovery information. The V2X relay discovery information is an L2 message. In step 1513, the relay UE 1501 selects a transmission resource to transmit the L2 message, and transmits the V2X relay discovery information to the remote UE 1503 in step 1515. For reference, the L2 message includes V2X relay discovery instruction information generated by the PDCP layer or includes V2X relay discovery instruction information generated by the MAC layer. Alternatively, the resource allocation indicator (Scheduling Assignment, SA) for transmitting the L2 message is masked by the V2X relay discovery instruction information and then transmitted.

The remote UE 1503 (particularly, L2 layer), which has received the V2X relay discovery signal, transmits the relay device information to a V2X protocol 1504 of the remote UE in step 1517. For reference, although the V2X protocol 1504 of the remote UE may be configured in a separate entity, when it is considered that the remote UE 1503 is the conventional UE device, the V2X protocol 1504 of the remote UE is generally implemented inside the remote UE 1503.

In step 1519, the V2X protocol 1504 of the remote UE checks the relay device information. When information on the relay device, detected from the V2X relay discovery information, is not sufficient, the remote UE 1503 transmits a Relay-Request that is a signal requesting for additional information associated with the relaying to the relay UE 1501, in step 1519.

In step 1523, the relay UE 1501 transmits a relay-confirm message as a response to the relay request. The relay-confirm message includes additional information to be required to perform relay communication between the remote UE 1503 and the relay device. Information that is additionally exchanged through the relay request message and the relay confirm message may include, for example, the PLMN identifier or APN Information.

Based on the above description, hereinafter, a case where the V2X relay discovery information (L2 message) transmitted by the relay UE 1501 corresponds to the L2 message of the MAC layer will be described.

The V2X relays discovery information includes at least one of a relay device indicator, a relay device identifier, a group identifier supported by the relay device, PLMN identifier, and APN information. The remote UE 1503 may receive the V2X relay discovery information to select the relay UE 1501, and transmit the relay request message to the relay UE 1501 in order to start an operation of establishing a connection to the network through the relay UE 1501. When the remote UE 1503 requires additional information in order to select a relay UE 1501, the relay request message may be transmitted. The relay UE 1501, which has received the relay request message, transmits a relay confirm message as a response thereto, and the relay-confirm message may include information required to provide the connectivity between the remote UE 503 and the network.

Figure 31:
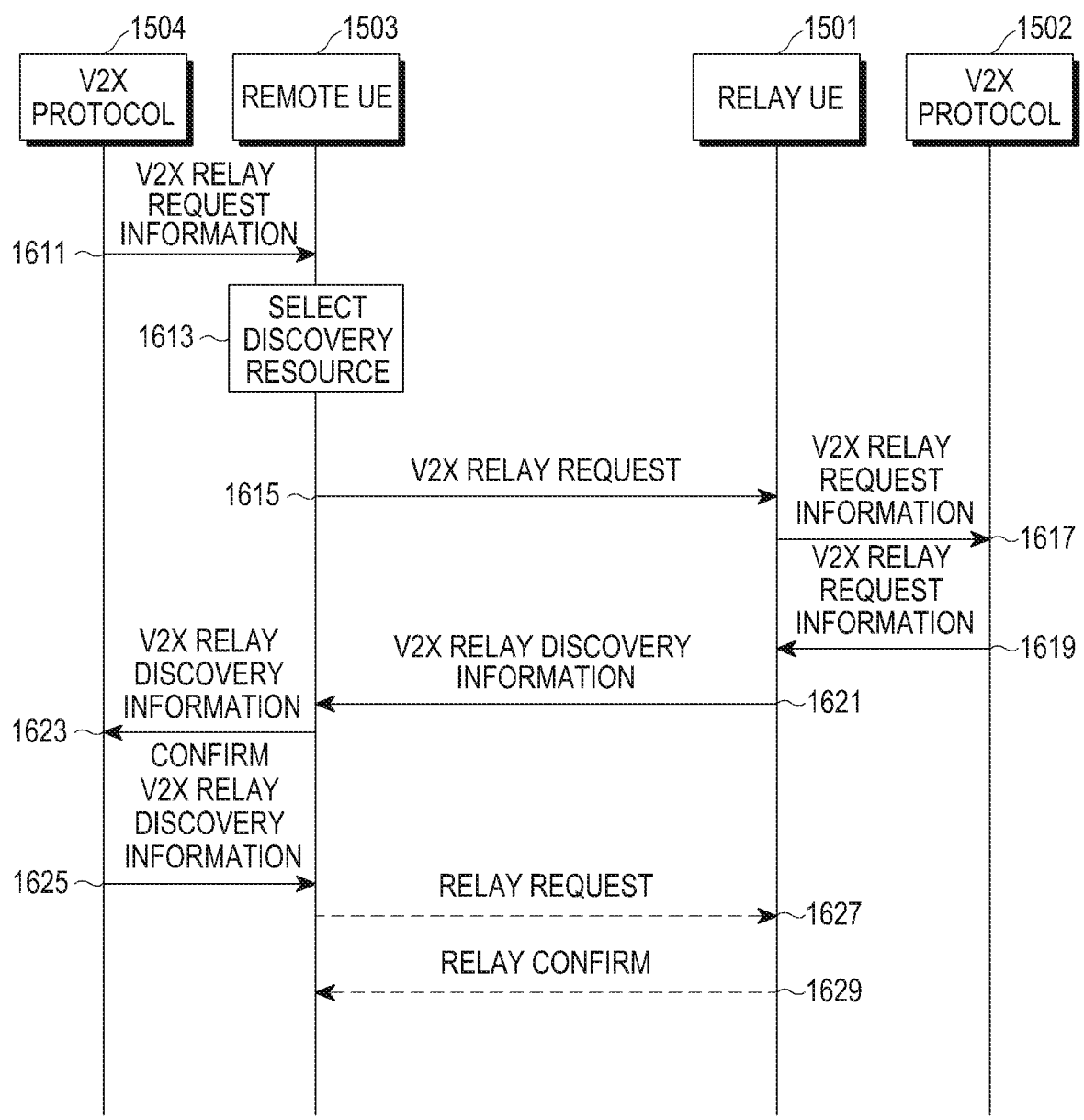
FIG. 31 is a diagram for explaining a process of discovering a neighboring relay device by a remote device according to an embodiment of a second aspect of the present disclosure.

FIG. 31 is a diagram for explaining a process of discovering a neighboring relay device by a remote device according to an embodiment of a second aspect of the present disclosure.

In step 1611, the V2X protocol 1504 of the remote UE generates V2X relay request information to perform discovery of the neighboring relay UE 1501 in order to ensure the connectivity to the network, and transmits the same to the remote UE 1503. The V2X relay request information includes at least one the UE identifier, group identifier, relay device discovery indicator, PLMN identifier, and APN information. Accordingly, the remote UE 1503 (particularly, L2 layer) processes the relay device discovery information received by the V2X protocol, and generates V2X relay request information that is an L2 message. In step 1613, the remote UE 1503 selects a transmission resource used for transmitting the L2 message (that is, V2X relay request information), and transmits the L2 message in step 1615. The L2 message may include the V2X relay request instruction information generated by the PDCP layer, or include V2X relay request instruction information generated by the MAC layer. On the other hand, the remote UE 1503 may mask the resource allocation indicator (Scheduling Assignment, SA) used for transmitting the L2 message with the V2X relay request instruction information and transmit the same. The relay UE 1501 (particularly, L2 layer), which has received the V2X relay request message, transmits the relay device discovery information of the remote UE 1503 to the V2X protocol 1502 of the relay UE in step 1617. In step 1619, the V2X protocol 1502 of the relay UE checks the relay device discovery information, and configures relay device information notifying of the UE itself operates as a relay device so as to transmit the same to the remote UE 1503 (particularly, L2 layer). The relay device information includes at least one of the relay device identifier, group identifier, PLMN identifier, and APN information. On the other hand, the relay UE 1501 (particularly, L2 layer) processes the relay device information, received from the V2X protocol 1502 of the relay device, and generates V2X relay discovery information (L2 message). Then, the relay UE 1501 selects a transmission resource to be used for transmitting the L2 message, and transmits the L2 message in step 1621.

The L2 message (that s, V2X relay discovery information) includes V2X relay discovery instruction information generated by the PDCP layer or includes V2X relay discovery instruction information generated by the MAC layer. In addition, the relay UE 1501 transmits the L2 message after masking the resource allocation indicator (Scheduling Assignment, SA) with the V2X relay discovery instruction information.

The remote UE 1503 (particularly, L2 layer), which has received the V2X relay discovery information, transmits the relay device information to the V2X protocol 1504 of the remote UE in step 1623. In step 1625, the V2X protocol 1504 of the remote UE checks the relay device information to transmit the same to the remote UE 1503. Then, in step 1627, the remote UE 1503 selects the relay UE 1501 based on the relay device information, and transmits the relay request message to the relay UE 1501 in order to start an operation of establishing a connection to the network through the relay UE 1501. If the remote UE 1503 requires additional information to select a relay UE 1501, the relay request message may be transmitted.

The relay UE 1501, which has received the relay request signal, transmits a relay confirm message as a response thereto, in step 1629. The relay-confirm message may include information required to provide the connectivity between the remote UE 1503, and the network. For example, the relay-confirm message may include information such as PLMN identifier to APN information, which is not included in the V2X discovery L2 message information.

Figure 32:
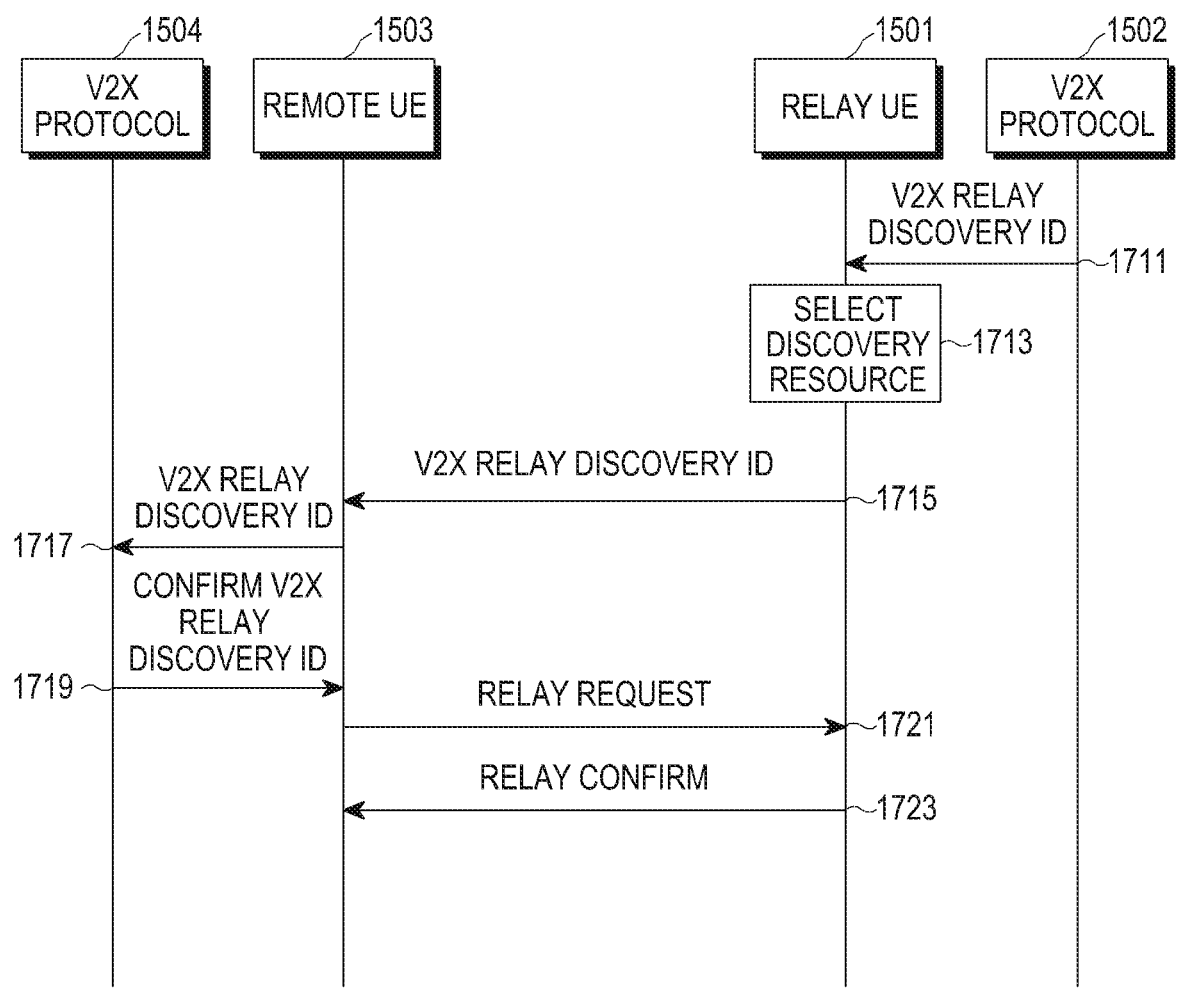
FIG. 32 is a diagram for explaining an example for discovering a relay device in a V2X communication system according to an embodiment of a second aspect of the present disclosure.

FIG. 32 is a diagram for explaining an example for discovering a relay device in a V2X communication system according to an embodiment of a second aspect of the present disclosure.

A procedure of FIG. 32 is the same as that described by the procedure described in FIG. 30. However, there is a difference in that the V2X relay discovery information is processed by the L2 layer in FIG. 30. However, the V2X relay discovery ID is processed through the physical channel in FIG. 32. That is, there is a difference in that FIG. 30 is an example based on the L2 message, and FIG. 32 is an example based on the L1 message. In FIG. 32, the V2X relay discovery ID includes a relay device indicator, and the V2X relay discovery ID may be configured to use the same value around the world, use the same value for each PLMN, or use the same value for APN.

Specifically, in step 1711, the V2X protocol 1502 of the relay UE configures V2X relay discovery ID notifying that the UE itself operates as a relay device to the peripheral device, and transmits the same to the relay UE 1501, and in step 1713, the relay UE 1501 selects a resource to be used for transmitting the V2X relay discovery ID including the V2X relay discovery information, and transmits the same to the remote UE 1503 through the PHY channel in step 1715. The V2X relay discovery ID including the relay device indicator may be configured to use the same value around the world, use the same value for each PLMN, or use the same value for each APN.

In step 1717, the remote UE 1503, which has received the V2X relay discovery ID, transmits the received V2X relay discovery ID to the V2X protocol 1504 of the remote UE, and in step 1719, the V2X protocol 1504 of the remote UE checks and acquires the relay device indicator from the V2X relay discovery ID, and transmits the same to the remote UE 1503. In step 1721 the remote UE 1503 transmits a relay request message to the relay UE in order to acquire the detailed information required for the connection between the relay UE 1501 that has transmitted the V2X relay discovery ID and the network. The relay request message includes information on the PHY channel through which the V2X relay discovery ID is transmitted. In addition, the relay request signal may include the identifier of the remote UE 1503, group identifier, PLMN identifier, and APN Information. The relay UE 1501, which has received the relay request signal, determines whether the UE itself is a target relay device based on the PHY channel information included therein. In step 1723, the relay UE 1501 transmits the relay-confirm message including at least one of the relay UE identifier, group identifier, PLMN identifier, APN Info, and information on the PHY channel through which the V2X relay discovery ID.

Figure 33:
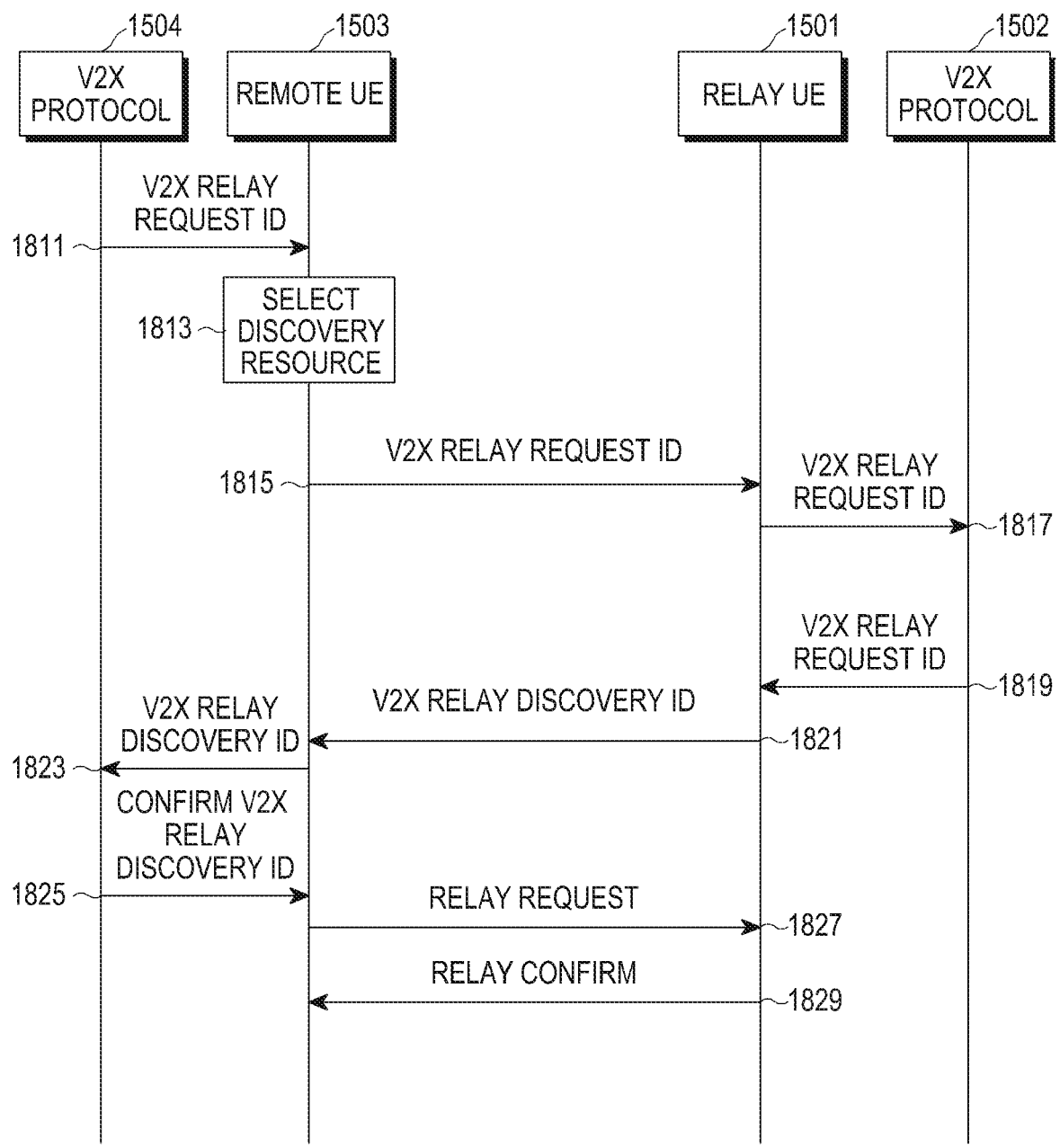
FIG. 33 is a diagram for explaining a process of discovering a neighboring relay device by a remote device according to an embodiment of a second aspect of the present disclosure.

FIG. 33 is a diagram for explaining a process of discovering a neighboring relay device by a remote device according to an embodiment of a second aspect of the present disclosure.

A procedure of FIG. 33 is the same as that described by the procedure described in FIG. 31. However, there is a difference in that the V2X relay discovery information is processed in the L2 layer in FIG. 31. However, the V2X relay discovery ID is processed through the physical channel in FIG. 33. That is, there is a difference in that FIG. 32 is an example based on the L2 message, and FIG. 33 is an example based on the L1 message. In FIG. 33, the V2X relay discovery ID includes a relay device indicator, and the V2X relay request ID may have the same value around the world.

Specifically, in step 1811, the V2X protocol 1504 of the remote UE configures V2X relay request ID (relay device discovery indicator) in order to perform discovery of the neighboring relay device, and transmits the same to the remote UE 1503. In step 1813, the remote UE 1503 selects a PHY channel resource among the preconfigured set of resources, and transmits the V2X relay request ID including the relay device discovery indicator to the relay UE in step 1815.

In step 1817, upon receiving the V2X relay request ID, the relay UE 1501 transmits the same to the V2X protocol 1502 of the relay UE, and in step 1819, the V2X protocol 1502 of the relay UE configures the V2X relay discovery information notifying that the UE itself operates as a relay device, and transmits the same to the relay UE 1501. The V2X relay discovery information is the relay device indicator (Application ID). In step 1821, the relay UE 1501 selects a resource to be used for transmitting the V2X relay discovery ID including the V2X relay discovery information, and transmits the same to the remote UE 1503, using the PHY channel. The V2X relay discovery ID including the relay device indicator is configured to use the same value around the world, the same value for each PLMN, or the same value for each APN.

In step 1823, the remote UE 1503, which has received the V2X relay discovery ID, transmits the received V2X relay discovery ID to the V2X protocol. 1504 of the remote UE, and the V2X protocol 1504 of the remote UE checks and acquires the relay device identifier information in step 1825. Then, in step 1827, the remote UE 1503 transmits a relay request message to the relay UE 1501 in order to acquire the detailed information required for the connection between the relay UE 1501 that has transmitted the V2X relay discovery ID and the network. The relay request signal includes information on the PHY channel through which the V2X relay discovery ID is transmitted. In addition, the relay request signal may include the identifier of the remote UE 1503, group identifier, PLMN identifier, and APN information. The relay UE 1501, which has received the relay request signal, determines whether the UE itself is a target relay device based on the PHY channel information, and the relay UE 1501 transmits, to the remoter UE 1503 the relay-confirm message including at least one of the relay UE identifier, group identifier, PLMN identifier, APN Info, and information on the PHY channel through which the V2X relay discovery ID in step 1829.

Hereinafter, configurations of a terminal device and a base station operating according to embodiments of a second aspect of the present disclosure will be described.

Figure 34:
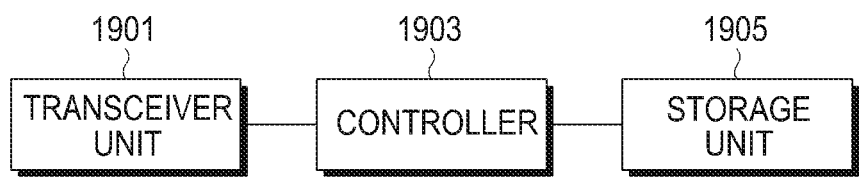
FIG. 34 is a diagram for explaining a configuration of a terminal device according to embodiments of a second aspect of the present disclosure.

FIG. 34 is a diagram for explaining a configuration of a terminal device according to embodiments of a second aspect of the present disclosure.

A transceiver unit 1901 performs signal transmission and reception to and from external entities, which include a base station, another UE, and RSU. To this end, the transceiver unit may include a RF transmitter configured to up-convert and amplify a frequency of a transmission signal, and a RF receiver configured to perform low-noise amplifying of a reception signal and down-convert a frequency of the same. In addition, the transceiver unit may receive a signal through a wireless channel and output the same to the controller 1903, and transmit the signal output from the controller 1903 through the wireless channel. In addition, the transceiver unit 1901 may include a communication module for supporting various communication methods such as cellular communication and device to device direct communication.

The controller 1903 controls the overall operation according to embodiments of the above-described second aspect of the present disclosure. For example, the controller determines an emergency situation and determines whether to perform device to device direct communication, or whether to perform local transmission through the base station for the V2X message notifying of the emergency situation. In addition, the controller generates various kinds of messages required according to the above description. In addition, the controller analyzes the V2X message received from the other UE, and performs an operation of relaying the message or an operation of responding to the message. On the other hand, the UE device may be an entity having a relay function, such as RSU. Therefore, the controller 1903 may perform relaying operations.

The storage unit 1905 stores information required in embodiments of a second aspect of the present disclosure. The required information may be, for example, a mapping table between the V2X application code and V2X information.

Figure 35:
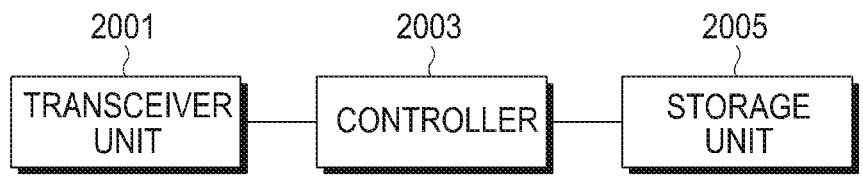
FIG. 35 is a diagram for explaining a configuration of a base station according to embodiments of a second aspect of the present disclosure.

FIG. 35 is a diagram for explaining a configuration of a base station according to embodiments of a second aspect of the present disclosure.

The transceiver unit 2001 performs signal transmission and reception to and from external entities which include a UE, RSU and the like. To this end, the transceiver unit may include a RF transmitter configured to up-convert and amplify a frequency of a transmission signal, and an RF receiver configured to perform low-noise amplifying of a reception signal and down-convert a frequency of the same. In addition, the transceiver unit may receive a signal through a wireless channel and output the same to the controller 2003, and transmit the signal output from the controller 2003 through the wireless channel.

The controller 2003 controls the overall operation according to embodiments of the above-described second aspect of the present disclosure. For example, the controller determines whether a local transmission indicator is included in the V2X message received from the UE or RSU, and when the local transmission indicator is included, the controller transmits the V2X message to the UEs within the cell coverage. The controller controls all operations of the base station in addition to the above example. However, these have been described herein, and a detailed description thereof will be omitted.

The storage unit 2005 stores information required in the embodiments of the second aspect of present disclosure.

Particular aspects of the present disclosure may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program for a code implementing the apparatus and method described in the appended claims of the specification and a machine (a computer or the like)-readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The invention claimed is:

1. A discovery method of a relay user equipment (UE) for device to device (D2D) communication, the method comprising:
   generating, by the relay UE, a discovery signal including relay UE discovery information and a relay UE discovery indicator, wherein the relay UE discovery indicator indicates that the relay UE provides a relay service;
   identifying, by the relay UE, a transmission resource to transmit the discovery signal;
   transmitting, by the relay UE, to a device that is one of devices outside a coverage of a base station, the discovery signal through the identified transmission resource;
   receiving, by the relay UE, a request signal for additional information associated with a UE discovery from the device, the additional information used to provide a relayed network connection to the device via the relay UE; and
   in response to receiving the request signal, transmitting, by the relay UE, the requested additional information to the device,
   wherein the relay UE discovery information includes a relay UE discovery ID, as sender information, which is a same identifier value for a plurality of relay UEs, and
   wherein the relay UE discovery indicator includes a vehicle-to-vehicle (V2V) service indicator, a vehicle-to-infrastructure (V2I) service indicator, or a vehicle-to-pedestrian (V2P) service indicator.

2. The discovery method of claim 1,
   wherein the relay UE discovery indicator is included in at least one of a Packet Data Convergence Protocol (PDCP) packet, a Media Access Control (MAC) packet, or a physical layer packet,
   the MAC packet includes a version field, a reserved field, a source field, and a destination field, wherein the version field is used to instruct relay UE discovery or group member discovery, and one value of the reserved field is used to instruct the relay UE discovery or the group member discovery, and
   the source field includes at least one of a relay UE identifier, a group identifier, or an application identifier, and the destination field includes an identifier of the device for receiving the discovery signal or the group identifier.

3. The discovery method of claim 1, wherein the relay UE discovery indicator is included in at least one of a Packet Data Convergence Protocol (PDCP) packet or a Media Access Control (MAC) packet, or the discovery signal includes at least one of a resource allocation indicator that is masked by the relay UE discovery indicator, or a discovery message including a service layer signaling format.

4. The discovery method of claim 1, wherein the discovery signal includes an identifier indicating service information or group information, provided by the relay UE for transmitting the discovery signal.

5. The discovery method of claim 1, wherein the relay UE discovery information further includes at least one of a relay UE identifier associated with the relay UE that transmits the discovery signal, a group identifier, a Public Land Mobile Network (PLMN) identifier, Access Point Name (APN) information, or an application identifier.

6. The discovery method of claim 1, wherein the relay UE discovery information further includes at least one of a group identifier associated with the relay UE for generating the discovery signal, a service identifier, or a device identifier.

7. The discovery method of claim 1, further comprising receiving a request signal from the device prior to transmitting the discovery signal,
wherein the request signal includes at least one of a Packet Data Convergence Protocol (PDCP) packet including the relay UE discovery indicator associated with the relay UE for transmitting the discovery signal, a Media Access Control (MAC) packet including the relay UE discovery indicator, a physical layer packet including the relay UE discovery indicator, a resource allocation indicator that is masked by the relay UE discovery indicator, or a relay request message including a service layer signaling format.

8. The discovery method of claim 7, wherein the request signal includes at least one of a Packet Data Convergence Protocol (PDCP) packet including a group discovery request indicator, a Media Access Control (MAC) packet including the group discovery request indicator, a physical layer packet including a group discovery request identifier, a resource allocation indicator that is masked by the group discovery request indicator, or a group discovery request message including a service layer signaling format.

9. The discovery method of claim 1, wherein the request signal includes at least one of a device identifier associated with the device that transmits the request signal, a group identifier, a Public Land Mobile Network (PLMN) identifier, and Access Point Name (APN) information, or information on a physical channel used for the transmission of the discovery signal.

10. The discovery method of claim 1, wherein the additional information includes at least one of a device identifier associated with the device that transmits the discovery signal, a group identifier, a Public Land Mobile Network (PLMN) identifier, Access Point Name (APN) information, a service identifier, service information, group information, or information on a physical channel used for the transmission of the discovery signal.

11. A discovery method of a user equipment (UE) for device to device (D2D) communication, the method comprising:
receiving, from a relay UE, a discovery signal including relay UE discovery information and a relay UE discovery indicator, wherein the relay UE discovery indicator indicates that the relay UE provides a relay service;
obtaining the relay UE discovery information from the discovery signal;
transmitting, to the relay UE, a request signal for additional information required for a relayed network connection via the relay UE based on the relay UE discovery information; and
receiving, from the relay UE, the requested additional information in response to the request signal,
wherein the relay UE discovery information includes a relay UE discovery ID, as sender information, which is a same identifier value for a plurality of relay UEs, and
wherein the relay UE discovery indicator includes a vehicle-to-vehicle (V2V) service indicator, a vehicle-to-infrastructure (V2I) service indicator, or a vehicle-to-pedestrian (V2P) service indicator.

12. A relay user equipment (UE) for performing device to device (D2D) communication, the relay UE comprising:
a transceiver; and
a processor configured to:
generate a discovery signal including relay UE discovery information and a relay UE discovery indicator, wherein the relay UE discovery indicator indicates that the relay UE provides a relay service;
identify a transmission resource to transmit the discovery signal;
control the transceiver to transmit, to a device that is one of devices outside a coverage of a base station, the discovery signal through the identified transmission resource,
receive, from the device via the transceiver, a request signal for additional information associated with a UE discovery, the additional information used to provide a relayed network connection to the device via the relay UE; and
control the transceiver to transmit, in response to receiving the request signal, the requested additional information to the device,
wherein the relay UE discovery information includes a relay UE discovery ID, as sender information, which is a same identifier value for a plurality of relay UEs, and
wherein the relay UE discovery indicator includes a vehicle-to-vehicle (V2V) service indicator, a vehicle-to-infrastructure (V2I) service indicator, or a vehicle-to-pedestrian (V2P) service indicator.

13. A user equipment (UE) for performing device to device (D2D) communication, the UE comprising:
a transceiver; and
a processor configured to:
receive, from a relay UE via the transceiver, a discovery signal including relay UE discovery information and a relay UE discovery indicator, wherein the relay UE discovery indicator indicates that the relay UE provides a relay service;
obtain the relay UE discovery information from the discovery signal;
control the transceiver to transmit a request signal, to the relay UE based on the relay UE discovery information, for additional information required for a relayed network connection via the relay UE; and
receive, from the relay UE via the transceiver, the requested additional information in response to the request signal,
wherein the relay UE discovery information includes a relay UE discovery ID, as sender information, which is a same identifier value for a plurality of relay UEs, and
wherein the relay UE discovery indicator includes a vehicle-to-vehicle (V2V) service indicator, a vehicle-to-infrastructure (V2I) service indicator or a vehicle-to-pedestrian (V2P) service indicator.

14. The relay UE of claim 12,
wherein the relay UE discovery indicator is included in at least one of a Packet Data Convergence Protocol (PDCP) packet, a Media Access Control (MAC) packet, and a physical layer packet,
the MAC packet includes a version field, a reserved field, a source field, and a destination field, wherein the version field is used to instruct relay UE discovery or group member discovery, and one value of the reserved field is used to instruct the relay UE discovery or the group member discovery, and
the source field includes at least one of a relay UE identifier, a group identifier, or an application identifier, and the destination field includes an identifier of the device for receiving the discovery signal or the group identifier.

15. The relay UE of claim 12, wherein the relay UE discovery indicator is included in at least one of a Packet Data Convergence Protocol (PDCP) packet or a Media Access Control (MAC) packet, or the discovery signal includes at least one of a resource allocation indicator that is masked by the relay UE discovery indicator, or a discovery message including a service layer signaling format.

16. The relay UE of claim 12, wherein the discovery signal includes an identifier indicating service information or group information, provided by the relay UE for transmitting the discovery signal.

17. The relay UE of claim 12, wherein the relay UE discovery information further includes at least one of a group identifier associated with the relay UE for generating the discovery signal, a service identifier, or a device identifier.

18. The relay UE of claim 12, wherein the processor is further configured to receive, from the device via the transceiver, a request signal prior to the transceiver transmitting the discovery signal, wherein the request signal includes at least one of a Packet Data Convergence Protocol (PDCP) packet including the relay UE discovery indicator associated with the relay UE for transmitting the discovery signal, a Media Access Control (MAC) packet including the relay UE discovery indicator, a physical layer packet including the relay UE discovery indicator, a resource allocation indicator that is masked by the relay UE discovery indicator, or a relay request message including a service layer signaling format.

19. The discovery method of claim 1, wherein the relay UE discovery information includes further at least one of an identifier of the relay UE, a group identifier, a public land mobile network (PLMN) identifier, or access point name (APN) information, and wherein the additional information includes at least one of the PLMN identifier or the APN information.

20. The discovery method of claim 11, wherein the relay UE discovery information further includes at least one of an identifier of the relay UE, a group identifier, a public land mobile network (PLMN) identifier, or access point name (APN) information, and wherein the additional information includes at least one of the PLMN identifier or the APN information.

* * * * *